(12) United States Patent
Roumi et al.

(10) Patent No.: US 11,894,562 B2
(45) Date of Patent: Feb. 6, 2024

(54) THREE-DIMENSIONAL ION TRANSPORT NETWORKS AND CURRENT COLLECTORS FOR ELECTROCHEMICAL CELLS

(71) Applicant: California Institute of Technology, Pasadena, CA (US)

(72) Inventors: Farshid Roumi, Pasadena, CA (US); Mahshid Roumi, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 17/583,679

(22) Filed: Jan. 25, 2022

(65) Prior Publication Data

US 2022/0311014 A1 Sep. 29, 2022

Related U.S. Application Data

(60) Continuation of application No. 16/373,308, filed on Apr. 2, 2019, now Pat. No. 11,271,214, which is a
(Continued)

(51) Int. Cl.
*H01M 4/78* (2006.01)
*H01M 4/13* (2010.01)
(Continued)

(52) U.S. Cl.
CPC ............. *H01M 4/78* (2013.01); *H01M 4/13* (2013.01); *H01M 4/366* (2013.01); *H01M 4/742* (2013.01);
(Continued)

(58) Field of Classification Search
CPC .......... H01M 4/78; H01M 4/13; H01M 4/366; H01M 4/742; H01M 4/80; H01M 10/0525;
(Continued)

(56) References Cited

U.S. PATENT DOCUMENTS

| 528,647 A | 11/1894 | Reed |
|---|---|---|
| 990,069 A | 4/1911 | Sessions |

(Continued)

FOREIGN PATENT DOCUMENTS

| CN | 1555588 | 12/2004 |
|---|---|---|
| CN | 1670989 | 9/2005 |

(Continued)

OTHER PUBLICATIONS

Angulakshmi et al. (Aug. 23, 2013) "MgAlSi06.-incorporated poly-(ethylene oxide)-based electrolytes for all-solid-state lithium Batteries,"Ionics. 20:151-156.
(Continued)

*Primary Examiner* — Stewart A Fraser
(74) *Attorney, Agent, or Firm* — Leydig, Voit & Mayer, Ltd.

(57) ABSTRACT

Provided herein are three-dimensional ion transport networks and current collectors for electrodes of electrochemical cells. Exemplary electrodes include interconnected layers and channels including an electrolyte to facilitate ion transport. Exemplary electrodes also include three dimensional current collectors, such as current collectors having electronically conducting rods, electronically conducting layers or a combination thereof.

23 Claims, 64 Drawing Sheets

Related U.S. Application Data division of application No. 15/368,406, filed on Dec. 2, 2016, now Pat. No. 10,340,528.

(60) Provisional application No. 62/415,201, filed on Oct. 31, 2016, provisional application No. 62/350,822, filed on Jun. 16, 2016, provisional application No. 62/346,712, filed on Jun. 7, 2016, provisional application No. 62/346,272, filed on Jun. 6, 2016, provisional application No. 62/326,164, filed on Apr. 22, 2016, provisional application No. 62/324,718, filed on Apr. 19, 2016, provisional application No. 62/262,185, filed on Dec. 2, 2015.

(51) Int. Cl.
| | | |
|---|---|---|
| *H01M 4/80* | (2006.01) | |
| *H01M 10/054* | (2010.01) | |
| *H01M 10/0565* | (2010.01) | |
| *H01M 12/08* | (2006.01) | |
| *H01M 50/443* | (2021.01) | |
| *H01M 4/36* | (2006.01) | |
| *H01M 4/74* | (2006.01) | |
| *H01M 10/0525* | (2010.01) | |

(52) U.S. Cl.
CPC ............ *H01M 4/80* (2013.01); *H01M 10/054* (2013.01); *H01M 10/0525* (2013.01); *H01M 10/0565* (2013.01); *H01M 12/08* (2013.01); *H01M 50/443* (2021.01); *Y02E 60/10* (2013.01)

(58) Field of Classification Search
CPC . H01M 10/054; H01M 10/0565; H01M 12/08
See application file for complete search history.

(56) References Cited

U.S. PATENT DOCUMENTS

| | | |
|---|---|---|
| 2,673,230 A | 3/1954 | Brennan |
| 3,168,458 A | 2/1965 | Sprague |
| 3,275,478 A | 9/1966 | Rosser et al. |
| 3,342,717 A | 9/1967 | Leduc |
| 3,351,495 A | 11/1967 | Wayne et al. |
| 3,553,019 A | 1/1971 | Bushrod et al. |
| 3,607,422 A | 9/1971 | Moran |
| 3,639,173 A | 2/1972 | Stachurski |
| 3,970,472 A | 7/1976 | Steffensen |
| 3,972,795 A | 8/1976 | Goens et al. |
| 4,041,211 A | 8/1977 | Wiacek |
| 4,052,539 A | 10/1977 | Shropshire et al. |
| 4,346,152 A | 8/1982 | Sammells et al. |
| 4,349,614 A | 9/1982 | Werth et al. |
| 4,438,185 A | 3/1984 | Taskier |
| 4,786,567 A | 11/1988 | Skyllas-kazacos et al. |
| 4,871,428 A | 10/1989 | Misra et al. |
| 4,981,672 A | 1/1991 | De neufville et al. |
| 5,089,455 A | 2/1992 | Ketcham et al. |
| 5,227,260 A | 7/1993 | Rose et al. |
| 5,384,211 A | 1/1995 | Choi et al. |
| 5,487,959 A | 1/1996 | Koksbang |
| 5,510,209 A | 4/1996 | Abraham et al. |
| 5,554,464 A | 9/1996 | Stempin et al. |
| 5,601,951 A | 2/1997 | Johnson et al. |
| 5,714,283 A | 2/1998 | Briscoe et al. |
| 5,952,120 A | 9/1999 | Yu et al. |
| 6,022,637 A | 2/2000 | Wilson |
| 6,074,776 A | 6/2000 | Mao et al. |
| 6,096,456 A | 8/2000 | Takeuchi et al. |
| 6,146,786 A | 11/2000 | Stadnick et al. |
| 6,306,540 B1 | 10/2001 | Hiroi et al. |
| 6,335,115 B1 | 1/2002 | Meissner |
| 6,372,379 B1 | 4/2002 | Samil et al. |
| 6,383,675 B1 | 5/2002 | Zhong |
| 6,423,436 B1 | 7/2002 | George et al. |
| 6,432,586 B1 | 8/2002 | Zhang |
| 6,444,339 B1 | 9/2002 | Eshraghi |
| 6,447,958 B1 | 9/2002 | Shinohara et al. |
| 6,489,055 B1 | 12/2002 | Lchihashi et al. |
| 6,509,119 B1 | 1/2003 | Kobayashi et al. |
| 6,602,593 B1 | 8/2003 | Callahan et al. |
| 6,770,401 B1 | 8/2004 | Clough |
| 6,781,817 B2 | 8/2004 | Andelman |
| 6,802,917 B1 | 10/2004 | Tomantschger et al. |
| 6,830,849 B2 | 12/2004 | Lee et al. |
| 6,852,446 B2 | 2/2005 | Barbarich |
| 6,869,727 B2 | 3/2005 | Slezak |
| 7,282,295 B2 | 10/2007 | Visco et al. |
| 7,282,296 B2 | 10/2007 | Visco et al. |
| 7,390,591 B2 | 6/2008 | Visco et al. |
| 7,425,387 B2 | 9/2008 | Bohnstedt |
| 7,553,584 B2 | 6/2009 | Chiang et al. |
| 7,618,748 B2 | 11/2009 | Nathan et al. |
| 7,642,012 B2 | 1/2010 | Djian et al. |
| 7,662,510 B2 | 2/2010 | Zhang |
| 7,811,507 B2 | 10/2010 | Wechs et al. |
| 7,846,571 B2 | 12/2010 | Christensen et al. |
| 7,951,480 B1 | 5/2011 | Skinlo et al. |
| 7,985,337 B2 | 7/2011 | Heuser et al. |
| 8,017,260 B2 | 9/2011 | Kaneta et al. |
| 8,048,556 B2 | 11/2011 | Davis et al. |
| 8,110,301 B2 | 2/2012 | Lacovangelo et al. |
| 8,119,269 B2 | 2/2012 | Ramasubramanian et al. |
| 8,119,273 B1 | 2/2012 | Gerald, II et al. |
| 8,202,649 B2 | 6/2012 | Visco et al. |
| 8,216,712 B1 | 7/2012 | Ramasubramanian et al. |
| 8,288,034 B2 | 10/2012 | Davis et al. |
| 8,697,290 B2 | 4/2014 | Babinec et al. |
| 8,703,356 B2 | 4/2014 | Hayashi |
| 9,112,212 B1 | 8/2015 | Fasching et al. |
| 9,379,368 B2 | 6/2016 | Roumi |
| 9,590,228 B1 | 3/2017 | Wang et al. |
| 9,658,292 B2 | 5/2017 | Roumi et al. |
| 9,692,056 B1 | 6/2017 | Liu et al. |
| 9,831,043 B2 | 11/2017 | Roumi et al. |
| 10,340,528 B2 | 7/2019 | Roumi et al. |
| 2001/0028977 A1 | 10/2001 | Kazacos et al. |
| 2001/0041295 A1 | 11/2001 | Vallee et al. |
| 2002/0150818 A1 | 10/2002 | Amatucci et al. |
| 2002/0160263 A1 | 10/2002 | Corrigan et al. |
| 2003/0013015 A1 | 1/2003 | Klein et al. |
| 2003/0096147 A1 | 5/2003 | Badding et al. |
| 2003/0099884 A1 | 5/2003 | Chiang et al. |
| 2004/0011661 A1 | 1/2004 | Bradford et al. |
| 2004/0018431 A1 | 1/2004 | Gozdz et al. |
| 2004/0126653 A1 | 7/2004 | Visco et al. |
| 2004/0175626 A1 | 9/2004 | Dasgupta et al. |
| 2004/0234862 A1 | 11/2004 | Macglashan et al. |
| 2004/0241540 A1 | 12/2004 | Tsutsumi et al. |
| 2005/0074671 A1 | 4/2005 | Sugiyama et al. |
| 2005/0095504 A1 | 5/2005 | Kim et al. |
| 2005/0158615 A1 | 7/2005 | Samuel et al. |
| 2005/0175894 A1 | 8/2005 | Visco et al. |
| 2005/0186469 A1 | 8/2005 | De jonghe et al. |
| 2005/0208383 A1 | 9/2005 | Totsuka et al. |
| 2006/0121342 A1 | 6/2006 | Sano et al. |
| 2006/0154141 A1 | 7/2006 | Salot et al. |
| 2007/0059584 A1 | 3/2007 | Nakano et al. |
| 2007/0117000 A1 | 5/2007 | An et al. |
| 2007/0141432 A1 | 6/2007 | Wang et al. |
| 2007/0166617 A1 | 7/2007 | Gozdz et al. |
| 2007/0190427 A1 | 8/2007 | Carlson et al. |
| 2007/0212603 A1 | 9/2007 | Nathan et al. |
| 2008/0057389 A1 | 3/2008 | Kono et al. |
| 2008/0057399 A1 | 3/2008 | Visco et al. |
| 2008/0107958 A1 | 5/2008 | Kliatzkin |
| 2008/0113261 A1 | 5/2008 | De jonghe et al. |
| 2008/0153000 A1 | 6/2008 | Salot et al. |
| 2008/0241664 A1 | 10/2008 | Nanjundaswamy et al. |
| 2008/0268327 A1 | 10/2008 | Gordon et al. |
| 2008/0274394 A1 | 11/2008 | Schormann et al. |
| 2009/0035664 A1 | 2/2009 | Chiang et al. |
| 2009/0087728 A1 | 4/2009 | Less et al. |

(56) References Cited

U.S. PATENT DOCUMENTS

| | | |
|---|---|---|
| 2009/0087730 A1 | 4/2009 | Kondo et al. |
| 2009/0130504 A1 | 5/2009 | Van Burdine |
| 2009/0189567 A1 | 7/2009 | Joshi et al. |
| 2009/0197170 A1 | 8/2009 | Viavattine |
| 2009/0208834 A1 | 8/2009 | Ramasubramanian et al. |
| 2009/0214956 A1 | 8/2009 | Prieto et al. |
| 2010/0047671 A1 | 2/2010 | Chiang et al. |
| 2010/0090650 A1 | 4/2010 | Yazami et al. |
| 2010/0129699 A1 | 5/2010 | Mikhaylik et al. |
| 2010/0141211 A1 | 6/2010 | Yazami |
| 2010/0203372 A1 | 8/2010 | Kim et al. |
| 2010/0266907 A1 | 10/2010 | Yazami |
| 2011/0027648 A1 | 2/2011 | Long et al. |
| 2011/0065009 A1 | 3/2011 | Lascaud et al. |
| 2011/0097623 A1 | 4/2011 | Marinis et al. |
| 2011/0104521 A1 | 5/2011 | Kishimoto et al. |
| 2011/0117416 A1 | 5/2011 | Arora et al. |
| 2011/0123850 A1 | 5/2011 | Duong et al. |
| 2011/0123875 A1 | 5/2011 | Issaev et al. |
| 2011/0143207 A1 | 6/2011 | Arora et al. |
| 2011/0143217 A1 | 6/2011 | Arora et al. |
| 2011/0151332 A1 | 6/2011 | Morgan et al. |
| 2011/0159373 A1 | 6/2011 | Conner et al. |
| 2011/0159374 A1 | 6/2011 | Conner et al. |
| 2011/0171514 A1 | 7/2011 | Nishikawa et al. |
| 2011/0171518 A1 | 7/2011 | Dunn et al. |
| 2011/0183186 A1 | 7/2011 | Klootwijk et al. |
| 2011/0197435 A1 | 8/2011 | Kaneko et al. |
| 2011/0200848 A1 | 8/2011 | Chiang et al. |
| 2011/0217585 A1 | 9/2011 | Wang et al. |
| 2011/0217586 A1 | 9/2011 | Kim et al. |
| 2011/0217588 A1 | 9/2011 | Roh et al. |
| 2011/0227243 A1 | 9/2011 | Kepler et al. |
| 2011/0236744 A1 | 9/2011 | Kim et al. |
| 2011/0256443 A1 | 10/2011 | Park et al. |
| 2011/0281152 A1* | 11/2011 | He ................. H01M 4/742 429/159 |
| 2011/0281176 A1 | 11/2011 | Seymour |
| 2011/0293976 A1 | 12/2011 | Chiba et al. |
| 2012/0015229 A1 | 1/2012 | Ohashi et al. |
| 2012/0015232 A1 | 1/2012 | Teshima et al. |
| 2012/0028101 A1 | 2/2012 | Ishihara et al. |
| 2012/0034508 A1 | 2/2012 | Davis et al. |
| 2012/0043940 A1 | 2/2012 | Affinito et al. |
| 2012/0077095 A1* | 3/2012 | Roumi ................. H01M 8/0247 429/405 |
| 2012/0094188 A1 | 4/2012 | Visco et al. |
| 2012/0094194 A1 | 4/2012 | Visco et al. |
| 2012/0119155 A1 | 5/2012 | Liu et al. |
| 2012/0183868 A1 | 7/2012 | Tousaint et al. |
| 2012/0219842 A1 | 8/2012 | Visco et al. |
| 2012/0244412 A1 | 9/2012 | Pascaly et al. |
| 2012/0263986 A1 | 10/2012 | Fulop et al. |
| 2012/0270088 A1 | 10/2012 | Huang et al. |
| 2012/0270112 A1 | 10/2012 | Visco et al. |
| 2013/0017432 A1 | 1/2013 | Roumi |
| 2013/0089795 A1 | 4/2013 | Chase et al. |
| 2013/0130131 A1 | 5/2013 | Johnson et al. |
| 2013/0189592 A1 | 7/2013 | Roumi et al. |
| 2013/0260205 A1 | 10/2013 | Kwon et al. |
| 2013/0323609 A1 | 12/2013 | Suto |
| 2014/0205883 A1 | 7/2014 | Wang et al. |
| 2014/0272533 A1 | 9/2014 | Shi et al. |
| 2014/0329120 A1 | 11/2014 | Cui et al. |
| 2015/0104714 A1* | 4/2015 | Galande ................. H01M 4/72 429/233 |
| 2015/0171398 A1 | 6/2015 | Roumi |
| 2015/0180000 A1 | 6/2015 | Roumi |
| 2015/0357635 A1 | 12/2015 | Jito et al. |
| 2015/0364753 A1 | 12/2015 | Chiang et al. |
| 2016/0013463 A1 | 1/2016 | Roumi et al. |
| 2016/0190833 A1 | 6/2016 | Roumi et al. |
| 2016/0254514 A1 | 9/2016 | Roumi |
| 2017/0108552 A1 | 4/2017 | Roumi et al. |
| 2017/0315178 A1 | 11/2017 | Roumi et al. |
| 2018/0137991 A1 | 5/2018 | Roumi et al. |

FOREIGN PATENT DOCUMENTS

| | | |
|---|---|---|
| CN | 1726608 | 1/2006 |
| CN | 101641815 | 2/2010 |
| CN | 101809801 | 8/2010 |
| CN | 102117905 | 7/2011 |
| CN | 103647107 | 3/2014 |
| EP | 0 555 978 | 8/1993 |
| EP | 1 271 673 | 1/2003 |
| EP | 1 435 673 | 7/2004 |
| EP | 2 639 855 | 9/2013 |
| GB | 320916 | 10/1929 |
| JP | S40-001456 | 1/1965 |
| JP | S49-122476 | 10/1974 |
| JP | S62-291871 | 12/1987 |
| JP | S63-155552 | 6/1988 |
| JP | 08-236093 | 9/1996 |
| JP | 09-092254 | 4/1997 |
| JP | H09-153354 | 6/1997 |
| JP | H10106521 | 4/1998 |
| JP | 2005525674 | 8/2005 |
| JP | 2005-259566 | 9/2005 |
| JP | 2005-268095 | 9/2005 |
| JP | 2006-019146 | 1/2006 |
| JP | 2006-503416 | 1/2006 |
| JP | 2006-066355 | 3/2006 |
| JP | 2006185917 | 7/2006 |
| JP | 2006-286427 | 10/2006 |
| JP | 2008159589 | 7/2008 |
| JP | 2009105063 | 5/2009 |
| JP | 2010-238421 | 10/2010 |
| JP | 2010534389 | 11/2010 |
| JP | 2011512010 | 4/2011 |
| JP | 2011-124104 | 6/2011 |
| JP | 2011-222215 | 11/2011 |
| KR | 10-1375422 | 3/2014 |
| WO | WO 1997/006569 | 2/1997 |
| WO | WO 03/012908 | 2/2003 |
| WO | WO 2005/036681 | 4/2005 |
| WO | WO 2008/019398 | 2/2008 |
| WO | WO 2008/049040 | 4/2008 |
| WO | WO 2008/153749 | 12/2008 |
| WO | WO 2010/007579 | 1/2010 |
| WO | WO 2010/054261 | 5/2010 |
| WO | WO 2010/062391 | 6/2010 |
| WO | WO 2011/070712 | 6/2011 |
| WO | WO 2012/034042 | 3/2012 |
| WO | WO 2013/009750 | 1/2013 |
| WO | WO 2013/154623 | 10/2013 |
| WO | WO 2014/119274 | 8/2014 |
| WO | WO 2014/119275 | 8/2014 |
| WO | WO 2014/152650 | 9/2014 |
| WO | WO 2014/156891 | 10/2014 |
| WO | WO 2015/074037 | 5/2015 |
| WO | WO 2015/074065 | 5/2015 |
| WO | WO 2015/157339 | 10/2015 |
| WO | WO 2016/100919 | 6/2016 |
| WO | WO 2017/059351 | 4/2017 |

OTHER PUBLICATIONS

Arora et al. (2004) "Battery Separators." Chem. Rev., 104, 4419-4462.

Aurbach et al. (2002) "A short review of failure mechanisms of lithium metal and lithiated graphite anodes in liquid electrolyte solutions."Solid State Ionics, 148, 405-416.

Bruce et al. (Published online Dec. 15, 2012) ""Li-O2 and Li-S Batteries with High Energy Storage,"" Nature Materials. 11 :19-29.

Cheng et al. (Published online Jan. 17, 2012) "Metal-Air Batteries: From Oxygen Reduction Electrochemistry to Cathode Catalysts," Chem. Soc. Rev. 41:2172-2192.

Christensen et al. (Dec. 29, 2011) "A Critical Review of Li/Air Batteries," J. Electrochem. Soc. 159(2):R1-R30.

(56) References Cited

OTHER PUBLICATIONS

Communication Pursuant to Rules 161(2) and 162 EPC, dated Apr. 18, 2013, corresponding to European Patent Application No. 11 824 190.0, 2 pp.
Croce et al. (2001) "Role of the ceramic fillers in enhancing the transport properties of composite polymer electrolytes," Electrochimica Acta. 46:2457-2461.
Duduta et al. (2011) "Semi-Solid Lithium Rechargeable Flow Battery," Advanced Energy Materials. 1 (4):511-516.
Extended European Search Report, dated Feb. 26, 2018, in European Patent Application No. 11 824 190.0, 8 pp.
Goodenough (Published Online May 8, 2012) "Rechargeable Batteries: Challenges Old and New," J. Solid State Electrochem. 16:2019-2029.
Gowda et al. (Feb. 7, 2012) "3D Nanoporous Nanowire Current Collectors for Thin Film Microbatteries," Nano. Lett.12(3):1198-1202.
Hamelet et al. (Jul. 20, 2012) "Non-aqueous Li-Based Redox Flow Batteries," J. Electrochem. Soc. 159(8):A1360-A1367.
Intention to Grant European Patent, dated Dec. 11, 2019, corresponding to EP Patent Application No. 11 824 190.0, 5 pp.
International Search Report and Written Opinion dated Apr. 30, 2012, for International Application No. PCT/US2011/051041.
International Search Report and Written Opinion dated Jan. 29, 2013, for International Application No. PCT/US2012/046067.
International Search Report and Written Opinion dated Jun. 27, 2013, corresponding to International Application No. PCT/US/2013/021043.
International Search Report with Written Opinion corresponding to International Patent Application No. PCT/US2014/066200, dated Feb. 12, 2015.
International Search Report with Written Opinion corresponding to International Patent Application No. PCT/US2014/066113, dated Feb. 19, 2015.
International Search Report with Written Opinion corresponding to International Patent Application No. PCT/US2015/024787, dated Jul. 16, 2015.
International Search Report and Written Opinion, Corresponding to International Application No. PCT/US2016/064763, dated Mar. 13, 2017.
Jung et al. (Published online Jun. 10, 2012) "An Improved High-Performance Lithium-Air Battery," Nature Chemistry. 4:579-585.
Kichambare et al. (Jan. 2012) "Mesoporous Nitrogen-Doped Carbon-Glass Ceramic for Solid-State Lithium-Oxygen Batteries," ACS Appl. Mater. Interfaces. 4(1 ):49-52.
Kumar et al. (2010) "A Solid-State, Rechargeable, Long Cycle Life Lithium-Air Battery," Journal of the Electrochemical Society, 157, 1, A50-A54.
Lee et al. (Aug. 18, 2014) "A review of recent developments in membrane separators for rechargeable lithium-ion batteries," Energy and Environmental Science. 7:3857-3886.
Li et al. (Jan. 2012) "A Dual-Electrolyte Rechargeable Li-Air Battery with Phosphate Buffer Catholyte," Electrochemistry Communications. 14(1):78-81.
Li et al. (May 16, 2013) "The pursuit of rechargeable solid-state Li-air batteries," Energy and Environmental Science. 6:2302-2311.
Long et al. (2004) "Three-Dimensional Battery Architectures," Chem. Rev. 104:4463-4492.
Lu et al. (2011) "Aqueous Cathode for Next-Generation Alkali-Ion Batteries," J. Am. Chem. Soc. 133(15):5756-5759.
Lu et al. (2011) "Rechargeable-Ion Cathode-Flow Battery," J. Mater. Chem. 21:10113-10117.
Nazri (2003) "Liquid Electrolytes: Some Theoretical and Practical Aspects." Chapter 17 in Lithium Batteries Science and Technology, Kluwer Academic Publishers.
Notice of Allowance with English translation dated Apr. 13, 2018, corresponding to Korean Patent Application No. Oct. 2013-7007963, 4 pp.
Notification of Reasons for Refusal dated Aug. 18, 2015, corresponding to Japanese Patent Application No. 2013-528339 (Japanese and English).
Notification of Reasons for Refusal dated Jul. 5, 2016, corresponding to Japanese Patent Application No. 2013-528339 (Japanese and English).
Notice of Allowance corresponding to U.S. Appl. No. 13/738,835, dated Mar. 2, 2016.
Notice of Allowance corresponding to Chinese Patent Application No. 201280033561.0, dated Aug. 30, 2016—with English translation.
Notice of Allowance corresponding to U.S. Appl. No. 13/229,479, dated Jul. 7, 2017.
Notice of Allowance corresponding to U.S. Appl. No. 15/148,278, dated Jul. 20, 2017.
Notice to File Response (Office Action) dated Sep. 22, 2017, for Korean Patent Application No. 10-2013-7007963.
Notification to Go Through Registration Formalities dated Oct. 27, 2015, corresponding to Chinese Patent Application No. 201180042861.0 (Chinese and English).
Office Action dated Sep. 10, 2014 for Chinese Application No. 201180042861.0 and partial English translation.
Office Action dated Sep. 26, 2014, corresponding to U.S. Appl. No. 13/229,479.
Office Action dated Apr. 10, 2015, corresponding to Chinese Patent Application No. 201180042861.0 (Chinese and English).
Office Action corresponding to Chinese Patent Application No. 201280033561.0, dated Jun. 8, 2015—with English translation.
Office Action corresponding to U.S. Appl. No. 13/738,835, dated Aug. 3, 2015.
Office Action dated Aug. 13, 2015, corresponding to U.S. Appl. No. 13/229,479.
Office Action dated Aug. 28, 2015, corresponding to U.S. Appl. No. 13/724,479.
Office Action corresponding to U.S. Appl. No. 13/545,683, dated Nov. 23, 2015.
Office Action corresponding to European Patent Application No. 12811935.1, dated Dec. 1, 2015.
Office Action corresponding to Chinese Patent Application No. 201280033561.0, dated Jan. 4, 2016—with English summary.
Office Action corresponding to Chinese Patent Application No. 201380030525.3, dated Apr. 1, 2016—with English summary.
Office Action dated Apr. 4, 2016, corresponding to U.S. Appl. No. 13/724,479.
Office Action dated May 19, 2016,corresponding to U.S. Appl. No. 13/229,479.
Office Action corresponding to Japanese Patent Application No. 2014-520250, dated Aug. 16, 2016—with English translation.
Office Action dated Oct. 7, 2016, corresponding to U.S. Appl. No. 13/724,479.
Office Action corresponding to U.S. Appl. No. 15/148,278, dated Oct. 18, 2016.
Office Action corresponding to U.S. Appl. No. 13/545,683, dated Dec. 1, 2016.
Office Action corresponding to Japanese Patent Application No. 2015-505702, dated Jan. 10, 2017—with English translation.
Office Action corresponding to U.S. Appl. No. 15/148,278, dated Feb. 9, 2017.
Office Action corresponding to Chinese Patent Application No. 201380030525.3, dated Feb. 16, 2017—with English summary.
Office Action corresponding to U.S. Appl. No. 14/546,472, dated Mar. 17, 2017.
Office Action corresponding to European Patent Application No. 12811935.1, dated Mar. 28, 2017.
Office Action corresponding to U.S. Appl. No. 14/680,997, dated Apr. 21, 2017.
Office Action dated Jul. 27, 2017, corresponding to U.S. Appl. No. 13/724,479.
Office Action corresponding to Japanese Patent Application No. 2014-520250, dated Aug. 1, 2017—with English translation.
Office Action corresponding to Japanese Patent Application No. 2015-505702, dated Sep. 5, 2017—with English translation.

(56) References Cited

OTHER PUBLICATIONS

Office Action corresponding to U.S. Appl. No. 13/545,683, dated Oct. 5, 2017.
Office Action corresponding to U.S. Appl. No. 14/546,953, dated Oct. 12, 2017.
Office Action corresponding to Chinese Patent Application No. 201380030525.3, dated Nov. 16, 2017—with English summary.
Office Action dated Jan. 25, 2018, corresponding to U.S. Appl. No. 13/724,479.
Office Action dated Oct. 19, 2018, corresponding to U.S. Appl. No. 13/724,479.
Office Action dated Jul. 11, 2019, corresponding to U.S. Appl. No. 13/724,479.
Office Action dated Mar. 5, 2020, corresponding to U.S. Appl. No. 13/724,479.
Office Action dated Aug. 6, 2020, corresponding to U.S. Appl. No. 15/783,768.
Peng et al. (Aug. 3, 2012) "A Reversible and Higher-Rate Li-O2 Battery," Science. 337 ( 6094) :563-566.
Pu et al. (2006) "Preparation of PVDF-HFP microporous membrane for Li-ion batteries by phase inversion." Journal of Membrane Science, (272) 1-2, 11-14.
Raja et al. (Dec. 1, 2014) "Thin, flexible and thermally stable ceramic membranes as separator for lithium-ion batteries," J. Membrane Sci. 471:103-109.
Roberts et al. (2011) "3D Lithium Ion Batteries—From Fundamentals to Fabrication," J. Mater. Chem. 21: 9876-9890.
Roumi (2010) "Shape changing transformations: Interactions with plasticity and electrochemical processes," Dissertation (Ph.D.), California Institute of Technology.
Scrosati (2007) "Nanomaterials: Paper powers battery breakthrough." Nature Nanotechnology 2, 598-599.
Search Report corresponding to European Patent Application No. 12811935.1, dated Mar. 9, 2015.
Search Report corresponding to European Patent Application No. 13775922.1, dated Feb. 1, 2016.
Search Report corresponding to European Patent Application No. 13775922.1, dated Jun. 15, 2016.
Seel et al. (2000) "Electrochemical Intercalation of PF6 into Graphite," Journal of Electrochemical Society, 147(3) 892-898.
Shao et al. (Published online Apr. 6, 2012) "Electrocatalysts for Nonaqueous Lithium-Air Batteries: Status, Challenges, and Perspective," ACS Catal. 2(5):844-857.
Shi et al. (Aug. 6, 2014) "Single ion solid-state composite electrolytes with high electrochemical stability based on a poly(perfluoroalkylsulfonyl)-imide ionene polymer," J. Mater. Chem. A. 2:15952-15957.
Silicon and carbon nanotubes. Available at http://cheaptubes.com. Accessed Dec. 27, 2016.
Silicon and carbon nanotubes. Available at http://www.oulu.fi/infotech/. Accessed Dec. 27, 2016.
Silicon on porous metal substrate. Available at http://www.mtixtl.com/copperfoil.aspx. Accessed Dec. 27, 2016.
Silicon rod growth. Available at http://www.nexeon.co.uk/. Accessed Dec. 27, 2016.
Silicon rod growth. Available at http://www.amprius.com/. Accessed Dec. 27, 2016.

Sun et al. (Feb. 2012) "Graphene Nanosheets as Cathode Catalysts for Lithium-Air Batteries with an Enhanced Electrochemical Performance," Carbon. 50(2):727-733.
Tan et al. (Published Online Jul. 1, 2012) "Synthesis and Characterization of Biphenyl-Based Lithium Solvated Electron Solutions," J. Phys. Chem. B 116(30):9056-9060.
Tarascon et al. (2001) "Issues and challenges facing rechargeable lithium batteries", Nature (414) 359-367.
Thakur et al. (2012) ""Freestanding Macroporous Silicon and Pyrolyzed Polyacrylonitrile as a Composite Anode for Lithium Ion Batteries."" Chem. Mater., 24 (15), p. 2998-3003.
Tu et al. (Feb. 11, 2015) "A Dendrite-Free Lithium Metal Battery Model Based on Nanoporous Polymer/Ceramic Composite Electrolytes and High Energy Electrodes," Small. 11(22):2631-2635.
Wang et al. (2014). "Silicon Decorated Cone Shaped Carbon Nanotube Clusters for Lithium Ion Battery Anodes.""Small, 10 (16), 2014, p. 3389-3396".
Weber et al. (2011) "Redox Flow Batteries: a Review," J. Appl. Electrochem. 41:1137-1164.
Wiesler (1996) "Membrane Contactors: an Introduction to the Technology," UltraPure Water—UP130427: 27-31.
Xu (2004) "Nonaqueous Liquid Electrolytes for Lithium-Based Rechargeable Batteries," Chemical Reviews 2004, 104, 4303-4417.
Zadin (May 08, 2012) ""Modeling the 3-D Microbattery,"" University of Tartu http://dspace.utlib.ee/dspace/handle/10062/25375 [Accessed Jun. 26, 2013].
Zhang, S. (2007) "A review on the separators of liquid electrolyte Li-ion batteries." Journal of Power Sources, 164(1) 351-364.
Zheng et al. (Feb. 8, 2013) "Amphiphilic Surface Modification of Hollow Carbon Nanofibers for Improved Cycle Life of Lithium Sulfur Batteries," Nano Lett. 13(3):1265-1270.
Zhong et al. (Published online Dec. 5, 2011) "High-Capacity Silicon-Air Battery in Alkaline Solution," ChemSusChem. 5:177-180.
U.S. Appl. No. 13/229,479, filed Sep. 9, 2011.
U.S. Appl. No. 13/545,683, filed Jul. 10, 2012.
U.S. Appl. No. 13/724,479, filed Dec. 21, 2012.
U.S. Appl. No. 13/738,835, filed Jan. 10, 2013.
U.S. Appl. No. 14/211,381, filed Mar. 14, 2014.
U.S. Appl. No. 14/546,472, filed Nov. 18, 2014.
U.S. Appl. No. 14/546,953, filed Nov. 18, 2014.
U.S. Appl. No. 14/680,997, filed Apr. 7, 2015.
U.S. Appl. No. 14/975,336, filed Dec. 18, 2015.
U.S. Appl. No. 15/148,278, filed May 6, 2016.
U.S. Appl. No. 15/282,982, filed Sep. 30, 2016.
U.S. Appl. No. 15/368,406, filed Dec. 2, 2016.
U.S. Appl. No. 15/484,403, filed Apr. 11, 2017.
U.S. Appl. No. 15/783,768, filed Oct. 13, 2017.
U.S. Appl. No. 15/911,020, filed Mar. 2, 2018.
U.S. Appl. No. 15/973,391, filed May 7, 2018.
U.S. Appl. No. 16/379,026, filed Apr. 9, 2019.
U.S. Appl. No. 16/420,675, filed May 23, 2019.
U.S. Appl. No. 16/505,424, filed Jul. 8, 2019.
U.S. Appl. No. 16/872,036, filed May 11, 2020.
U.S. Appl. No. 16/890,326, filed Jun. 2, 2020.
U.S. Appl. No. 15/368,406, Dec. 2, 2016, Patented.
U.S. Appl. No. 16/373,308, filed Apr. 2, 2019, Patented.

* cited by examiner

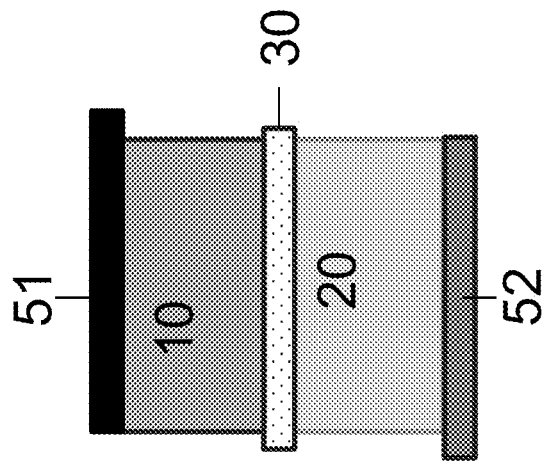
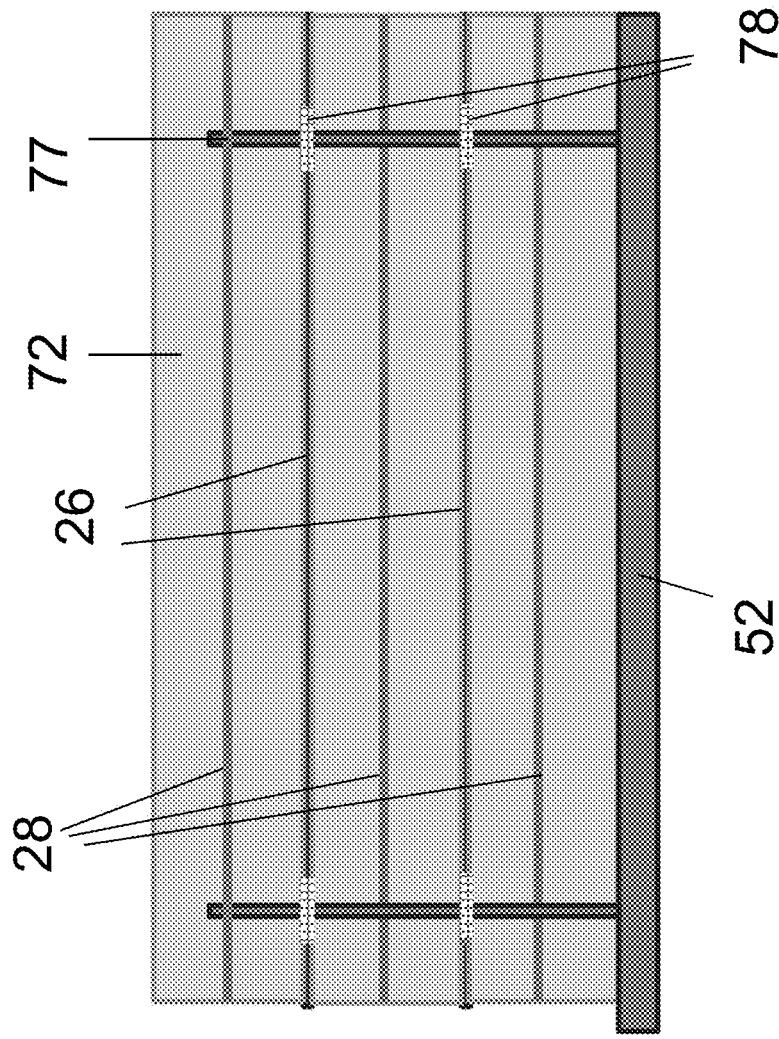
FIG. 9B
FIG. 9A

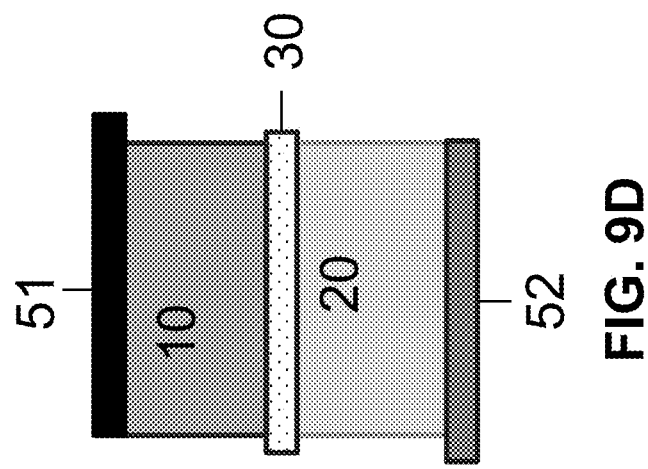
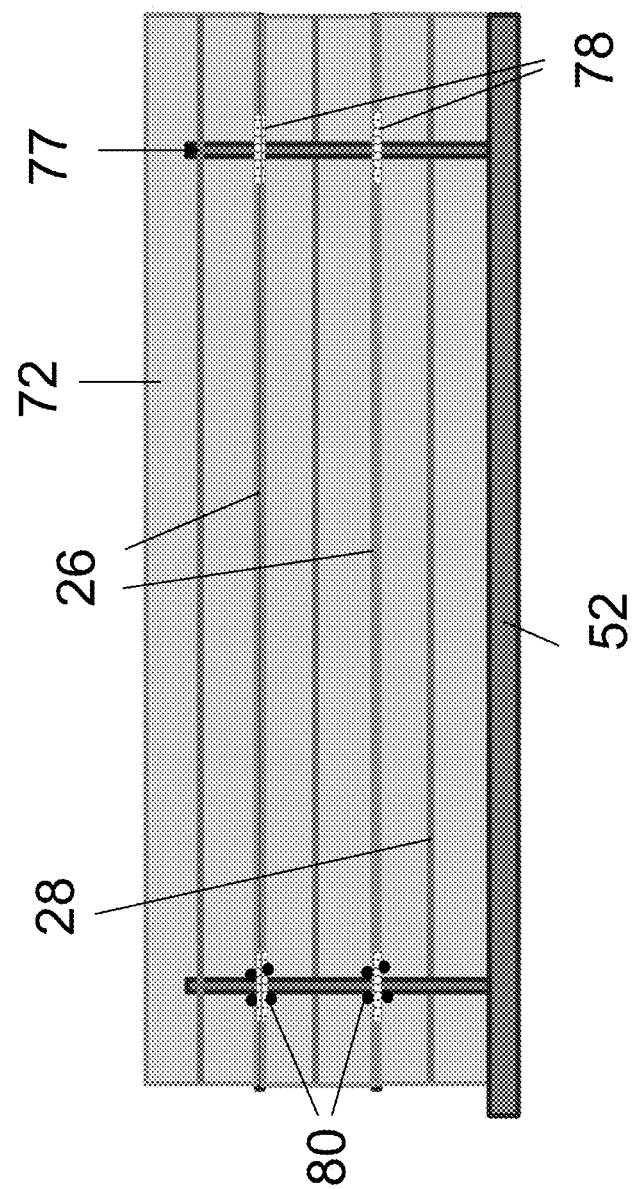
FIG. 9C
FIG. 9D

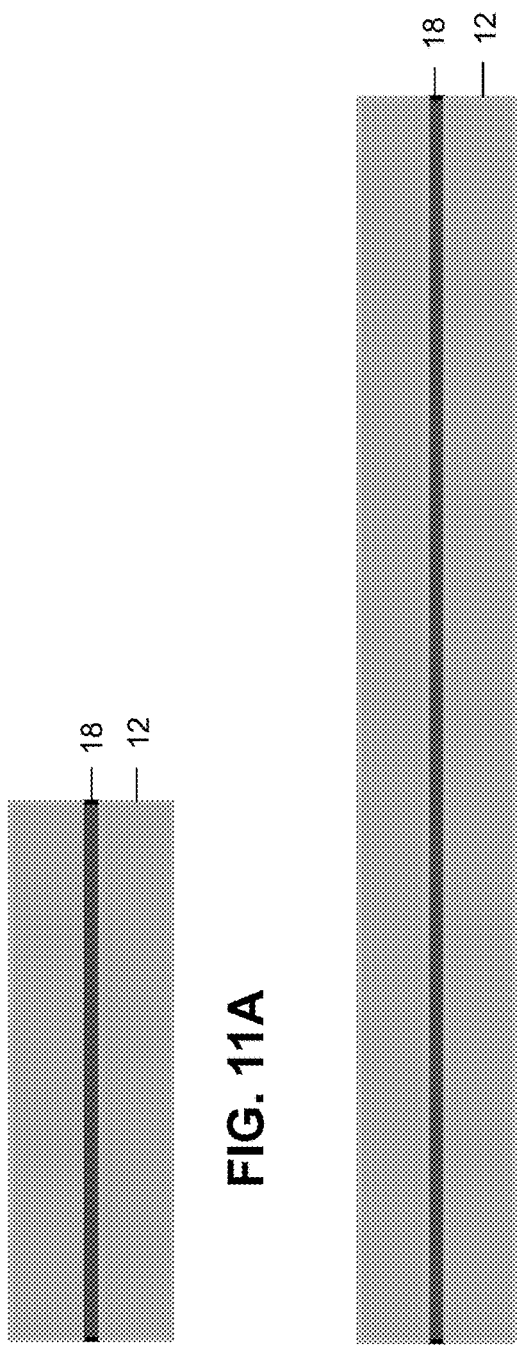
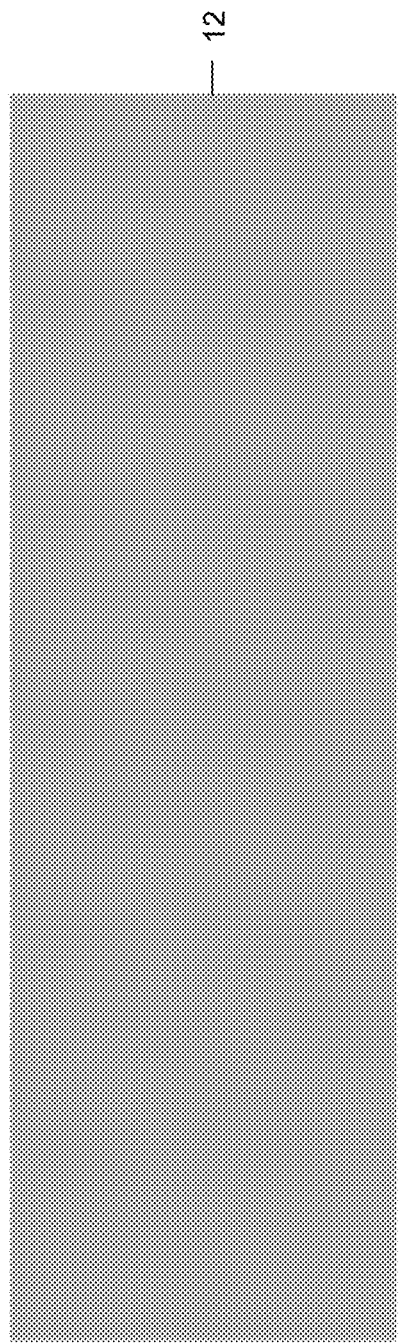
FIG. 11A
FIG. 11B
FIG. 11C

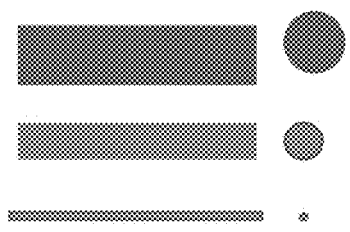
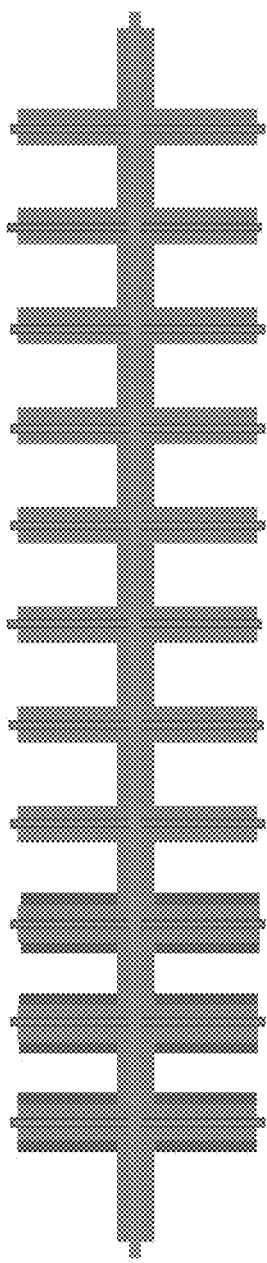
FIG. 28A
FIG. 28B
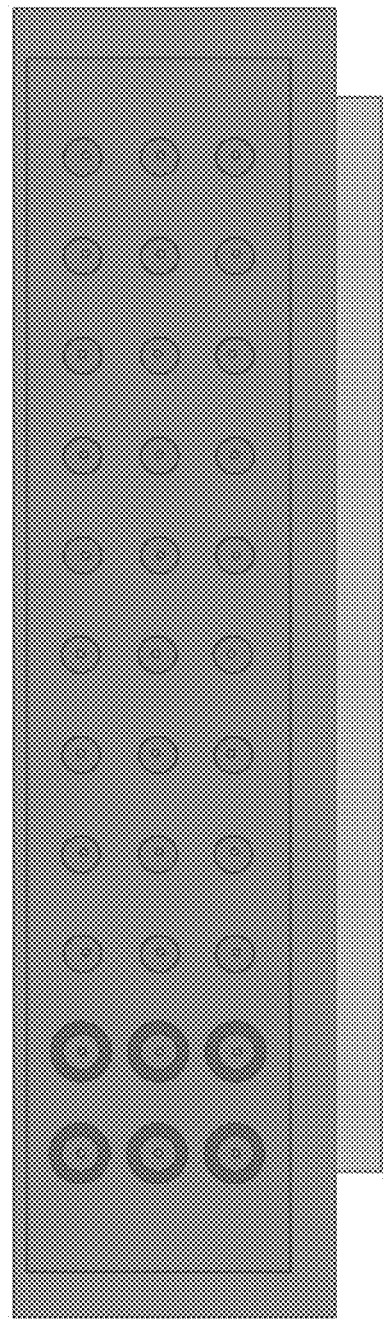
FIG. 28C

THREE-DIMENSIONAL ION TRANSPORT NETWORKS AND CURRENT COLLECTORS FOR ELECTROCHEMICAL CELLS

CROSS-REFERENCE TO RELATED APPLICATIONS

This application is a continuation of U.S. application Ser. No. 16/373,308, filed Apr. 2, 2019, which is a divisional of U.S. application Ser. No. 15/368,406, filed Dec. 2, 2016 (now U.S. Pat. No. 10,340,528, issued Jul. 2, 2019), which claims the benefit of and priority to U. S. Provisional Application Nos. 62/262,185, filed Dec. 2, 2015, 62/326,164, filed Apr. 22, 2016; 62/346,712, filed Jun. 7, 2016; 62/350,822, filed Jun. 16, 2016; 62/324,718, filed Apr. 19, 2016; 62/346,272, filed Jun. 6, 2016; and 62/415,201, filed Oct. 31, 2016, each of which is hereby incorporated by reference in its entirety.

STATEMENT REGARDING FEDERALLY SPONSORED RESEARCH OR DEVELOPMENT

This invention was made with government support under Grant No. DE-EE0006851 awarded by the Department of Energy. The government has certain rights in the invention.

BACKGROUND

Over the last few decades revolutionary advances have been made in electrochemical storage and conversion devices expanding the capabilities of these systems in a variety of fields including portable electronic devices, air and space craft technologies, passenger vehicles and biomedical instrumentation. Current state of the art electrochemical storage and conversion devices have designs and performance attributes that are specifically engineered to provide compatibility with a diverse range of application requirements and operating environments. For example, advanced electrochemical storage systems have been developed spanning the range from high energy density batteries exhibiting very low self-discharge rates and high discharge reliability for implanted medical devices to inexpensive, light weight rechargeable batteries providing long runtimes for a wide range of portable electronic devices to high capacity batteries for military and aerospace applications capable of providing extremely high discharge rates over short time periods.

Despite the development and widespread adoption of this diverse suite of advanced electrochemical storage and conversion systems, significant pressure continues to stimulate research to expand the functionality of these systems, thereby enabling an even wider range of device applications. Large growth in the demand for high power portable electronic products, for example, has created enormous interest in developing safe, light weight primary and secondary batteries providing higher energy densities. In addition, the demand for miniaturization in the field of consumer electronics and instrumentation continues to stimulate research into novel design and material strategies for reducing the sizes, masses and form factors of high performance batteries. Further, continued development in the fields of electric vehicles and aerospace engineering has also created a need for mechanically robust, high reliability, high energy density and high power density batteries capable of good device performance in a useful range of operating environments.

Many recent advances in electrochemical storage and conversion technology are directly attributable to discovery and integration of new materials for battery components. Lithium battery technology, for example, continues to rapidly develop, at least in part, due to the discovery of novel electrode and electrolyte materials for these systems. The element lithium has a unique combination of properties that make it attractive for use in an electrochemical cell. First, it is the lightest metal in the periodic table having an atomic mass of 6.94 AMU. Second, lithium has a very low electrochemical oxidation/reduction potential (i.e., −3.045 V vs. NHE (normal hydrogen reference electrode)). This unique combination of properties enables lithium based electrochemical cells to have very high specific capacities. State of the art lithium ion secondary batteries provide excellent charge-discharge characteristics, and thus, have also been widely adopted as power sources in portable electronic devices, such as cellular telephones and portable computers. U.S. Pat. Nos. 6,852,446, 6,306,540, 6,489,055, and "Lithium Batteries Science and Technology" edited by Gholam-Abbas Nazri and Gianfranceo Pistoia, Kluer Academic Publishers, 2004, are directed to lithium and lithium ion battery systems which are hereby incorporated by reference in their entireties.

Advances in electrode structure and geometry have also recently developed. For example, U.S. Patent Application Publication US 2011/0171518 (Dunn) and International Patent Application publication WO 2010/007579 (Verhaegh) disclose three-dimensional battery structure for solid-state lithium ion batteries. U.S. Pat. No. 7,553,584 and U.S. Patent Application Publication US 2003/0099884 (Chiang) disclose batteries in which the electrodes are formed as complementary structures. U.S. Patent Application Publications US 2012/0077095 and 2013/018959 (Roumi) describe three-dimensional electrode structures. Japanese Patent Application Publication 2006-286427 describes electrode plates containing an internal conductive layer; conduction passages between the internal conductive layer and the charge collector are also shown.

BRIEF SUMMARY OF THE INVENTION

In a first aspect, provided are layered electrodes including a three-dimensional network which provides a low resistance diffusion path for ions inside the electrode. In embodiments the layered electrode comprises a plurality of layers comprising an active material. Further, at least one layer comprising electrolyte is disposed between two layers comprising an active material. For example, a three dimensional network for ion transport through electrolyte is formed by the layer(s) comprising electrolyte and electrolyte containing conduits through the layers comprising an active material.

In some embodiments each layer comprising an active material is separated from each adjacent layer comprising an active material by a layer comprising an electrolyte. In other embodiments, a group of layers comprising an active material is separated from another layer comprising an active material or a group of layers comprising an active material by a layer comprising an electrolyte.

FIG. 1A illustrates an electrochemical cell (1) including anode (10), cathode (20) and separator (30) disposed between the anode and the cathode. Adjacent anode layers comprising an active material (12) are separated by layers comprising electrolyte (16). Similarly, adjacent cathode layers comprising an active material (22) are separated by layers comprising electrolyte (26). Electrolyte-containing conduits in the anode (14) and similar conduits in the cathode (24) are also shown. FIG. 1B shows a top view of the cell and illustrates an exemplary distribution of electrolyte-containing conduits (14) in a layer comprising an active material (12). FIG. 2B illustrates a top view of differently shaped conduits in the forms of slots extending across the width of the electrode (14). In a given electrode, the electrolyte-containing conduits and the layers comprising an electrolyte, which are in ionic communication, form a three dimensional network for ion transport.

A variety of active materials are suitable for use in the electrode layers. In some embodiments, the cathode active material is selected from the group consisting of lithium metal oxides and lithium metal phosphates. In additional embodiments, the anode active material is selected from the group of carbon, silicon, tin, aluminum, germanium or lithium titanate. In embodiments, the thickness of each of the layers comprising an active material is from 10 µm to 150 µm.

In embodiments, the layer comprising electrolyte comprises a solid electrolyte, a gel electrolyte or a liquid electrolyte in a porous spacer material. Solid electrolytes include ceramic and polymer electrolytes. Porous spacer materials include, but are not limited to polymers or metals in porous or mesh form. As an example, the thickness of the spacer is from 0.5 µm to 25 µm thick. In some embodiments, a spacer of this aspect comprises polyethylene, polypropylene, cellulose, pvdf, polyester, PET, polyimides and any combinations thereof.

In embodiments, each electrolyte-containing conduit comprises an electrolyte or an electrolyte in a carrier material filling a perforation or through-hole in the active material layer. As an example, the carrier material is a porous material that does not function as an electrode in the cell. Suitable electrolytes for use with a carrier include liquid electrolytes. Solid or gel electrolytes need not be used with a carrier. In embodiments, the perforation or through-hole is "filled" with the electrolyte or electrolyte in a carrier material when 75% to 100%, 80% to 100%, 90% to 100% or 95% to 100% of the volume of the perforation or through-hole is filled. In further embodiments, each layer comprising an active material comprises a plurality of electrolyte-containing conduits. As examples, the electrolyte-containing conduits are randomly or periodically spaced over the layer comprising an active material. When the electrolyte-containing conduits are periodically spaced the conduits of adjacent layers may be aligned with each other or not. In some embodiments each electrolyte-containing conduit is characterized by a longitudinal axis and conduits of adjacent layers are aligned when the longitudinal axes of the conduits are aligned. The electrolyte-containing conduits are in ionic communication with the layer(s) comprising additional electrolyte. In some embodiments the diameter or characteristic width of the conduits are from 0.5 µm to 500 µm. In further embodiments, the conduits are located from 5 µm to 5 mm apart.

A variety of separator materials are known to the art, including microporous separators, nonwovens and polymer electrolytes. In embodiments, separator comprises one or more electrolytes. Additional materials suitable for use as separators include, solid electrolyte layers that prevent water molecules, $CO_2$, $O_2$ or air from transporting through the separator system (e.g. LISICON or NASICON). Separator thicknesses may range, for example, from 10 nanometers to 10 millimeters or optionally from 1 micrometer to 10 micrometers.

In embodiments, the disclosure provides an electrode comprising
  a. a plurality of layers of a first type comprising an active material, wherein at least two of the layers of the first type include a plurality of ion-conducting conduits, each ion conducting conduit having a longitudinal axis and being filled with an electrolyte or an electrolyte in a porous carrier; and
  b. at least one layer of a second type comprising additional electrolyte wherein each layer of the first type is separated from each adjacent layer of the first type by at least one layer of the second type; wherein the ion-conducting conduits are in ionic communication with at least one layer of the second type.

In an embodiment, the longitudinal axes of at least two of the ion-conducting conduits in adjacent layers of the first type are aligned, for example, such that they extend along alignment axes that overlap or are substantially parallel and/or aligned such that electrolyte may pass and/or ions may be transported from one layer to another. In an embodiment, for example, each of the layers of the first type includes a plurality of ion-conducting conduits and the ion-conducting conduits are positioned so that the longitudinal axis of each ion-conducting conduit is aligned with at least one ion-conducting conduit in an adjacent layer. In an embodiment, for example, each of the layers of the first type includes an array of ion-conducting conduits, the longitudinal axis of each ion conducting conduit of an individual layer of the first type is aligned with the longitudinal axis of an ion-conducting conduit of each of all the other layers of the first type and the longitudinal axes of the ion conducting conduits define an alignment axis. In an embodiment, for example, each of the layers of the first type further includes an aperture, each of the layers of the second type includes an aperture, the apertures are aligned to form a passage through the layers of the first type and the layers of the second type, an electronically conductive material is located within the passage and the electrode further comprises a current collector in electronic communication with the electronically conductive material.

In an embodiment, for example, said electrolyte or said electrolyte in a porous carrier material filling the ion-conducting conduits is a liquid electrolyte. In an embodiment, for example, said electrolyte filling the ion-conducting conduits is a solid or gel electrolyte. In an embodiment, for example, said additional electrolyte of said at least one layer of a second type is a solid or gel electrolyte or is a liquid electrolyte in a porous spacer material.

In further embodiments, an electrode as disclosed herein further comprises layers comprising a current collector, which may also be referred to as current collector layers. In some embodiments, for example, the invention provides current collectors having a three dimensional geometry comprising auxiliary current collector elements, such as one or more auxiliary current collector layers, films, plates, rods, segments, or any combination of these. In embodiments each auxiliary current collector layer is disposed between layers comprising an active material. Generally these auxiliary current collector layers are secondary to the primary current collector which is connected directly to the battery tab outside the battery cell. In embodiments these secondary auxiliary current collector layers are thinner than the primary current collector. Each current collector layer, including primary and auxiliary current collector layers and/or structures is electronically conductive. Current collectors, such as primary and auxiliary current collectors may comprise a variety of conductive materials, including but not limited to, metallic materials, carbon materials, doped materials, conductive polymers, conductive alloys, and combinations thereof. Suitable materials for the current collector layer include metals and alloys. In different examples, the current collector layer is perforated, a mesh or porous. In some embodiments, the thickness of the current collector layer(s) is less than that of the active material layers. For example, the thickness of the auxiliary current collector layer or structure is selected from the range of 1 µm to 15 µm. In embodiments, the area of the current collector layer in contact with the adjacent layers comprising an active material is greater than 30% to less than or equal to 100%, from 40% to 100%, from 50% to 100%, from 60% to 100%, from 70% to 100%, from 80% to 100% or from 90% to 100% of the area of the adjacent layers comprising an active material. In some embodiments the area of the current collector layer is greater than that of the adjacent layers comprising an active material in order to facilitate electronic connection to the current collector layer. In embodiments the layers comprising an active material are formed by forming a coating comprising the active material or active material layer on the auxiliary current collector layer or structure. Alternatively, the invention includes embodiments wherein the auxiliary current collector layer or structure is coated or otherwise formed on the active material, such as the active material layer.

In some embodiments each layer comprising an active material is separated from each adjacent layer comprising an active material by a layer comprising an electrolyte or a layer comprising a current collector. In other embodiments, a group of layers comprising an active material is separated from another layer comprising an active material or a group of layers comprising an active material by a layer comprising an electrolyte or a layer comprising a current collector.

In an embodiment, for example, the layers of the first type comprise 85%-95% active material. In an embodiment, for example, the layers of the first type comprise an LiCoO2 electrode film. In an embodiment, for example, the layers of the first type further comprise a binder, a conductive material, an electrochemical additive, a structural additive or any combination thereof. In an embodiment, for example, the layers of the first type are characterized by a porosity of 20% to 40%. In an embodiment, for example, the porous carrier material has the same composition of the layers of active material and is characterized by a porosity larger than the porosity of the layers of active material. In an embodiment, for example, the porous carrier material is characterized by a porosity equal to or greater than 50%.

In an embodiment, for example, at least one, and optionally all, of the layers of a first type comprises LiCoO2 electrode film. In an embodiment, for example, at least one, and optionally all, of the layers of a first type comprises 90% LiCo2, 5% carbon black and 5% pvdf binder. In an embodiment, for example, at least one, and optionally all, of the layers of a first type is characterized by a porosity equal to 30%. In an embodiment, for example, at least one, and optionally all, of the layers of a first type 92% active material, 5% carbon black and 3% binder.

In an embodiment, for example, the porous carrier layer comprises 95% $TiO_2$ or $SiO_2$ or $Al_2O_3$ and 5% binder. In an embodiment, for example, the porous carrier layer is characterized by a porosity equal to or greater than 50%.

FIG. 3A illustrates an electrochemical cell having a three-dimensional network for ion transport and also having auxiliary current collectors (28) located within the cathode (20). As illustrated, an ion-conducting channel (25) is formed through each pair of layers comprising an active material (22) having a current collector (28) between them. As illustrated anode (10) incorporates a current collector (18). For comparison, FIG. 3B illustrates a multilayer assembly of anode active layers, cathode active layers, separators and primary current collectors.

In embodiments, an ion conducting channel such as that illustrated in FIG. 3A is formed by aligning ion-conducting conduits through the layers comprising an active material with apertures in the layer comprising a current collector. The ion-conducting channel comprises an electrolyte or an electrolyte in a carrier material filling the channel.

In further embodiments, the disclosure provides an electrode comprising
  a. a plurality of layers of a first type comprising an active material, wherein at least two of the layers of a first type include a plurality of ion-conducting conduits, each ion-conducting conduit having a longitudinal axis and being filled with an electrolyte or an electrolyte in a porous carrier;
  b. at least one layer of a second type comprising additional electrolyte;
  c. at least one layer of a third type comprising a current collector, wherein the current collector is perforated, a mesh or porous
  wherein each layer of a first type is separated from each adjacent layer of a first type by at least one layer of a second type or at least one layer of a third type and wherein the ion-conducting conduits are in ionic communication at least one layer of a second type.

In an embodiment, the longitudinal axes of at least two of the ion conducting conduits in adjacent layers of the first type are aligned, for example, such that they extend along alignment axes that overlap or are substantially parallel and/or such that electrolyte may pass from one layer to another. In an embodiment, for example, each of the layers of a first type includes a plurality of ion-conducting conduits and the ion conducting conduits are positioned so that the longitudinal axis of each ion conducting conduit is aligned with at least one ion conducting conduit in an adjacent layer. In an embodiment, for example, each of the layers of a first type includes an array of ion-conducting conduits and the longitudinal axis of each ion-conducting conduit of an individual layer of a first type is aligned with an ion-conducting conduit of each of all the other layers of a first type. In an embodiment, for example, each of the layers of the first type further includes an aperture, each of the layers of the second type includes an aperture and each of the layers of the third type include an aperture, the apertures are aligned to form a passage through the layers of the first type, the second type and the third type, an electronically conductive material is located within the passage and the electronically conductive material is in electronic communication with the at least one layer of a third type.

In additional embodiments at least one passage comprising an electronically conducting material is present in the electrode in addition to the ion-conducting conduits or channels, the electronically conducting material in the passage being in electronic communication with at least one layer comprising a current collector. FIG. 5A schematically illustrates a cell with passages comprising electronically conducting material (15, 17). In different embodiments, the electronically conducting material is in the form of particles or in the form of a rod or pin.

In further embodiments the passages comprising an electronically conducting material are in electronic contact with the primary or main current collector for the electrode, as schematically illustrated by FIG. 5B. Although FIG. 5B illustrates the primary current collectors positioned parallel to the electrode layers and positioned at the "top" and "bottom" of the multilayer stack, in other embodiments the primary current collectors are positioned on the "sides" of the stack as illustrated in FIG. 4B. In further embodiments, the electrode comprises a plurality of passages comprising an electronically conducting material in addition to ion conducting conduits or channels, layers comprising an electrolyte and layers comprising a current collector as schematically illustrated in FIGS. 6A and 6B. In some embodiments, the ratio of the number of passages comprising an electronically conducting material to the number of ion-conducting conduits or channels is from 0.01 to 0.05 (e.g. 1% to 5%), from 0.1 to 10 (e.g. 1% to 10%) or from 0.01 to 0.25 (e.g. 0.1% to 25%). In embodiments, the electronically conducting material in the passages comprises carbon, electronically conductive polymer or a metal. Suitable metals include, but are not limited to Al, Cu, Ni, Ti, Fe and alloys thereof. For example, the metal may be stainless steel.

In additional embodiments at least one passage comprising lithium is present in the electrode in addition to the ion-conducting conduits or channels. In some embodiments an electronic connection to the lithium is also provided. For example, the lithium metal can be used for in situ lithiation, prelithiation or lithium deposit. FIG. 5C shows the passage comprising lithium as being present on the anode side; alternately the passage comprising lithium is present on the cathode side. In some embodiments, the ratio of the number of passages comprising lithium to the number of ion-conducting conduits or channels is from 0.01 to 0.5 (e.g. 1% to 50%).

In an additional aspect, the disclosure provides a three-dimensional network which provides a low resistance diffusion path for electrons inside the electrode. For example, a three dimensional network for electron transport through a current collector assembly is formed by a primary current collector layer for the electrode and at least one auxiliary current collector element. In embodiments, the auxiliary current collector element is a plurality of secondary current collector layers, a plurality of current collector layer segments, a plurality of current collector rods or a combination thereof. As referred to herein, a current collector layer segment has a significantly smaller area that that of the primary current collector layer or of the secondary current collector layer. FIGS. 8A and 8B give an example of the size of a current collector segment (78) relative to that of the primary current collector (52) while FIG. 8C gives an example of the size of the secondary current collector layer (28) relative to that of the primary current collector (52). For consistency with FIGS. 9A and 9B these elements have been labeled as cathode elements. However, in additional embodiments corresponding elements are found in the anode.

Each current collector layer or current collector segment is electronically conductive. Suitable materials for the current collector layer or current collector segment include metals and alloys. In different examples, the current collector layer or current collector layer segment is perforated, a mesh or porous. In examples, the current collector layer or current collector layer segment is perforated to produce apertures for insertion of current collector rods. In some embodiments, the thickness of the current collector layer(s) or current collector segment (s) is less than that of the active material layers. For example, the thickness of the current collector layer or current collector segment is from 1 μm to 100 μm, optionally for some applications 1 μm to 15 μm.]

In embodiments, the area of the current collector layer in contact with the adjacent layers comprising an active material is greater than 30% to less than or equal to 100%, from 40% to 100%, from 50% to 100%, from 60% to 100%, from 70% to 100%, from 80% to 100% or from 90% to 100% of the area of the adjacent layers comprising an active material. In some embodiments the area of the current collector layer is greater than that of the adjacent layers comprising an active material in order to facilitate electronic connection to the current collector layer. In embodiments the layers comprising an active material are formed by forming a coating comprising the active material on the current collector layer.

In embodiments, the area of the current collector layer segment in contact with the adjacent layers comprising an active material is greater than 1% to less than or equal to 15% or from 5% to 15% of the area of the adjacent layers comprising an active material. In some embodiments the current collector layer segments are disposed in layers comprising an electrolyte, as shown in FIGS. 9A and 9B.

FIG. 7A schematically illustrates an electrochemical cell having a three-dimensional network for electron transport. The cathode (20) includes electrode material (72), a plurality of current collector layers (28) and a plurality of current collector rods (77). The current collector layers are in electronic communication with the current collector rods, which in turn are in electronic communication with the primary current collector layer (52). FIG. 7B schematically illustrates another cathode having a three-dimensional network for electron transport. In this cathode the current collector rods (77) do not span the electrode material. In both FIGS. 7A and 7B, the plurality of current collector rods pass through the plurality of current collector layers.

In embodiments, the invention provides an electrode comprising:
  a. an electrode material comprising an active material; and
  b. a current collector assembly comprising
    i. a primary current collector element, wherein the primary current collector element is the form of a layer; and
    ii. at least one auxiliary current collector element selected from the group consisting of: a plurality of current collector layers, a plurality of current collector layer segments, a plurality of current collector rods and combinations thereof.
wherein the at least one auxiliary current collector element is in electronic communication with the primary current collector element. In an embodiment, for example, the primary current collector element is in the form of a sheet or plate.

In further embodiments, the at least one auxiliary current collector element comprises a combination of a plurality of current collector rods and a plurality of current collector layers, wherein each of the plurality of current collector rods is substantially perpendicular to the primary current collector element, each of the plurality of current collector layers is substantially parallel to the primary current collector element, each of the plurality of current collector layers comprises an plurality of apertures and each of the plurality of current collector rods passes through at least one of the apertures of the plurality of current collector layers.

In an embodiment, for example, the auxiliary current collectors are auxiliary thin current collector plates, auxiliary current collector rods or a combination thereof. In an embodiment, for example, the auxiliary current collector plates are attached with the active material mix (e.g., a 100 μm layer comprising 90% LiCoO2, 5% carbon black and 5% pvdf binder, having a porosity of 30%-40%, optionally 30%); either active material mix is coated on the auxiliary. current collector plates (e.g., 30% porosity; similar to as in commercial electrode films where the current collector is in the middle); or the thin auxiliary current collector film may be coated (for example by sputtering or Chemical vapor deposition or physical vapor deposition) on the solid active material mix layer (e.g., a 100 μm layer made of 90% LiCoO2, 5% carbon black and 5% pvdf binder, which is about 30% porous). In this approach, for example, together they form a multilayer film. Stack of the multilayer films with electrolyte between them form an electrode of this aspect of the invention, where the electronic connectivity between the multilayered film is provided by the auxiliary.=current collector rods. In some embodiments there are auxiliary current collector segments, which are placed between the above multilayer films. In an embodiment, a thick, layered electrode may be prepared by stacking commercial electrodes on top of each other, wherein electrolyte runs in the space between the layers and provides improved ionic connectivity.

In some embodiments, the electrode material comprises an active material, a conductive diluent and a binder. In embodiments, the electrode material comprises a plurality of layers comprising an active material, the layers comprising an active material comprising an active material, a conductive diluent and a binder. In embodiments, each layer comprising an active material further comprises a plurality of apertures and each of the plurality of current collector rods passes through at least one of the apertures of the plurality of layers comprising an active material. In some embodiments the apertures also guide stacking of the layers comprising an active material on the current collector rods. In further embodiments, the current collector layer segments are placed in contact with the layers comprising an active material. In some embodiments the active material and conductive diluent are in powder form; in additional embodiments the binder is also in powder form.

In alternate embodiments, the electrode material comprises a suspension comprising an active material, a conductive material and a non-aqueous electrolyte. For example, the suspension comprises 20% to 75% by volume of an active material and 0.5% to 8% by volume of a conductive material in a non-aqueous liquid electrolyte. In embodiments, the active material and the conductive material are provided as particles. In an embodiment, for example, the conductive material are provided as particles characterized by cross section dimensions (e.g. diameter, thickness, etc.) selected from the range of 0.1 μm to 10 μm, and optionally 0.1 μm to 1 μm. As an example, the active material is an anode material or a cathode material as described herein. As a further example, the conductive material is a carbon material or a metal. Suitable metals include, but are not limited to Al, Cu, Ni, Ti, Fe and alloys thereof. For example, the metal may be stainless steel. Exemplary non-aqueous electrolytes are described herein.

In further embodiments, the electrode comprises at least one layer comprising an electrolyte, at least one ion-conducting channel or a combination thereof in addition to a three-dimensional network for electron transport. FIG. 10 schematically illustrates a cathode including a plurality of secondary current collector layers, a plurality of current collector rods, and a plurality of ion-conducting channels.

Electrodes of the present invention are versatile and may be used in a variety of electrochemical systems including primary and secondary batteries. In an embodiment, for example, the electrode of the invention is an anode or cathode of a Na-ion based battery; an anode or cathode of a zinc based battery; an anode or cathode of an alkaline battery; an anode or cathode of a lead acid battery; or an anode or cathode of an air based battery.

In an additional aspect, the disclosure provides electrochemical cells including the electrodes described herein. In embodiments, provided is an electrochemical cell comprising: a first electrode including a three dimensional network for ion transport, a three dimensional network for electron transport, or a combination thereof; a second electrode; and an ionically conducting and electronically insulating separator layer disposed between the first and the second electrode.

In additional embodiments, the disclosure provides an electrochemical cell comprising
   a. At least one of a first type of multilayered electrode comprising
      i. a plurality of layers of a first type comprising a first active material;
      ii. at least one layer of a second type comprising an electrolyte;
      iii. at least one layer of a third type comprising a current collector;
   wherein each layer of a first type is separated from each adjacent layer of a first type by at least one layer of a second type or at least one layer of a third type;
   b. At least one of a second type of multilayered electrode comprising
      i. a plurality of layers of a fourth type comprising a second active material;
      ii. at least one layer of a second type comprising an electrolyte;
      iii. at least one layer of a third type comprising a current collector;
   wherein each layer of a fourth type is separated from each adjacent layer of a fourth type by at least one layer of a second type or at least one layer of a third type; and
   c. An ionically conducting and electronically insulating separator layer disposed between the first and the second electrode, wherein the layers of the first type of electrode and the layers of the second type of electrode are substantially perpendicular to the ionically conducting and electronically insulating separator layer.

In an embodiment, for example, the first type of multilayered electrode has a first polarity and the second type of multilayered electrode has a second polarity. In an embodiment, for example, comprising a plurality of the first type of multilayered electrodes and a plurality of the second type of multilayered electrodes. In an embodiment, for example, each of the layers of the first type of multilayered electrodes and the second type of multilayered electrodes are independently provided along layer alignment axes that substantially parallel to each other. In an embodiment, for example, the plurality of the first type of multilayered electrodes and second type of multilayered electrodes are provided in an orientation substantially parallel to each other. In an embodiment, for example, the plurality of the first type of multilayered electrodes and second type of multilayered electrodes are provided along an electrode alignment axis oriented substantially perpendicular to the layer alignment axes. In an embodiment, for example, a single, continuous separator is provided between the plurality of the first type of multilayered electrodes and the plurality of the second type of multilayered electrodes. In an embodiment, the single, continuous electrode is provided in a wavy form factor, for example wherein A single, continuous electrode separates electrode having a positive polarity from electrodes having a negative polarity.

The disclosure provides electrochemical cells comprising a layered battery having a stripe geometry. In an embodiment of this aspect, the layered battery is capable of bending in a direction normal to the plane of the separator without substantial degradation or mechanical and/or electrical failure.

The stripe layered battery may be bend or deformed in the direction normal to the plane of the separator without substantial degradation or mechanical failure. This property is important for consumer electronics application (e.g., watches or wearable electronics, where the bendable battery can form the wristband or wearable system, providing significant increased capacity). In an embodiment, the width of each of the anode or cathode stripes is small, for example up to 1 cm, then a 10 cm long battery of this kind, contains 5 layers of stacked anode and 5 layers of stacked cathode, can easily bend (e.g., around the wrist) without any damage to the battery. The thickness of the battery can be for example 1.1 mm, each layer of stacked anode or cathode can be 50 um, meaning that each stacked electrode is made of 20 layers stacked on top of each other.

In an embodiment, for example, the separator between the anode and cathode can be a single, continuous layer (e.g., celgard) provided in a wavy form factor separating more than one set of layers of stacked anode and cathode regions. (e.g., a Sine wave configuration where the stacks of layered anode and the stacks of layered cathode are separated by the sine wave).

In an additional aspect, the disclosure provides methods for making the electrodes and electrochemical cells described herein. In some embodiments, the disclosure provides methods for making electrodes comprising a network of 3-dimensional network for ion transport.

In embodiments, the disclosure provides a method for assembling a multilayered electrode, the method comprising the steps of:
 a. Stacking
   i. a plurality of layers of a first type comprising an active material; and
   ii. at least one layer of a second type comprising a spacer material or a solid or gel electrolyte, wherein each layer of the first type is separated from each adjacent layer of the first type by at least one layer of the second type;
 b. When a carrier material, a spacer material or a carrier material and a spacer material are present, introducing a liquid electrolyte into the carrier material, the spacer material or the carrier material and the spacer material.

In an embodiment, the method of this aspect further comprises the step of filling a plurality of ion-conduits in at least two of a plurality of layers of a first type comprising an active material, each of the ion-conduits having a longitudinal axis and being filled with an electrolyte or a carrier material; wherein the ion-conducting conduits are in ionic communication with at least one layer of the second type after assembly of the multilayered electrode. In an embodiment, the longitudinal axes of at least two of the ion-conducting conduits in adjacent layers of the first type are aligned.

In additional embodiments, the disclosure provides a method for assembling a multilayered electrode, the method comprising the steps of:
 a. Filling a plurality of ion-conduits in at least two of a plurality of layers of a first type comprising an active material, the ion-conduits being filled with an electrolyte or a carrier material;
 b. Stacking
   i. The plurality of layers of a first type comprising an active material; and
   ii. At least one layer of a second type comprising a spacer material or a solid or gel electrolyte,
   iii. at least one layer of a third type comprising a current collector, wherein the current collector is perforated, a mesh or porous
   wherein each layer of a first type is separated from each adjacent layer of a first type by at least one layer of a second type or at least one layer of a third type
 c. When a carrier material, a spacer material or a carrier material and a spacer material are present, introducing a liquid electrolyte into the carrier material, the spacer material or the carrier material and the spacer material
   wherein the ion-conducting conduits are in ionic communication with at least one layer of the second type after assembly of the multilayered electrode.

In an embodiment, the longitudinal axes of at least two of the ion-conducting conduits in adjacent layers of the first type are aligned. In an embodiment, each of the layers of the first type includes an aperture, each of the layers of the second type includes an aperture and each of the layers of the third type include an aperture, the apertures are aligned to form a passage through the layers of the first type, the second type and the third type, an electronically conductive material is placed within the passage and the electronically conductive material is in electronic communication with the at least one layer of a third type after assembly of the multilayered electrode.

In an aspect the disclosure, the disclosure provides a layered electrode for an electrochemical cell comprising of at least 2 substantially parallel plates separated by a space, where the space is at least partially filled with a electrolyte. In an embodiment, for example, each of the plates has at least one aperture that is substantially perpendicular to a plane parallel to planes of the plates, wherein the apertures extend substantially through at least 2 of the plates of the layered electrode. In an embodiment, the electrode further comprises a current collector, wherein the current collector of the layered electrode is composed of at least one base-plate and at least one rod that are electronically connected, where the base plate(s) of the current collector is substantially parallel to the plane of the electrode plates, and the rod of the current collector is substantially perpendicular to the plates. In an embodiment, at least one of the base plates of the current collector has a geometric surface area that is larger than the geometric surface area of the electrode. In an embodiment, the current collector further comprises at least of one auxiliary plate that is electronically connected to at least one base-plate by at least of the rods.

In an aspect the disclosure provides, an electrochemical cell having at least one layered electrode comprising of at least 2 substantially parallel plates separated by a space, where the space is at least partially filled with a electrolyte. In an aspect the disclosure provides, an electrochemical cell having at least one layered electrode comprising of at least 2 substantially parallel plates separated by a space, where the space is at least partially filled with a electrolyte; wherein each of the plates has at least one aperture that is substantially perpendicular to a plane parallel to planes of the plates, wherein the apertures extend substantially through at least 2 of the plates of the layered electrode. In an embodiment, at least one of the apertures is filled with a material with ionic conductivity at least 50% higher than the active material of the electrode. In an embodiment, the at least one of the apertures is filed with the same active material as the electrode but having at least two times the porosity of the rest of the plate. In an embodiment, the at least one of the apertures is filed with a solid electrolyte. In an embodiment, the at least one of the apertures is filled substantially with one or more ceramic fillers. In an embodiment, the at least one of the apertures is filled substantially with $Al_2O_3$, $SiO_2$ or both having particle sizes of less than 1 um. In an embodiment, at least one of the through-extending apertures of the layered electrode is filled with a combination of an opposite electrode material (for example anode, such as graphite or silicon or lithium) and an electronically insulating material separating the two opposite electrode materials.

BRIEF DESCRIPTION OF THE DRAWINGS

FIG. 8D: lower magnification; FIG. 8E: higher magnification.

FIGS. 9A and 9B: FIG. 9A: schematically illustration of a cathode of the electrochemical cell of FIG. 9B (side view). The cathode (20) includes electrode material (72), a plurality of current collector layers (28), a plurality of current collector layer segments (78) and a plurality of current collector rods (77). In this cathode the current collector rods do not span the electrode material. The current collector layers are in electronic communication with the current collector rods, which in turn are in electronic communication with the primary current collector layer (52). FIG. 9B schematic illustration of electrochemical cell.

FIGS. 9C and 9D FIG. 9C: schematic illustration of a cathode of the electrochemical cell of FIG. 9D (side view). The cathode (20) includes electrode material (72), a plurality of current collector layers (28), a plurality of current collector layer segments (78) and a plurality of current collector rods (77). The current collector layers are in electronic communication with the current collector rods, which in turn are in electronic communication with the primary current collector layer (52). Electronically conductive adhesive (80) is show at the junction of some of the current collector rods with the current collector layer segments. FIG. 9D schematic illustration of electrochemical cell.

FIGS. 11A, 11B and 11C: Anode material layers (12) with internal current collector (18). FIG. 11A: Front view. FIG. 11B: Side view. FIG. 11C: Top view.

FIG. 25A: rod electrodes on a substrate (side view). FIG. 25B: Side view of an individual rod electrode, showing that each rod may be comprised of a bundle of smaller rods. FIG. 25C: Top view of an individual rod electrode, showing that each rod may be comprised of a bundle of smaller rods. FIG. 25D: rod electrodes on a substrate (top view). The substrate can be the current collector (mesh, grid or thin film). The substrate can be a planar electrode itself, with the current collector and active material.

FIG. 26A: rod electrodes on a substrate (side view). Rod electrodes may extend from opposite sides of the substrate. FIG. 26B: fibers on rod electrodes. Fibers can also be polymers to increase the ionic conductivity or improve shape change accommodation (flexible fibers). Each of the rods can have fibers in it to improve the mechanical performance (reinforcement with stronger materials) and durability, for ease of fabrication, or for improving the electronic conductivity (made of metals such as Al, Cu, steel, Ti) or carbon materials (such as carbon fibers, carbon nanotubes). The fiber can be the current collector too. The fibers can have diameters of about 1% to 20% of the diameter of the rod. The length can be 0.01× to 100× of the rod length. Fibers longer than the rod length means that the fibers are bent to fit inside. FIG. 26C: rod electrodes on a substrate (top view).

FIG. 27A: rod electrodes on a substrate with auxiliary current collectors (side view). Depicting current collectors for the rod electrodes. More than one auxiliary current collector rod can be used for each of the rods. The auxiliary current collector plate in the substrate may extend beyond the substrate, to be connect to a primary current collector tab for the rod electrodes. FIG. 27B: side views of individual rod electrodes, auxiliary current collector rods, and auxiliary current collector rods inside rod electrodes. FIG. 27C: rod electrodes on a substrate with auxiliary current collector rods, auxiliary current collector plate, and primary current collector tab (top view).

FIGS. 28A, 28B, and 28C: FIG. 28A: rod electrodes on a substrate, with auxiliary current collectors, and a secondary separator coating on the rod electrodes (side view). FIG. 28B: side view of an individual auxiliary current collector rod, rod electrode, and a rod electrode coated with a secondary separator. FIG. 28C: rod electrodes on a substrate, with auxiliary current collectors, a secondary separator coating on the rod electrodes, auxiliary current collector plate, and primary current collector tab for the rod electrodes (top view).

FIG. 29A: rod electrodes on a substrate, with auxiliary current collectors, secondary separator coating, and perforated primary separator layer (side view). A side view of an individual perforated primary separator layer is also shown. FIG. 29B: top view of a perforated primary separator film. FIG. 29C: rod electrodes on a substrate, with auxiliary current collector rods and plate, secondary separator coating, perforated primary separator layer, and primary current collector tab (top view).

FIG. 30A: rod electrodes on a substrate, with auxiliary current collectors, secondary separator coating, perforated primary separator layer, and perforated plate electrodes (side view). A side view of an individual perforated plate electrode is also shown. FIG. 30B: top view of a perforated plate electrode. FIG. 30C: rod electrodes on a substrate, with auxiliary current collector rods and plate, secondary separator coating, perforated primary separator layer, perforated plate electrodes, and primary current collector tab (top view).

FIG. 31A: rod electrodes on a substrate, with auxiliary current collectors, secondary separator coating, perforated primary separator layer, perforated plate electrodes, and plate electrode current collectors (side view). A side view of an individual plate electrode current collector is also shown. FIG. 31B: top view of a plate electrode current collector. FIG. 31C: rod electrodes on a substrate, with auxiliary current collector rods and plate, secondary separator coating, perforated primary separator layer, perforated plate electrodes, plate electrode current collector, and primary current collector tab (top view).

FIG. 32A shows side view. FIG. 32B shows top view.

FIG. 33A: side view of multiple perforated cathode plate electrodes. FIG. 33B: shows a top view of FIG. 33A. FIG. 33C: side view of multiple perforated cathode plate electrodes on top of a current collector plate. FIG. 33D: top view of a current collector plate.

FIG. 35A: side view schematic illustrating anode rod electrodes on a substrate with an electronically insulative secondary separator coating (e.g. porous PVDF, PE or PP or solid electrolyte: e.g., LIPON, LISICON, PEO) can be applied to the anode (coating, dip coating in dissolved materials, spray coating of dissolved polymer in solvents (e.g. NMP), CVD, PVD, electrophoretic, etc.). FIG. 35B: side view of an individual rod electrode with a secondary separator coating.

FIG. 37A: show a rod electrode array on a substrate, with secondary separator coating, and with perforated cathode plate electrodes stacked on top of the rod electrode array (side view). FIG. 37B: two assemblies of FIG. 37A stacked on each other with the rod electrodes facing each other (second assembly rotated 180° from the other).

FIG. 43B: top view of electrochemical cell in FIG. 43A, showing example possible shapes of the cell.

FIG. 45A shows a side view of the cell. FIG. 45B shows a cross section.

FIG. 46A: electrochemical system with individual external positive cathode current collector. FIG. 46A: electrochemical system with shared external positive cathode current collector.

FIG. 48A shows a side view of the cell. FIG. 48B shows a cross section.

FIG. 49A: Schematic illustrating electrochemical system with a series arrangement. FIG. 49B shows a cross section.

FIG. 50A: Schematic illustrating electrochemical system with a shared positive current collector and shared negative current collectors (side view of the cell). FIG. 50B shows a cross section.

FIG. 53A: shows the aluminum 3-dimensional auxiliary current collector placed inside a 2032-type coin cell cup, which also serves as aligner for the perforated plates. FIG. 53B: shows one of the layers of the multilayer electrode, consisting of perforated active material, which is coated on an auxiliary current collector plate. FIG. 53C: shows a thin porous spacer that will hold the liquid electrolyte to provide sufficient ionic connectivity between the layers. FIG. 53D: shows the addition of a Celgard separator layer, which completes the half-cell construction by placing the addition of the Li electrode on the other side of it.

DETAILED DESCRIPTION OF THE INVENTION

Figure 1A:
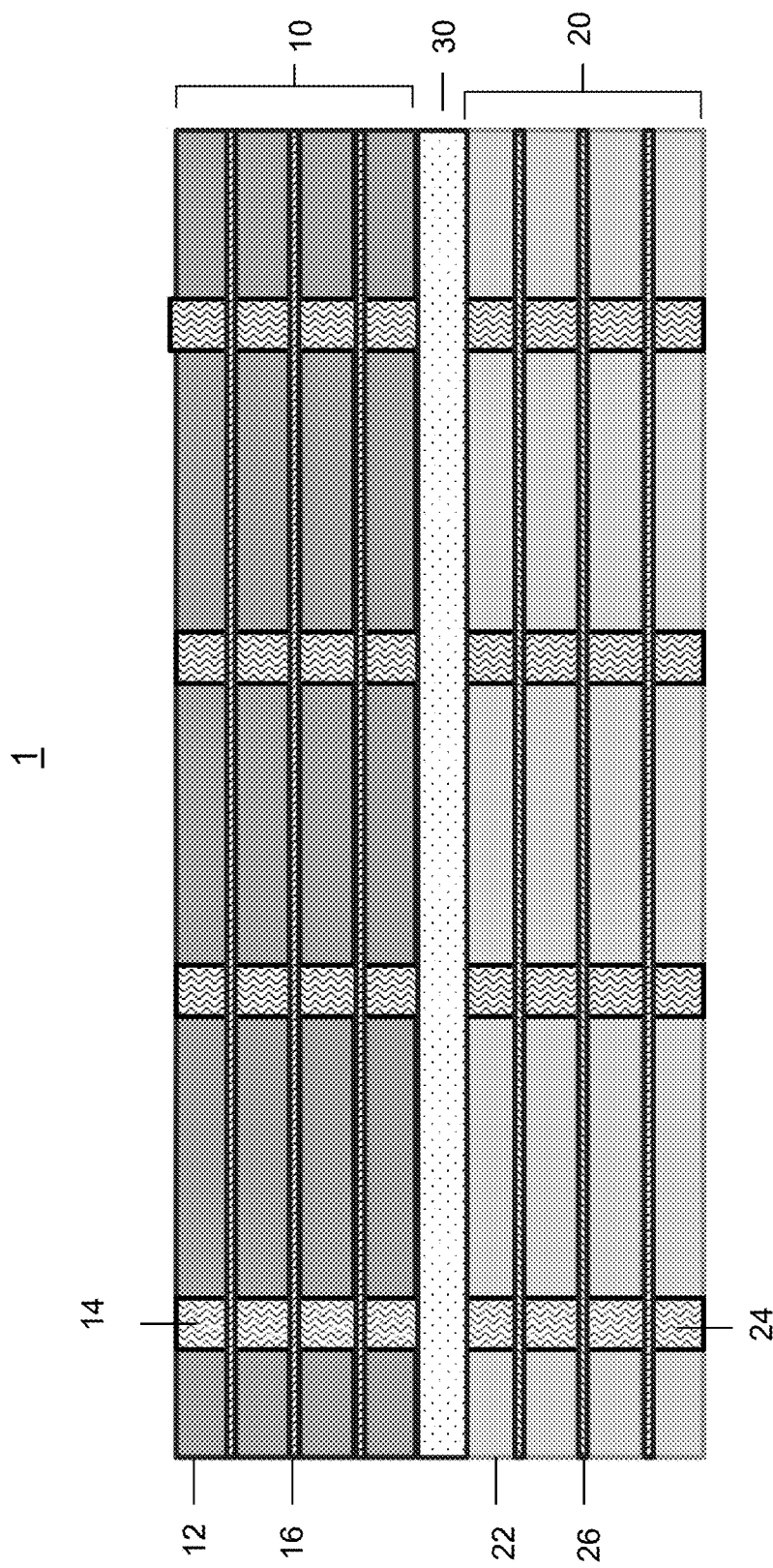
FIG. 1A: schematically illustrates a cross-sectional view of an electrochemical cell having a three-dimensional network for ion transport. Cell (1) includes anode (10), cathode (20) and separator (30) disposed between the anode and the cathode. Adjacent anode layers comprising an active material (12) are separated by layers comprising electrolyte (16). Similarly, adjacent cathode layers comprising an active material (22) are separated by layers comprising electrolyte (26). Electrolyte-containing conduits in the anode (14) and similar conduits in the cathode (24) are also shown.

In general the terms and phrases used herein have their art-recognized meaning, which can be found by reference to standard texts, journal references and contexts known to those skilled in the art. The following definitions are provided to clarify their specific use in the context of the invention.

Referring to the drawings, like numerals indicate like elements and the same number appearing in more than one drawing refers to the same element. In addition, hereinafter, the following definitions apply:

The term "electrochemical cell" refers to devices and/or device components that convert chemical energy into electrical energy or electrical energy into chemical energy. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries and electrolysis systems. In certain embodiments, the term electrochemical cell includes fuel cells, supercapacitors, capacitors, flow batteries, metal-air batteries and semi-solid batteries. General cell and/or battery construction is known in the art, see e.g., U.S. Pat. Nos. 6,489,055, 4,052,539, 6,306,540, Seel and Dahn J. Electrochem. Soc. 147(3) 892-898 (2000).

The expression "active material" refers to a material that is electrochemically active, for example, a material that participates in the electrochemical half reactions of an electrochemical system, such as a primary or secondary electrochemical cell. The expression "active material layer" and "layer comprising an active material" are used interchangeably and refers to a layer that comprises an electrochemically active material. An active material layer may include other components in addition to the electrochemically active material, such as binders, conductive materials, electrochemical additives, structural additives and any combination thereof. The active material layer in some embodiments is porous, such as having a porosity selected form the range of 10% to 50%, optionally 20% to 40%. In an embodiment, for example, an active material layer comprises 90% LiCo2, 5% carbon black and 5% pvdf binder and has a porosity of 30%.

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight. Specific capacity is typically expressed in units of ampere-hours $kg^{-1}$.

The term "discharge rate" refers to the current at which an electrochemical cell is discharged. Discharge current can be expressed in units of ampere-hours. Alternatively, discharge current can be normalized to the rated capacity of the electrochemical cell, and expressed as C/(X t), wherein C is the capacity of the electrochemical cell, X is a variable and t is a specified unit of time, as used herein, equal to 1 hour.

"Current density" refers to the current flowing per unit electrode area.

Electrode refers to an electrical conductor where ions and electrons are exchanged with electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species. Positive electrodes and negative electrodes of the present electrochemical cell may further comprises a conductive diluent, such as acetylene black, carbon black, powdered graphite, coke, carbon fiber, graphene, and metallic powder, and/or may further comprises a binder, such polymer binder. Useful binders for positive electrodes in some embodiments comprise a fluoropolymer such as polyvinylidene fluoride (PVDF). Positive and negative electrodes of the present invention may be provided in a range of useful configurations and form factors as known in the art of electrochemistry and battery science, including thin electrode designs, such as thin film electrode configurations. Electrodes are manufactured as disclosed herein and as known in the art, including as disclosed in, for example, U.S. Pat. Nos. 4,052,539, 6,306,540, 6,852,446. For some embodiments, the electrode is typically fabricated by depositing a slurry of the electrode material, an electrically conductive inert material, the binder, and a liquid carrier on the electrode current collector, and then evaporating the carrier to leave a coherent mass in electrical contact with the current collector.

"Electrode potential" refers to a voltage, usually measured against a reference electrode, due to the presence within or in contact with the electrode of chemical species at different oxidation (valence) states.

"Electrolyte" refers to an ionic conductor which can be in the solid state, the liquid state (most common), or more rarely a gas (e.g., plasma). Gels are another form of electrolyte known to the art.

"Standard electrode potential" (E°) refers to the electrode potential when concentrations of solutes are 1M, the gas pressures are 1 atm and the temperature is 25 degrees Celsius. As used herein standard electrode potentials are measured relative to a standard hydrogen electrode.

"Active material" refers to the material in an electrode that takes part in electrochemical reactions which store and/or delivery energy in an electrochemical cell.

"Cation" refers to a positively charged ion, and "anion" refers to a negatively charged ion.

As used herein, substantially parallel refers to the spatial alignment or configuration of two or more elements or structures, such as devices or components of an electrochemical system. In some embodiments, for example, two elements are substantially parallel when a normal to the surface of the first element is parallel to a normal to the surface of the second element to within 5 degrees, or optionally 10 degrees, or optionally 15 degrees, or optionally 20 degrees or optionally 25 degrees.

As used herein, substantially perpendicular refers to the spatial alignment or configuration of two or more elements or structures, such as devices or components of an electrochemical system. In some embodiments, for example, two elements are substantially perpendicular when a normal to the surface of the first element is perpendicular to a normal to the surface of the second element to within 5 degrees, or optionally 10 degrees, or optionally 15 degrees, or optionally 20 degrees or optionally 25 degrees.

"Electrical contact" and "electrical communication" refers to the arrangement of one or more objects such that an electric current efficiently flows from one object to another. For example, in some embodiments, two objects having an electrical resistance between them less than 100Ω are considered in electrical communication with one another. An electrical contact can also refer to a component of a device or object used for establishing electrical communication with external devices or circuits, for example an electrical interconnection. "Electrical communication" also refers to the ability of two or more materials and/or structures that are capable of transferring charge between them, such as in the form of the transfer of electrons. In some embodiments, components in electrical communication are in direct electrical communication wherein an electronic signal or charge carrier is directly transferred from one component to another. In some embodiments, components in electrical communication are in indirect electrical communication wherein an electronic signal or charge carrier is indirectly transferred from one component to another via one or more intermediate structures, such as circuit elements, separating the components. Similarly "ionic contact" and "ionic communication" refers to the arrangement of one or more objects such that an ions efficiently flow from one object to another.

"Thermal contact" and "thermal communication" are used synonymously and refer to an orientation or position of elements or materials, such as a current collector or heat transfer rod and a heat sink or a heat source, such that there is more efficient transfer of heat between the two elements than if they were thermally isolated or thermally insulated. Elements or materials may be considered in thermal communication or contact if heat is transported between them more quickly than if they were thermally isolated or thermally insulated. Two elements in thermal communication or contact may reach thermal equilibrium or thermal steady state and in some embodiments may be considered to be constantly at thermal equilibrium or thermal steady state with one another. In some embodiments, elements in thermal communication with one another are separated from each other by a thermally conductive material or intermediate thermally conductive material or device component. In some embodiments, elements in thermal communication with one another are separated by a distance of 1 µm or less. In some embodiments, elements in thermal communication with one another are provided in physical contact.

"Porosity" refers to the amount of a material or component, such as a high mechanical strength layer, that corresponds to pores, such as apertures, channels, voids, etc. Porosity may be expressed as the percentage of the volume of a material, structure or device component, such as a high mechanical strength layer, that corresponds to pores, such as apertures, channels, voids, etc., relative to the total volume occupied by the material, structure or device component.

In embodiments, elements of the electrode are aligned, for example having a preselected positions relative with each other. In some embodiments, two or more aligned elements extend along the same or overlapping alignment axes. In some embodiments, two or more aligned elements are positioned substantially parallel to each other. In some embodiments, two or more aligned elements (such as ion-conducting conduits or apertures in adjacent layers) are provide in a spatial arrangement such that electrolyte can transport between them. In some embodiments, two or more aligned elements (such as ion-conducting conduits or apertures in adjacent layers) are provide in a spatial arrangement such that ions can be transported from one element to the other. In some embodiments, two or more aligned elements (such as ion-conducting conduits or apertures in adjacent layers) are provide in a spatial arrangement such that together they form a continuous passage, channel or cavity. In some embodiments, two elements are aligned when the longitudinal axis of the first element is aligned with the longitudinal axis of the second element within 5 degrees, optionally 10 degrees, optionally 15 degrees, optionally 20 degrees or optionally 25 degrees. In further elements, multiple elements may be aligned along an alignment axis when the longitudinal axes of each element aligns with the alignment axis within optionally 5 degrees, optionally 10 degrees, optionally 15 degrees, optionally 20 degrees or optionally 25 degrees.

In additional embodiment, elements of the electrode or the electrochemical cell are substantially parallel or substantially perpendicular. In embodiments, two elements are substantially parallel when a normal to the surface of the first element is parallel to a normal to the surface of the second element to within 5 degrees, optionally 10 degrees, optionally 15 degrees, optionally 20 degrees or optionally 25 degrees. Similarly, in embodiments two elements are substantially perpendicular when a normal to the surface of the first element is perpendicular to a normal to the surface of the second element to within 5 degrees, optionally 10 degrees, optionally 15 degrees, optionally 20 degrees or optionally 25 degrees.

A variety of cathode active materials are known to the art. Lithium ion cathode materials known to the art include, but are not limited to, lithium metal oxides, lithium metal phosphates, and sulfur based cathodes. Lithium metal oxides include lithium cobalt oxide ($LiCoO_2$), lithium manganese oxide ($LiMn_2O_4$), lithium nickel manganese cobalt oxide ($LiNiMnCoO_2$ or NMC), lithium nickel cobalt aluminum oxide ($LiNiCoAlO_2$ or NCA). Lithium metal phosphates include lithium cobalt phosphate and lithium iron phosphate ($LiFePO_4$). Lithium metal sulfur compounds include lithium ion fluorosulfate and lithium titanium sulfide. Air based cathodes are also known to the art.

A variety of anode active materials are known to the art. Lithium ion battery anode materials known to the art include, but are not limited to carbon, tin, germanium, silicon, aluminum and lithium titanate. Other anode materials include, lithium and lithium alloys.

In embodiments, the electrolyte includes any of a variety of electrolytes, for example useful in primary and secondary electrochemical cells. Useful electrolytes include, but are not limited to: an aqueous solution; an organic solvent; a lithium salt; sulfuric acid; potassium hydroxide; an ionic liquid; a solid electrolyte; a polymer; poly(ethylene oxide); poly(propylene oxide); poly(styrene); poly(imide); poly (amine); poly(acrylonitrile); poly(vinylidene fluoride); methoxyethoxyethoxy phosphazine; diiodomethane; 1,3-diiodopropane; N,N-dimethylformamide; imethypropylene urea; ethylene carbonate; diethylene carbonate; dimethyl carbonate; propylene carbonate; a block copolymer lithium electrolyte doped with a lithium salt; glass; glass doped with at least one of LiI, LiF, LiCl, $Li_2O$—$B_2O_3$—$Bi_2O_3$, $Li_2O$—$B_2O_3$—$P_2O_5$ and $Li_2OB_2O_3$; a sol of at least one oxide of Si, B, P, Ti, Zr, Bb and Bi; a sol of at least one hydroxide of Si, B, Ti, Zr, Pb and Bi; a gel of at least one oxide of Si, B, P, Ti, Zr, Bb and Bi; a gel of at least one hydroxide of Si, B, B, Ti, Zr, Pb and Bi; or any combination of these. Useful polymers further include polyacryonitrile, poly(vinyl chloride), poly(vinyl sulfone), poly(ethylene glycol diacrylate), poly(vinyidene fluoride), poly(tetrahydrofuran), poly(dioxolane), poly(ethylane oxide), poly(propylene oxide), poly(vinyl pyrrolidinoe) and mixtures thereof. Useful electrolytes further include those comprising $LiClO_4$, $LiBF_4$, $LiAsF_6$, $LiCF_3$, $SO_3$, $LiPF_6$, and $LiN(SO_2\ CF_3)2$. Optionally, an electrolyte comprises a salt selected from the group of salts consisting of $Mg(ClO_4)_2$, $Zn(ClO_4)_2$, $LiAlCl_4$, and $Ca(ClO_4)_2$. Optionally, an electrolyte is a solid, for example comprising a material selected from the group consisting of phosphorous based glass, oxide based glass, oxide sulfide based glass, selenide glass, gallium based glass, germanium based glass, sodium and lithium betaalumina, glass ceramic alkali metal ion conductors, and Nasiglass. a polycrystalline ceramic selected from the group consisting of LISICON, NASICON, $Li_{0.3}La_{0.7}TiO_3$, sodium and lithium beta alumina, LISICON polycrystalline ceramic such as lithium metal phosphates. LISICON refers to Lithium Super Ionic Conducture, a family of solids with the chemical formula $Li_{2+2x}Zn_{1-x}GeO_4$. NASICON refers to Na (sodium) Super Ionic Conductor and includes solids with the formula $Na_{1+x}Zr_2Si_xP_{3-x}O_{12}$<x<3.

In general, the terms and phrases used herein have their art-recognized meaning, which can be found by reference to standard texts, journal references and contexts known to those skilled in the art.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

The invention is further detailed in the following examples, which are offered by way of illustration and are not intended to limit the scope of the invention in any manner

EXAMPLE 1

Multi-Layer Electrodes

The invention provides novel cell architecture for batteries (e.g., alkaline, li-ion, zinc based) and flow batteries. Aspects of the invention result in higher performance of electrochemical cells, particularly batteries. Aspects of the invention significantly increase Wh/kg and Wh/L or rate performance. Aspects of the invention also enable high capacity novel electrode materials.

The layered electrode of certain embodiments also allows better shape change accommodation (for shape changing materials such as silicon in li-ion batteries; or zinc in zinc batteries) and for better electronic conductivity (for low electronic conductivity materials such as sulfur in Li-ion batteries). The cell architecture of certain embodiments also enables high rate and higher performance air cathode for metal air batteries, such as Li-air, Al-air and Zinc-air (air flowing from the hole channels to the carbon cathode layers). The systems of the invention may use multiple chemistries for each of the anode or cathode layers.

Aspects of certain embodiments, for example, enable lithium metal inside the Li-ion cell, enabling non-lithiated cathode and anode materials such as silicon anode-sulfur cathode. Aspects of certain embodiments, for example, enable a long life cycle by providing Li-ions excess. Aspects of certain embodiments also enable better cell management by using the lithium rod (wire) as a reference electrode.

Certain electrochemical systems of the invention are characterized as chemistry agnostic, whereby any battery chemistry may be used such as Li-ion, alkaline, or lead-acid as well as flow batteries, metal air batteries and semi-solid chemistries.

In an embodiment, for example, an electrochemical cell systems provides higher Wh/kg and Wh/L values, via a thinner and lighter system, wherein the system comprises: a layered cathode and a layered anode, with 8 layers of active anode material and 8 layers of active cathode material, each single layer of the active material is 75 μm thick. The total thickness of current collector layers totals only 40 μm, and total thickness of separators layers is 50 μm layer(s), with the system thereby totaling 1290 μm in thickness. In contrast, a electrochemical cell system with same thickness of active material layers results in current collector thickness totaling 80 μm (8×10 μm) and separator thickness totaling 80 μm (4×20 μm), with the system thereby totaling 1360 μm in thickness.

In electrochemical systems of certain embodiments, for example, each electrode layers can be pressed or attached to each other for ease of manufacturing, which also results in thinner current collector layer requirements for each of the layers as the winding tension is distributed to several layers instead of one.

In electrochemical systems of certain embodiments, for example, each of the cathode or each of anode layers, or all, can be perforated to create fast vertical ion movement. Some holes can also be used to implement current collectors in the form of rods (77) in them. Or to allow the passage of air (oxygen, gas or liquid fuel) or flowing slurries or electrolyte.

In electrochemical systems of certain embodiments, for example, holes in anode and cathode can be random or periodic (if periodic: can be aligned or not).

Figure 1B:
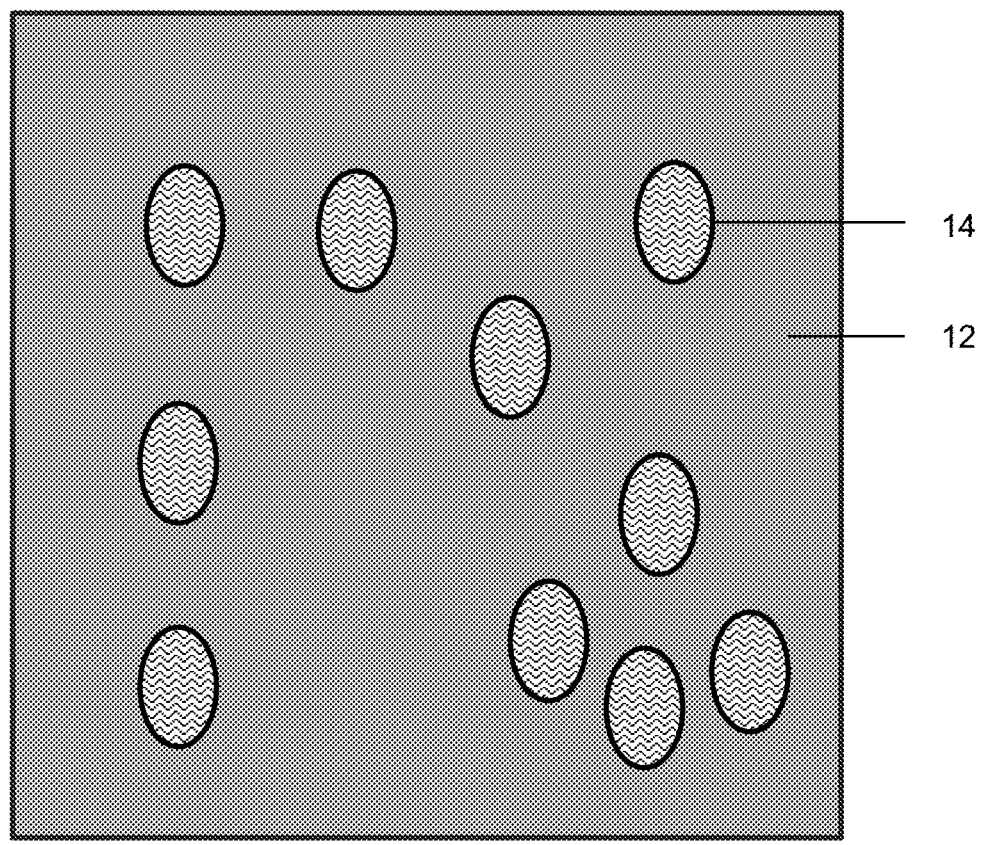
FIG. 1B: shows a top view of the cell of FIG. 1A and shows an exemplary distribution of electrolyte-containing conduits (14) in a layer comprising an active material (12).
Figure 2A:
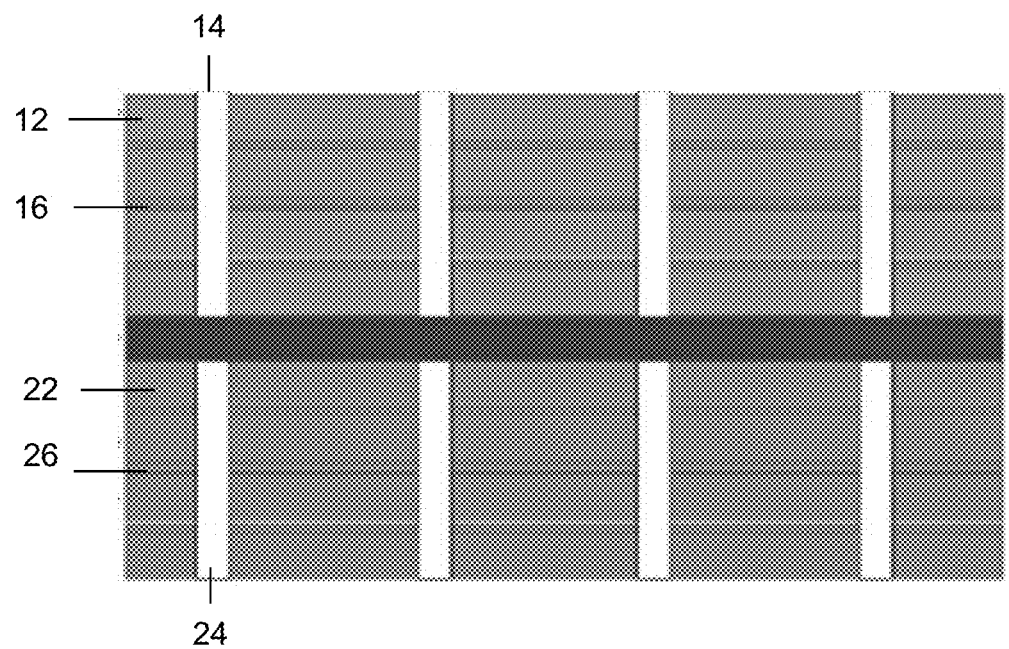
FIG. 2A: schematically illustrates a side view of another electrochemical cell having a three-dimensional network for ion transport. Adjacent anode layers comprising an active material (12) are separated by layers comprising electrolyte (16). Similarly, adjacent cathode layers comprising an active material (22) are separated by layers comprising electrolyte (26). Electrolyte-containing conduits in the anode (14) and similar conduits in the cathode (24) are also shown.
Figure 2B:
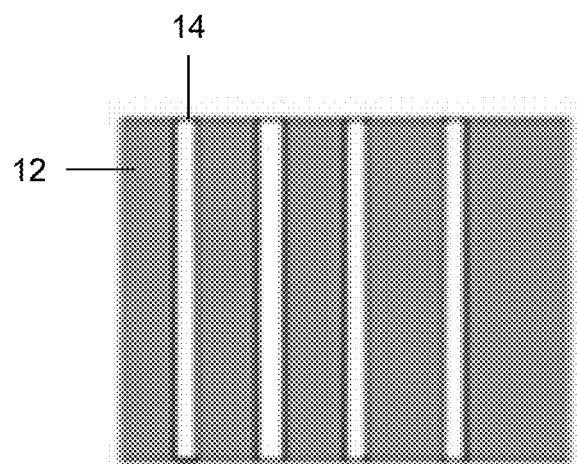
FIG. 2B is a top view of the cell of FIG. 2A illustrating slot-shaped conduits (14).
Figure 5A:
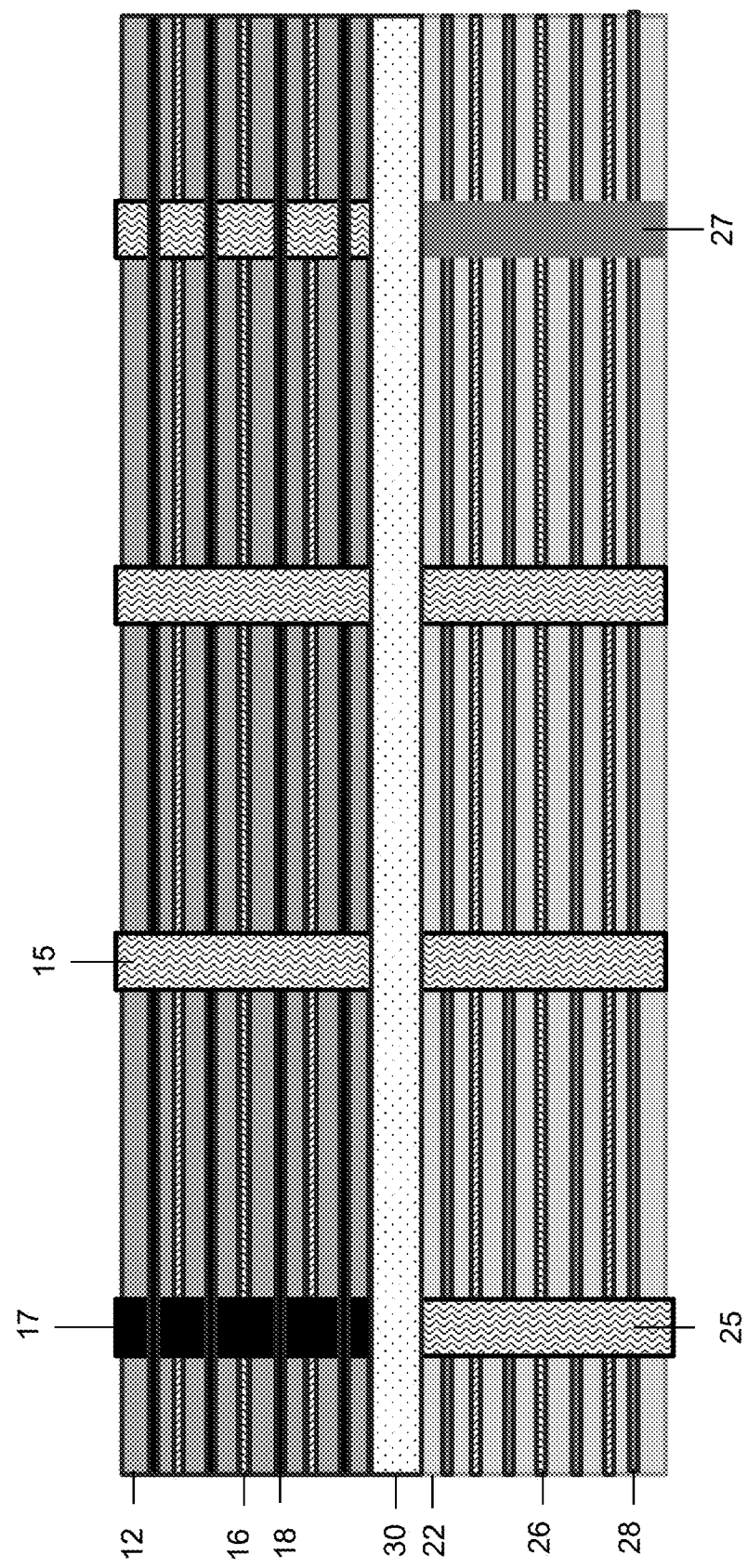
FIG. 5B schematically illustrates a cross-sectional side view of an electrochemical cell which include an additional passage comprising an electronically conducting material, the passage passing through layers of each electrode. Anode primary current collector (51) and cathode primary current collector (52) are also shown.
FIG. 5C schematically illustrates a cross-sectional side view of an electrochemical cell which include an additional passage comprising lithium (19), the passage passing through layers of the anode. A lithium metal tab (59) is also shown.
Figure 5B:
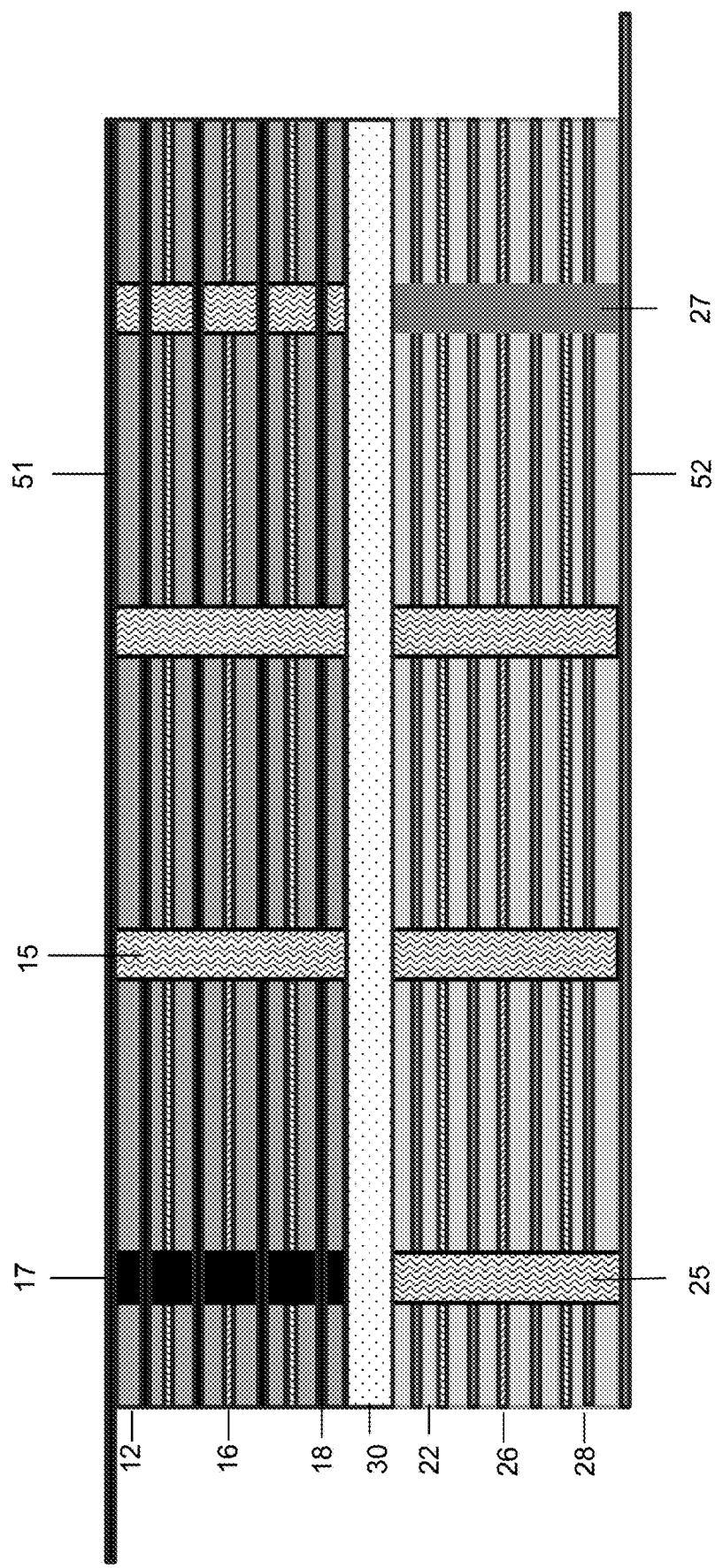
Figure 5C:
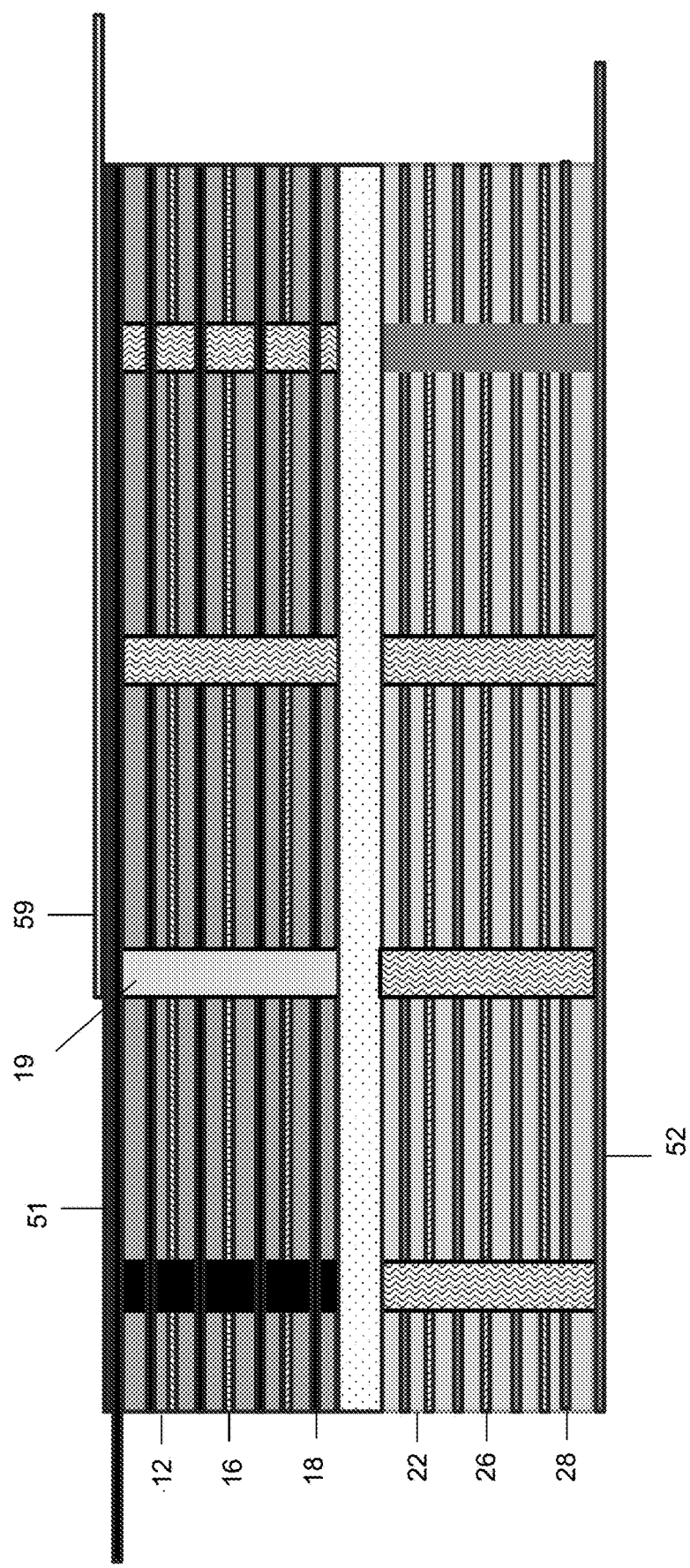

FIGS. 1A, 1B, 2A, 4A, and 5A-5C illustrate aspects of example electrochemical systems a three dimensional network for ion transport. The illustrated example cell includes 4 anode active layers (12), which may be perforated, separated from each other by electrolyte-containing layers (16, together with anode layers 10), which may be comprised of a nonwoven polymer including polypropylene, polyethylene, and polyvinylidene fluoride or a metal material, and which also behave as spacer layers. The anode active layers may be 10-150 μm thick and the electrolyte-containing layers may be 0.5 to 10 μm thick. A separator layer, which may be 20 μm thick, separates the cathode and anode layers. 4 Cathode active layers (22) lie on the other side of the separator from the anode active layers, and may be perforated and may also be 10 to 150 μm thick, with electrolyte-containing layers (26, together with cathode layers 20) in between each cathode active layer. The electrolyte-containing layer (26) may also be comprised of a nonwoven polymer including polypropylene, polyethylene, and polyvinylidene fluoride or a metal material, and also behave as spacer layers As FIG. 1A also illustrates, holes, or conduits, in the cathode (14) layers and similarly holes, or conduits, in the anode (24) layers may also be implemented, oriented at a transverse angle from the plane of the active layers, to allow passage of fluid (air, oxygen, fuel, slurry, electrolyte) or solid material, such as current collection rods (77). For example, 1% to 50% of the conduits may be filled with such electrically conducting materials for current collection. The metal material filling the conduits in the latter example may rods may include aluminum, copper, nickel, stainless steel, titanium, and carbon, for example. The conduits may be 0.5 to 500 μm in diameter and may be 5 μm to 5 mm apart from each other, for example. As illustrated in FIGS. 1B and 2B, the latter holes (14 and 24), may be arranged periodically or randomly. As shown in FIG. 5A, the anode layers may include auxiliary anode current collector layers (18), oriented parallel to the anode layers, and may be 1 to 15 μm thick. The cathode layers may also include cathode auxiliary current collector layers (28), and may also be 1 to 15 μm thick. The anode and the cathode current collector layers may be perforated, porous, or may be a mesh.

As illustrated in FIG. 5A, for example, one, or more, of the anode holes, or conduits, and one, or more, of the cathode holes, or conduits, may be filled with electrically conducting material to be implemented as the primary current collector channels (17, 27) which connect to the anode and cathode main current collectors (FIGS. 5B, 51 and 52; also FIGS. 4C-4D, 51) thereby allowing connection to an external electronic circuit. In an embodiment, for example, some of the holes, or conduits, (for example, 1% to 50%) can be filled with lithium metal (on the anode or cathode side, or both sides) (19) and connected to a lithium external tab (59), allowing of in situ lithiation, pre-lithiation, or lithium depot, or allowing use of the lithium tab as a reference electrode.

EXAMPLE 2

Thick Electrodes

As used in the description herein, reference to "a film" may refer to a structure consist of several layers, and in some embodiments this approach is used to make the thick electrode. As used in the description herein, reference to "Electronically" refers to transport of only electrons. As used in the description herein, reference to "Ionically" refers to transport of only ions movement. As used in the description herein, reference to "Electrically" refers to transport of either, or both, electronically and ionically.

The disclosure provided herein is exemplified by the following embodiments:

Embodiment 1: An electrode film with a designed 3-dimensional ionic channel network inside the electrode to provide low resistance diffusion path for the ions inside the said electrode or a method to make thick electrode films such that a network of 3-dimensional ionic channels inside the electrode provide low resistance diffusion path for the ions inside the said electrode or an electrochemical cell consisting of at least one electrode film with a designed 3-dimensional ionic channel network inside the electrode to provide low resistance diffusion path for ions inside the electrode.

Embodiment 2: Embodiment 1, where the electrode is a cathode of a lithium-ion based battery;

Embodiment 3: Embodiment 1, where the electrode is an anode of a lithium-ion based battery Embodiment 4: Embodiment 1, where the thickness of the film is more than 20 μm;

Embodiment 5: Embodiment 1 where the electrode is composed of at least one current collector film with a coating of electrochemical reactive material (electrode material) on it;

Embodiment 6: Embodiment 5 where the thickness of the said current collector film is less than the thickness of the said electrode material;

Embodiment 7: Embodiment 5 where the weight of the said current collector film is less than the weight of the said electrode material.

Embodiment 8: Embodiment 1 where the 3-dimensional ionic channel consists of at least a group of channels substantially vertical to the surface of the said electrode film.

Embodiment 9: Embodiment 1 where the 3-dimensional ionic channel consists of at least a group of channels substantially parallel to the surface of the said electrode film.

Embodiment 10: Embodiment 1 where the 3-dimensional ionic channel consists of at least a group of channels substantially vertical to the surface of the said electrode film and a group of channel substantially parallel to the surface of the electrode film.

Embodiment 11: Embodiment 1 where the thick electrode film is made in several steps of placing layers of electrode material so that a channel is formed between each coated layers.

Embodiment 12: Embodiment 11 where the placing of the layers is done by coating each of the films on top of the previously placed layer.

Embodiment 13: Embodiment 12, where each layer is coated after the previous layer is dried completely.

Embodiment 14: Embodiment 11, where after the placing of the first layer on the said current collector of claim 1, a highly ionic conductive layer is placed on the coated layer, before placing the next layer on the previous layer.

Embodiment 15: Embodiment 14 where the highly ionic conductive layer is selected from the group of at least a ceramic electrolyte, polymer electrolyte or a combination thereof.

Embodiment 16: Embodiment 14 where the highly ionic conductive layer is a porous layer with electrolyte in it Embodiment 17: Embodiment 14 where the highly ionic conductive layer is a nonwoven layer.

Embodiment 18: Embodiment 14 where the highly ionic conductive layer is a woven material.

Embodiment 19: Embodiment 14 where the highly ionic conductive layer is a microporous layer.

Embodiment 20: Embodiment 14 where the highly ionic conductive layer is a perforated layer.

Embodiment 21: Embodiment 14 where the highly ionic conductive is made of a ceramic.

Embodiment 22: Embodiment 14 where the highly ionic conductive is made of a metal, an alloy or carbon, such as aluminum, copper, titanium, stainless steel, nickel, carbon (for example graphite, graphene, nanotubes, etc.).

Embodiment 23: Embodiment 14 where the highly ionic conductive layer is made of a polymer (such as polyethylene, polypropylene, PET, PVDF, PTFE, PEO, etc.). PET refers to polyethylene terephthalate. PVDF refers to polyvinylidene difluoride. PTFE refers to polytetrafluroethylene. PEO refers to polyethylene oxide.

Embodiment 24: Embodiment 14 where the porosity of the highly ionic conductive layer is more than 30%.

Embodiment 25: Embodiment 14 were the thickness of the highly ionic conductive layer is less than 0.25 mm.

Embodiment 26: Embodiment 14 where the thickness of the highly ionic conductive layer is less than 0.02 mm.

Embodiment 27: Embodiment 14 where the highly ionic conductive layer is a coating itself on the said placed electrode layer.

Embodiment 28: Embodiment 8 where the vertical channels have at least one lateral dimension smaller than 500 µm.

Embodiment 29: Embodiment 8 where the vertical channels have at least one lateral dimension smaller than 100 µm.

Embodiment 30: Embodiment 8 where the vertical channels have at least one lateral dimension smaller than 25 µm.

Embodiment 31: Embodiment 8 where the vertical channels have at least one lateral dimension smaller than 5 µm.

Embodiment 32: Embodiment 8 where the distance between the vertical channels is at least larger than the smallest lateral dimension of the channel.

Embodiment 33: Embodiment 8 where the distance between the vertical channels is larger than 0.5 mm.

Embodiment 34: Embodiment 8 where the vertical channels are filled with a high ionic conductivity material.

Embodiment 35: Embodiment 34 where the highly ionic conductive layer is selected from the group of at least a ceramic electrolyte, polymer electrolyte or a combination thereof.

Embodiment 36: Embodiment 34 where the highly ionic conductive layer is a porous layer with electrolyte in it.

Embodiment 37: Embodiment 34 where the highly ionic conductive layer is a nonwoven layer.

Embodiment 38: Embodiment 34 where the highly ionic conductive layer is a woven material.

Embodiment 39: Embodiment 34 where the highly ionic conductive layer is a microporous layer.

Embodiment 40: Embodiment 34 where the highly ionic conductive layer is a perforated layer.

Embodiment 41: Embodiment 34 where the highly ionic conductive is made of a ceramic.

Embodiment 42: Embodiment 34 where the highly ionic conductive is made of aluminum, copper, titanium, stainless steel, carbon (for example graphite, graphene, nanotubes, etc.).

Embodiment 43: Embodiment 34 where the highly ionic conductive is made of a polymer (such as polyethylene, polypropylene, PET, PVDF, PTFE, PEO, etc.).

Embodiment 44; Embodiment 8 where the channel is an aperture and can filled with an electrolyte (solid, gel or liquid).

Embodiment 45: Embodiment 1 where the electrode consists of at least one electronically conductive layer (such as its current collector material or carbon) parallel to the plate of the electrode film Embodiment 46: Embodiment 45 where the thickness of the said electronic conductive layer is not more than the thickness of the said current collector is Embodiment 1.

Embodiment 47: Embodiment 45 where the said electronic conductive layer is electronically connected to the main current collector of the said electrode, mentioned in Embodiment 1.

Embodiment 48: Embodiment 45 where the said electronic conductive layer is a mesh, a foam or is a perforated layer.

Embodiment 49: Embodiment 1 where the said electrode film also consists of a group of electronically conductive rods (77) substantially perpendicular to the plate of the said electrode and connected to the said current collector film of Embodiment 1.

Embodiment 50: Embodiment 49 where the said rods go through thickness of the said electrode and their length is comparable to the thickness of the said thick electrode film of Embodiment 1.

Embodiment 51: Embodiment 50 where the said electrodes have perforations to allow the said current collector rods inside them.

Embodiment 52: Embodiment 1 where the cell includes both current collector films certain embodiments and the rods certain embodiments such that the parallel film and the perpendicular rods are electronically attached and there is negligible electronic resistance between them.

Embodiment 53: Embodiment 49 where the total surface of the current collector rods is smaller than 25% of the total surface of the thick electrode film.

Embodiment 54: Embodiment 49 where the diameter of the rods is smaller than 1 mm.

Embodiment 55: A method of making the electrode as in Embodiment 1 where the electrode consists of at least two parallel layers of the active material.

Embodiment 56: Embodiment 55 where each of the layers can have a different active material.

Embodiment 57: Embodiment 55 where at least one layer is sulfur based.

Embodiment 58: Embodiment 55 where at least one layer is carbon based.

Embodiment 59: Embodiment 55 where at least one layer is lithium metal oxide based.

Embodiment 60: Embodiment 55 where at least one layer is sulfur based and at least one layer is carbon based.

Embodiment 61: Embodiment 55 where at least one layer is sulfur based and at least one layer is lithium metal oxide based.

Embodiment 62: Embodiment 55 where each of the layers is a commercially available electrode film.

Embodiment 63: Embodiment 1 where the thick layer fabrication consists of at least one of the following steps (not necessary in order)
 a) placing at least two electrode layer on top of each other, by stacking or coating;
 b) making the vertical ionic channels and the vertical apertures for the placement of the vertical current collectors connected to the current collector film of Embodiment 1
 c) combing the multi layers with the vertical current collector rods and the current collector film(s), Embodiment 64: Embodiment 2, where the electrode material is chosen from the group of LiCoO2, NMC, LiFePO4, NCA, a metal oxide lithium, a metal phosphate lithium, a manganese based electrode, a sulfur based cathode, a carbon based cathode, an air based cathode, any Li-ion cathode material or any combination thereof.

Embodiment 65: Embodiment 3, where the electrode material is chosen from the group of silicon, carbon based, tin, lithium alloy, aluminum, any li-ion battery anode material or any combination thereof.

Embodiment 66: Embodiment 1, where the electrode is a cathode of a Mg-ion based battery.

Embodiment 67: Embodiment 1, where the electrode is an anode of a Mg-ion based battery.

Embodiment 68: Embodiment 1, where the electrode is a cathode of a Na-ion based battery.

Embodiment 69: Embodiment 1, where the electrode is an anode of a Na-ion based battery.

Embodiment 70: Embodiment 1, where the electrode is a cathode of a zinc based battery.

Embodiment 71: Embodiment 1, where the electrode is an anode of a zinc based battery.

Embodiment 72: Embodiment 1, where the electrode is a cathode of an alkaline battery.

Embodiment 73: Embodiment 1, where the electrode is an anode of an alkaline battery Embodiment 74: Embodiment 1, where the electrode is a cathode of a lead acid based battery Embodiment 75: Embodiment 1, where the electrode is an anode of a lead acid battery.

Embodiment 76: Embodiment 1, where the electrode is a cathode of an air based battery.

Embodiment 77: Embodiment 1, where the electrode is an anode of an air based battery.

Embodiment 78: Embodiment 1 where the said electrode is used in a cell battery case.

Embodiment 79: Embodiment 78 where the cell battery case is a pouch cell, coin cell, prismatic cell or 18650 cell.

Embodiment 80: Embodiment 1 where the said current collector film can be used for the winding of the electrode of the cell and thus the said current collector withstands the tension force during the winding of the cell.

Embodiment 81: Embodiment 1 where there is enough electrolyte between layers to allow desire rate performance.

Embodiment 81 where the electrolyte can be stored in a porous material

Embodiment 82: Embodiment 1 where the layered cathode is made by a wet processing, as known in battery electrode industry, being repeated several times to make the multi layers Embodiment 83: An electrode for an electrochemical cell including a suspension of about 20% to about 75% by volume of an active material and about 0.5% to about 8% by volume of a conductive material in a non-aqueous liquid electrolyte; and A current collector film substantially parallel to the said electrode; and A group of current collector rods substantially perpendicular to the said current collector film an Embodiment 85: Embodiment 84 also consisting of a group of high electronic conductivity mesh layers parallel to the electrode and distanced from each other Embodiment 86: Embodiment 85 where the distance between the mesh layers is more than 0.02 mm Embodiment 87: Embodiment 85 where the parallel mesh network is electronically connected to the network of the perpendicular electronically conductive rods.

Embodiment 88: Embodiment 84 where the network of the perpendicular electronically conductive rods is electronically connected to the said current collector film.

Embodiment 89: Embodiment 84 where the electrode further comprises at least one group of high ionic conductivity channels substantially parallel to the electrode film.

Embodiment 90: Embodiment 84 where the electrode further comprises at least one group of high ionic conductivity channels substantially perpendicular to the electrode film Embodiment 91: Embodiment 89 or 90 where the channels are filled with a solid electrolyte (ceramic or polymer).

Embodiment 92: Embodiment 89 or 90 where the channels are filled with a porous material capable of holding large amounts of liquid electrolyte in it.

Embodiment 93: Embodiment 92 where the porous material is electronically conductive such as aluminum, copper, carbon, titanium, nickel, stainless steel, iron, alloys or a combination there of.

Embodiment 94: Embodiment 92 where the porous material is inert inside the cell, such as polyethylene, polypropylene, PET, pvdf, PTFE. PEO, Etc.

Embodiment 95: Embodiment 84 where the electrochemical cell is a lithium ion based one Embodiment 96: Electrochemical cell of Embodiment 1 or 84 where the other electrode of the cell consists of a group of nano-micro featured rods Embodiment 97: Embodiment 96 where each of the said nano-micro featured rods consists of a bundle of smaller rods Embodiment 98: Embodiment 97 where the smeller rods consist of at least one of nanowires or nanotubes Embodiment 99: Embodiment 96 where the diameter of each of the said rods is less than 0.5 mm Embodiment 100: Embodiment 96 where at least one dimension of the said rods is smaller than 0.2 mm Embodiment 101: Embodiment 96 where the distance between rods is larger than the diameter of the rods Embodiment 102: Electrochemical cell of Embodiment 1 or 84 where at least one active, material flows through the cell, for example a flow battery.

Figure 3A:
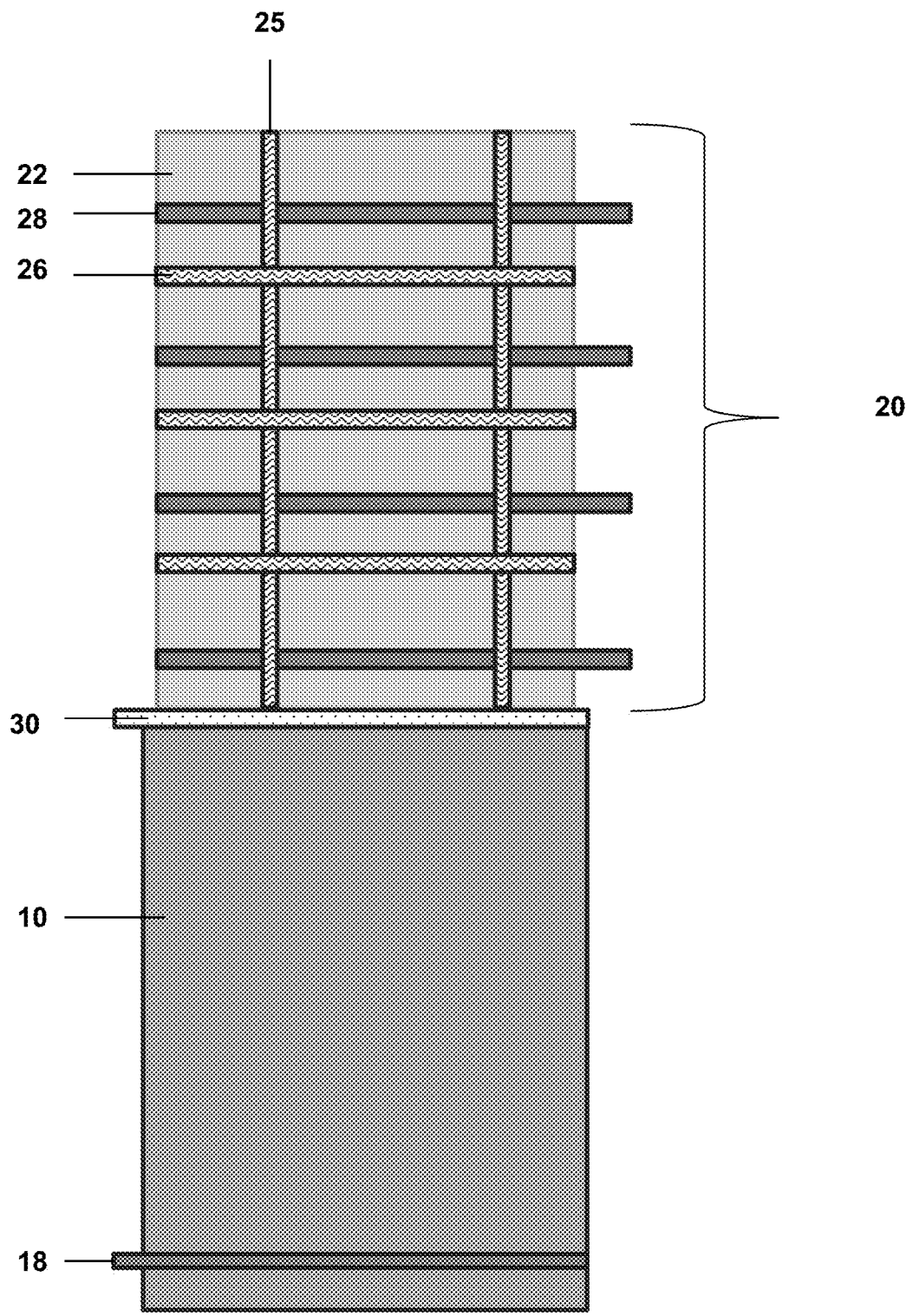
FIG. 3A: schematically illustrates side view of an electrochemical cell having a three-dimensional network for ion transport and also having current collectors (28) within the active material of cathode (20). As illustrated, an ion-conducting channel (25) is formed through each pair of layers comprising an active material (22) having a current collector (28) between them. As illustrated anode (10) incorporates a current collector (18).
Figure 6A:
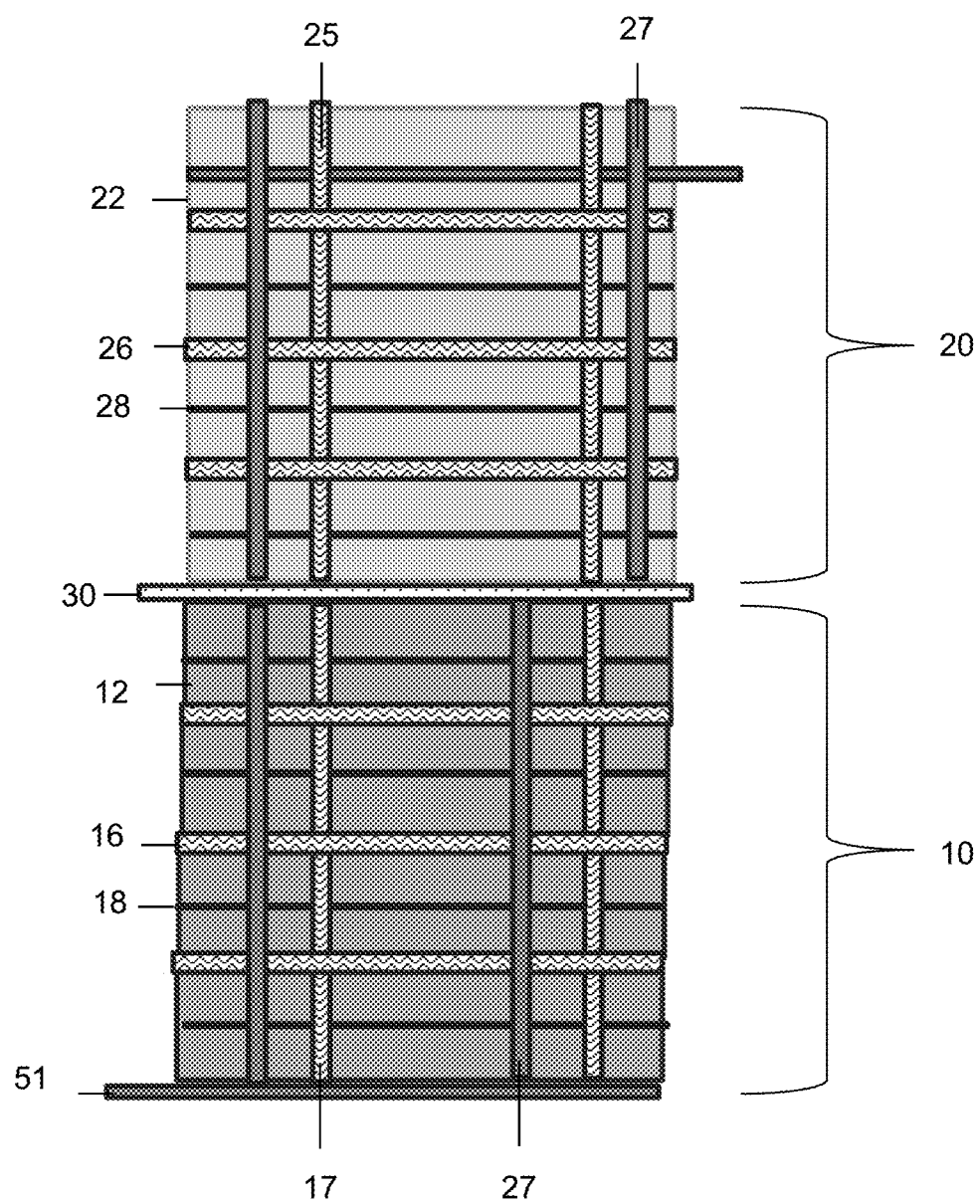
FIG. 6A: schematically illustrates another electrochemical cell. Both the anode and cathode include layers comprising an active material, layers comprising an electrolyte, ion-conducting channels and passages comprising an electronically conducting material.

In an example, the side view of an electrochemical cell system is illustrated in FIGS. 3A, 6A, 6B, and 7A. The top portion each side view illustration shows the cathode layers (20), on top of the separator layer (30), on top of the anode layers (10). As shown, the cathode is comprised of cathode active layers (22) separated by auxiliary cathode current collector layers (28) and comprising electrolyte-containing layers (26) as well as ion-conducting channels (25) that are oriented perpendicular to the cathode active layers. The ion conducting channels (25) and the electrolyte-containing layers (26) form a 3D ionic channel network. The auxiliary cathode current collector layers (28) may each be a 5 μm aluminum mesh, for example. In the example in FIG. 3A, the anode comprises an auxiliary anode current collector layer (18), which may be, for example, 15 μm of aluminum of 7 μm of copper. FIG. 6A shows another example electrochemical cell system wherein the anode also comprises a 3D network of electrically conducting channels. In the example in FIG. 6A, both the cathode and anode comprise 3D networks of electrically conducting channels and current collector layers. Compared to the illustration in FIG. 3A, FIG. 6A shows a cathode further comprising vertical current collector layers (27). Similarly, the anode (10) is shown as comprising anode active layers (12), horizontal auxiliary anode current collector layers (18), vertical current collector layers (27), electrolyte-containing layers (16), and ion-conducting channels (17). A main current collector layer (51) is also shown at the bottom of the anode. For example, the anode current collector layers may each be a 1 μm thick copper mesh.

Figure 6B:
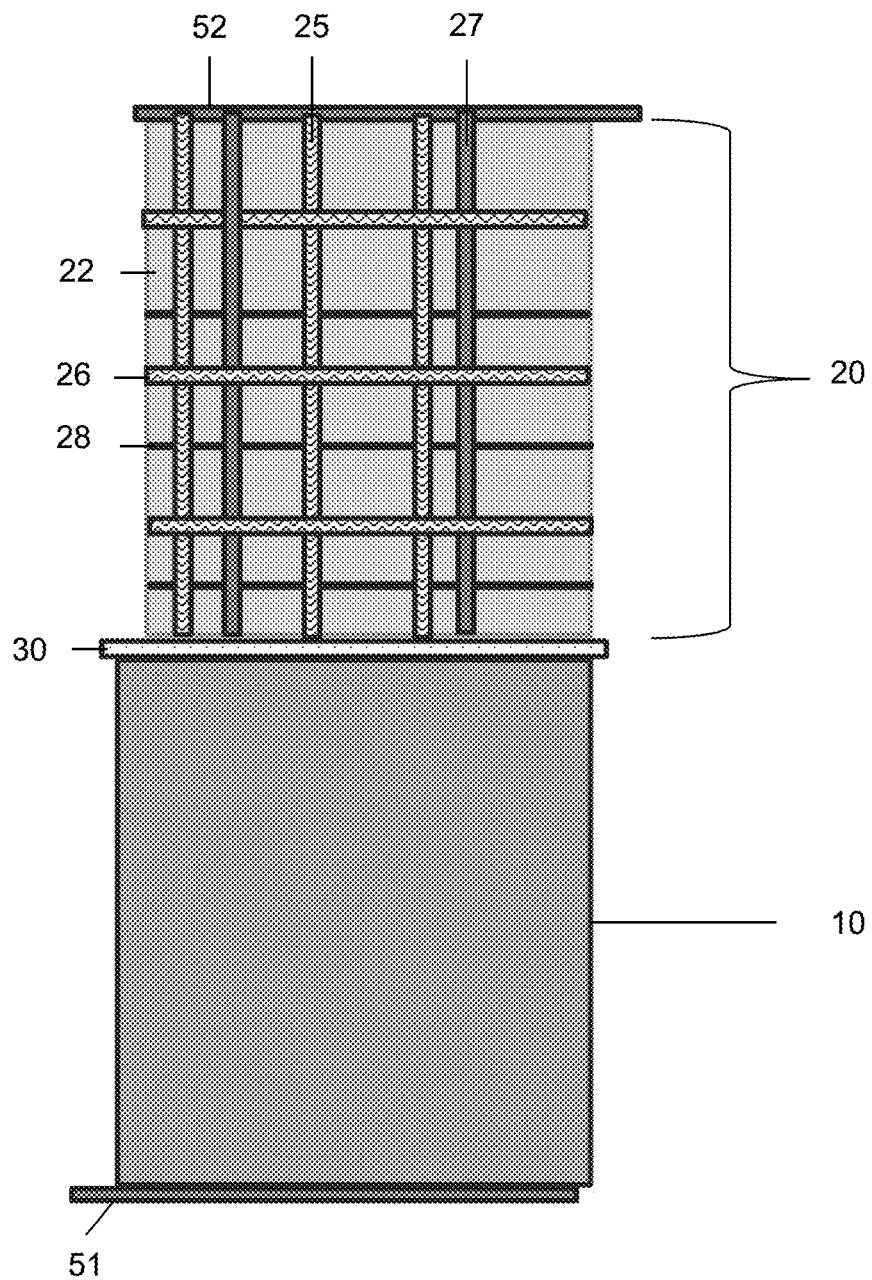
FIG. 6B: schematically illustrates another electrochemical cell. Both the anode and cathode include layers comprising an active material, layers comprising an electrolyte, ion-conducting channels and passages comprising an electronically conducting material.
Figure 10:
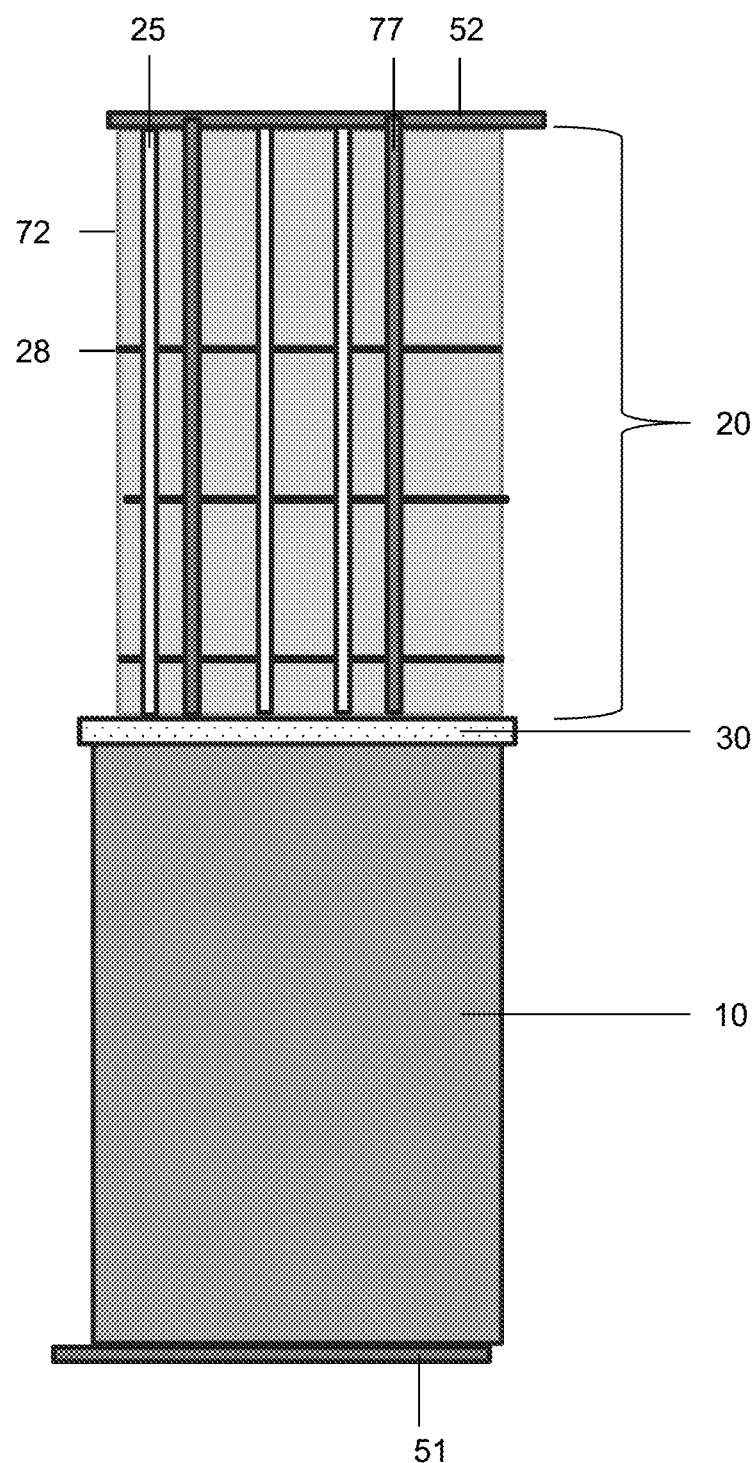
FIG. 10: schematic illustration of a cathode including a plurality of secondary current collector layers (28), a plurality of current collector rods (77), and a plurality of ion-conducting channels (25).

In the example electrochemical system illustrated in FIG. 6B, the cathode (20) is comprised of cathode active layers (22) separated by auxiliary cathode current collector layers (28) and comprising electrolyte-containing layers (26), vertical ion-conducting channels (25), vertical current collector layers (27), and further comprising a cathode main current collector (52) layer. The cathode main collector layer (52) may be a 15 μm thick aluminum film. The system may, instead, for example, have only vertical only vertical current collector layers in the cathode electrode, as illustrated in FIG. 10. The vertical current collector layers may be metal rods (77), for example. The vertical electrolyte-containing layers (26) may be rods of solid electrolyte, such as formed from polymer or ceramic materials, or rods of a porous material for holding a significantly large amount of liquid electrolyte. For example, the anode electrode material may be comprised of a mix of solid powers of an active material, a binder material, and carbon-containing conductive material, or, for example, the anode electrode material may be comprised of a suspension of active materials and conductive carbon-containing material in electrolyte (72). The example system in FIG. 7A has a cathode electrode comprising a suspension of active materials and conductive carbon in electrolyte (72) and a 3D network of horizontal auxiliary current collectors (28), which are each a 5 μm thick electronically conductive mesh, and vertical current collector rods (77). In the above examples, the main current collector layers (51, 52) allow electrical connection of the system to an external electronic circuit.

Figure 3B:
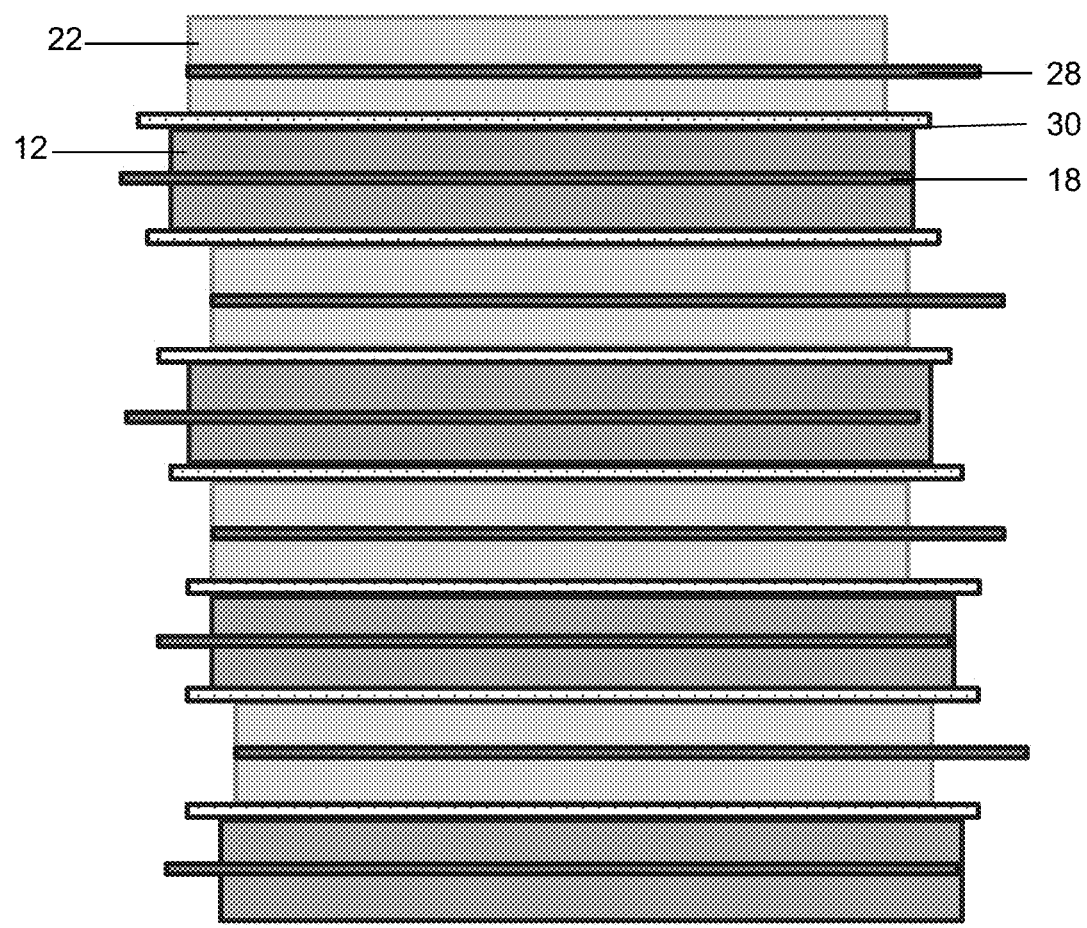
FIG. 3B: illustrates a multilayer assembly of anode active layers, cathode active layers, separators and current collectors.

In contrast, to the above examples, FIG. 3B illustrates an example electrochemical cell system. The system is comprised of a series of stacked cathode (22) and anode (12) electrode layers. Within each electrode active layer of the multilayer system, there is an auxiliary current collector layer (28, 18), and in between each cathode and each anode active layer there is a separator (30) layer.

Figure 8A:
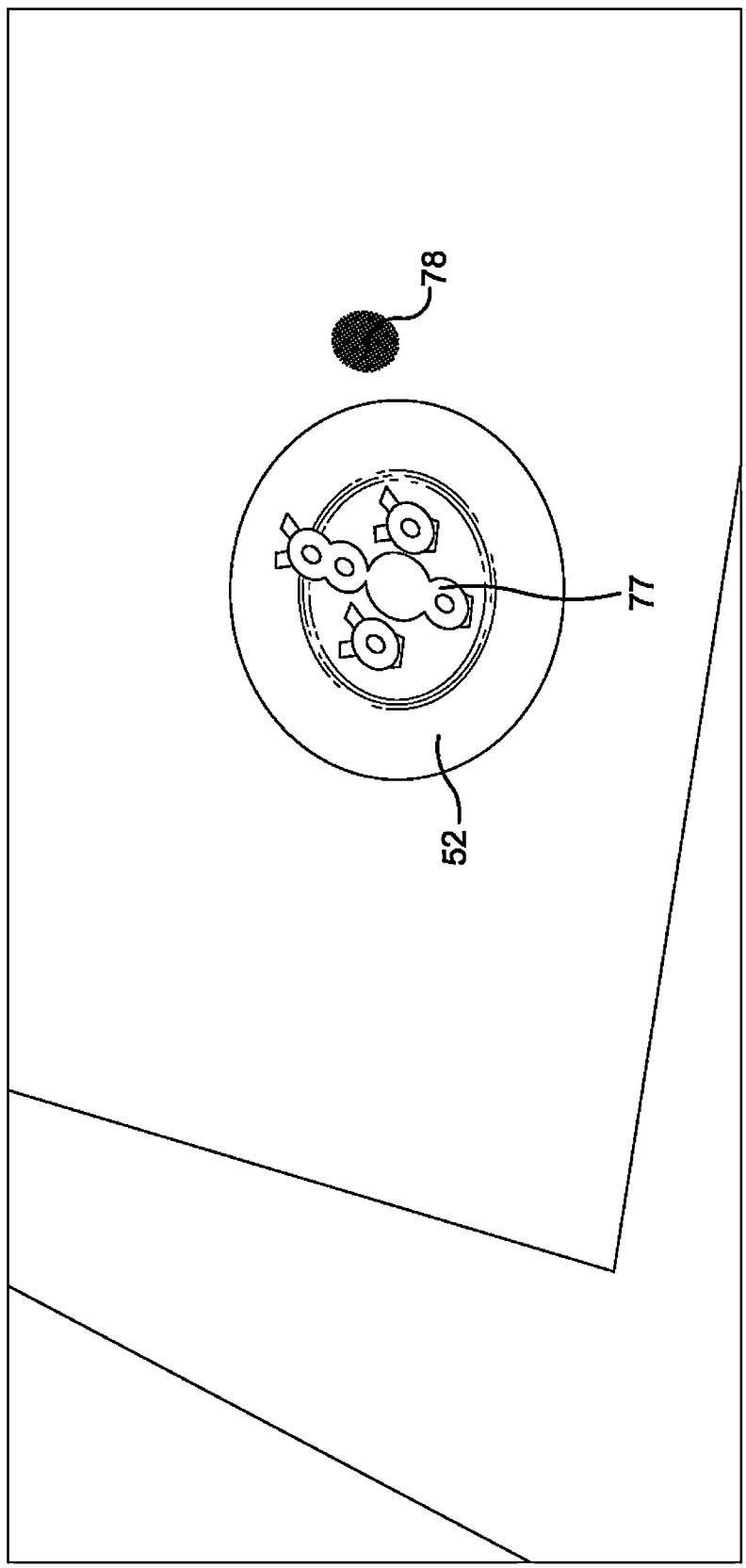
FIG. 8A: Current collector disk (52) with pins (77). The pins are 0.5 mm tall here. On right a porous small disk (78) is shown
Figure 8B:
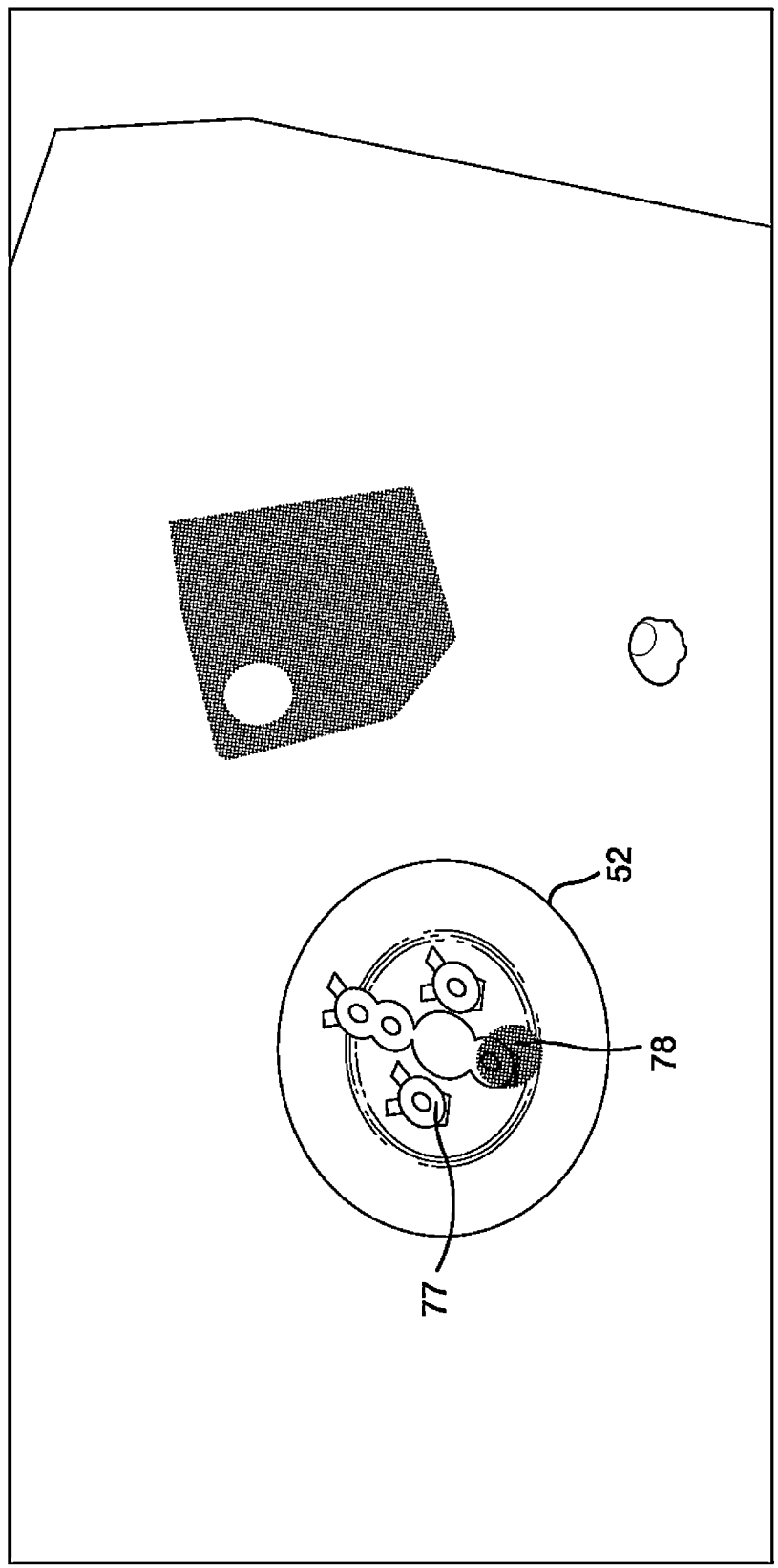
FIG. 8B: Current collector disk (52) with pins (77). A porous small disk (78) is shown inserted over one of the pins.
Figure 8C:
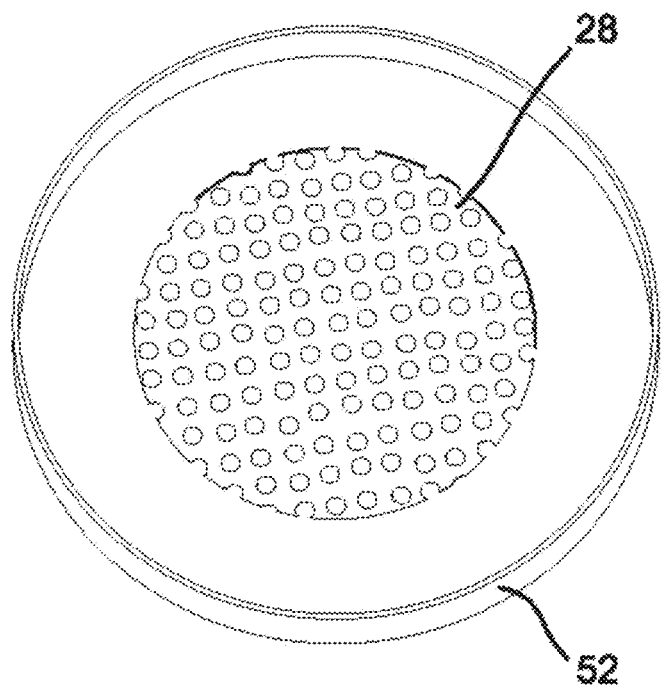
FIG. 8C: Current collector disk (52) with secondary current collector layer (28).
Figure 8D:
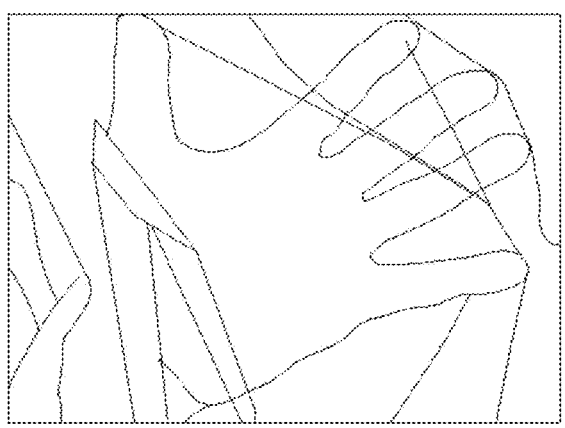
FIGS. 8D and 8E: Images of nonwoven polymeric separator material.
Figure 8E:
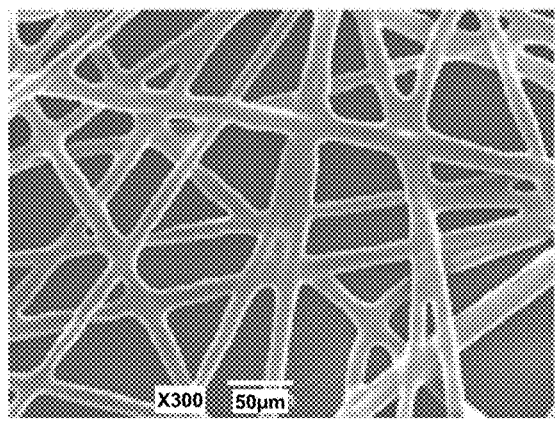

In an example, FIG. 8C shows a current collector layer (52) in the form of a disk, with the auxiliary current collector layer (28) also shown. FIGS. 8D (photograph) and 8E (electron microscope image) show an example of a nonwoven polymer layer that may be used as the electrolyte-containing layer between electrode layers.

Figure 4A:
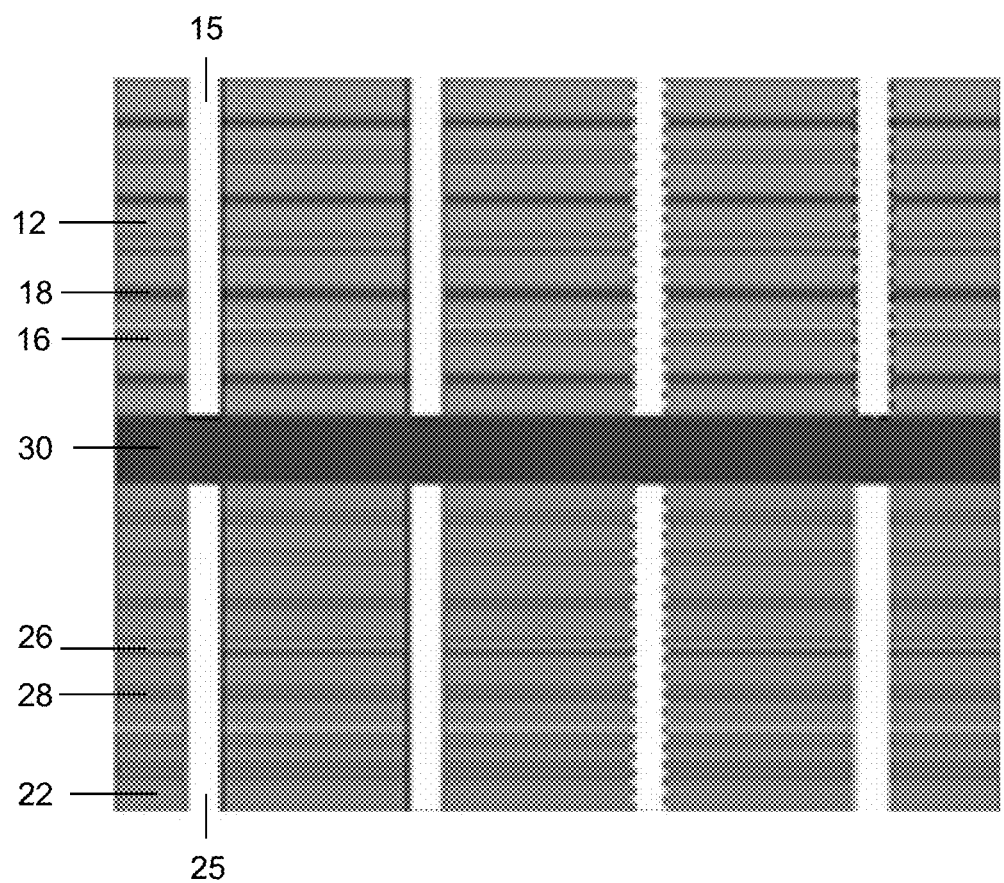
FIG. 4A schematically illustrates a front cross-sectional view of another electrochemical cell. The cathode includes layers comprising an active material (22), layers comprising an electrolyte (26) and layers comprising an auxiliary current collector film (28). Ion-conducting channel (25) is also shown. The anode includes layers comprising an active material (12), layers comprising an electrolyte (16) and layers comprising a current collector (18). Ion-conducting channel (15) is also shown FIG. 4B schematically illustrates one configuration for making an electronic connection to the layers comprising the auxiliary current collector thins films in the layered electrode to the primary electrode current collector (52) connected to relevant the external tab of the cell of FIG. 4A (side view).
Figure 4B:
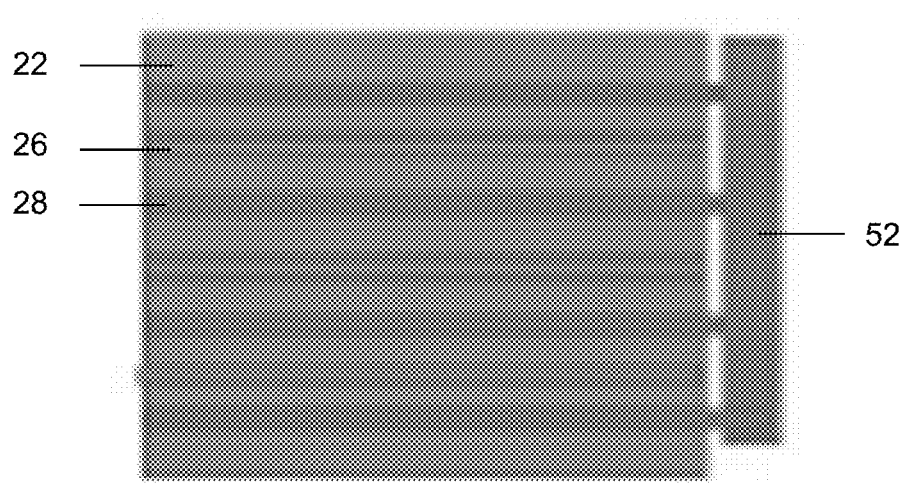
FIGS. 4C and 4D each schematically illustrate a top view of the cell of FIG. 4A and electronic connection of electrode layers of active material to the electrode primary current collector (51) to an outside tab FIG. 5A schematically illustrates a cross-sectional side view of an electrochemical cell which include an additional passage comprising an electronically conducting material through layers of each electrode. The passage in the anode is denoted by (17); the passage in the cathode is denoted by (27).
Figure 4C:
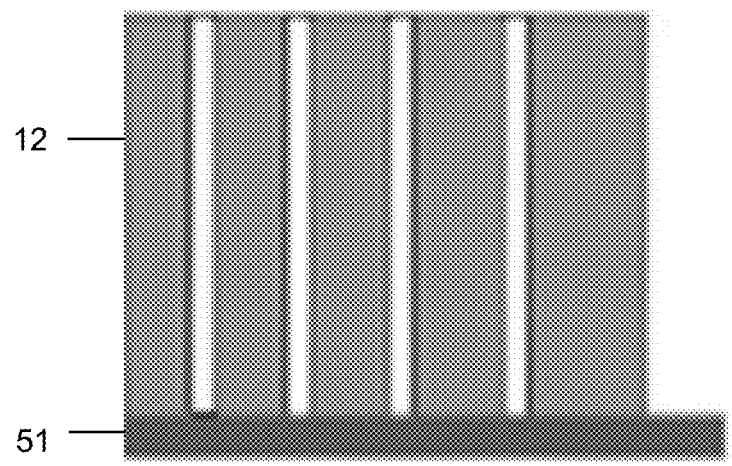
Figure 4D:
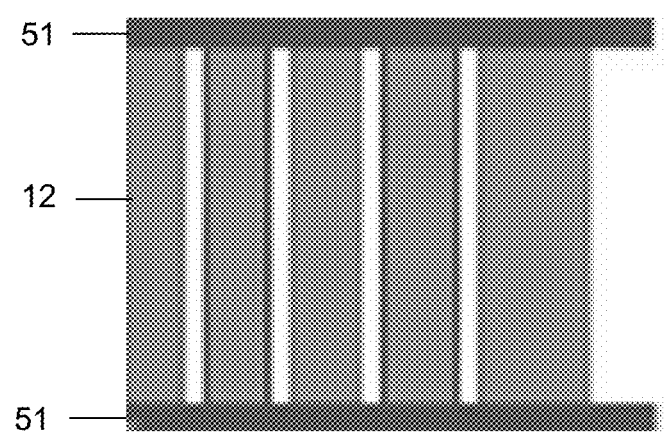

FIG. 4B shows a side view of an example cathode electrode of an example electrochemical cell system. The cathode main current collector layer (52) is connected to the auxiliary anode current collector layers (28).

EXAMPLE 3

3-Dimensional Current Collector for Electrochemical and Electrical Electrodes

In thick electrodes, a major problem is providing low resistance electron conductivity between all areas of the active material and the main current collector (tab) of the said electrode. The invention provides various approaches to resolve this problem.

In an embodiment, for example, a three dimensional current collector for electrochemical cells such as batteries (for example Li-ion, alkaline, zinc ion based, lead acid, Mg ion based batteries, Na ion based batteries, flow batteries, air cathode batteries, semi solid batteries), ultracapacitors, supercapacitors and for electrical cells such as capacitors is introduced.

In an embodiment, for example, the current collector is composed of a base film [first surface] that is substantially parallel to the surface of the electrode [in an embodiment this configuration is similar to what current batteries use, this is also the substrate for electrode active material coating] and at least one of the following:
  a series of rods substantially perpendicular to the said first surface and electronically connected to the said first surface, and/or
  a series of films [e.g., series of small films] substantially parallel to the said first surface and electronically connected to it, and also electronically connected to at least a portion of the active electrode material, whereas each film of the said series of films can have substantially less surface area than the said first surface, and/or
  a series of films [e.g., series of large films] substantially parallel to the said first surface and electronically connected to it, and also electronically connected to at least a portion of the active electrode material, whereas each film of the said series of films can have substantially same surface area as the said first surface.

In an embodiment, for example, the thickness of the said series of small films or series of large films is smaller than the thickness of the active material coating of the said electrode.

In some embodiments the series of large films or the series of small films are porous, perforated, foam or mesh In some embodiments the series of large films has the surface area more than 30% of the surface area of the said electrode active material coating. The higher the better, as each large film is inside a coating of the active material [in some embodiments this configuration is similar to current collector of Li-ion electrode films, so we want maximum contact with the active material].

In some embodiments the series of small films as the surface area less than 15% of the surface area of the said electrode active material coating. The lower the better [e.g., on top and/or bottom of the active material coating. In some embodiments smaller is better so it doesn't block the active surface of the active material].

In some embodiments the active electrode material is coated on the series of large films, one side or two sides.

In some embodiments an electrical conductive adhesive can be used to better electronically connect the mentioned layers. The electrical conductive adhesive can be for example silver paste, copper paste, carbon black paste, conductive carbon paste, Graphene paste, nanocarbon paste or any other electronically conductive electrochemically inactive adhesive. The paste can be made with slurry of the electrical conductive material (carbon based or metals) and a bonder (polyvinylidene fluoride or any other binder) in a solvent (dimethyl carbonate, N-methyl-2-pyrrolidone, acetone, water, dimethyl sulfoxide, or other solvents of binders).

In some embodiments that electrical conductive adhesive paste can be placed to electrically connect the said rods to the said series of small films.

An embodiment of Example 3:

Assume "t" thickness, DO diameter, surface has holes with area percentage of "Sh", electrode disk=. Total area of 2 sided electrode film is $A0 = 2Pi/4(1-Sh)DO^2$ with N current collector holes in it, each diameter, then the total contact surface between current collector rods and the electrode is:

$A1 = N \cdot Pi \cdot d \cdot t$

If we add a thin washer, ID=d, OD=D, of a porous current collector, with porosity p, to the top and bottom of each rod-hole connections, then the added surface area of electronic contact is $A2 = 2N \cdot (1-p) \cdot Pi \cdot (D^2 - d^2)/4$ The new total surface of electronic contact is then $A3 = N \cdot Pi[d \cdot t + (1-p)(D^2 - d^2)/2]$ The ratio of A3/A1 is then $A3/A1 = 1 + (1-p)(D^2 - d^2)/(2d \cdot t)$ The lost area of the disk due to the washer is $A2/A0 = N \cdot (1-p)/(1-Sh) \cdot (D^2 - d^2)/DO^2$

| p | D | D | T | A3/A1 | N | Sh | D0 | A2/A0% |
|---|---|---|---|---|---|---|---|---|
| 0 | 0.5 | 0.8 | 0.15 | 6.2 | 5 | 0 | 14.2875 | 0.955261 |
| 0 | 0.5 | 0.8 | 0.15 | 6.2 | 5 | 0.5 | 14.2875 | 1.910522 |

-continued

| p | D | D | T | A3/A1 | N | Sh | D0 | A2/A0% |
|---|---|---|---|---|---|---|---|---|
| 0.5 | 0.5 | 0.8 | 0.15 | 3.6 | 5 | 0.5 | 14.2875 | 0.955261 |
| 0 | 0.5 | 1 | 0.15 | 11 | 5 | 0 | 14.2875 | 1.837041 |
| 0 | 0.5 | 1 | 0.15 | 11 | 5 | 0.5 | 14.2875 | 3.674081 |
| 0.5 | 0.5 | 1 | 0.15 | 6 | 5 | 0.5 | 14.2875 | 1.837041 |
| 0 | 0.5 | 1.25 | 0.15 | 18.5 | 5 | 0 | 14.2875 | 3.214821 |
| 0 | 0.5 | 1.25 | 0.15 | 18.5 | 5 | 0.5 | 14.2875 | 6.429642 |
| 0.5 | 0.5 | 1.25 | 0.15 | 9.75 | 5 | 0.5 | 14.2875 | 3.214821 |
| 0 | 0.5 | 1.5 | 0.15 | 27.66667 | 5 | 0 | 14.2875 | 4.898775 |
| 0 | 0.5 | 1.5 | 0.15 | 27.66667 | 5 | 0.5 | 14.2875 | 9.79755 |
| 0.5 | 0.5 | 1.5 | 0.15 | 14.33333 | 5 | 0.5 | 14.2875 | 4.898775 |

FIGS. 8A and 8B show a current collector disk (e.g., 52), with pins (metal rods, 77). For example, the pins are 0.5 mm long. A porous small disk (78) that may be used as an example mesh current collector layer.

Figure 7A:
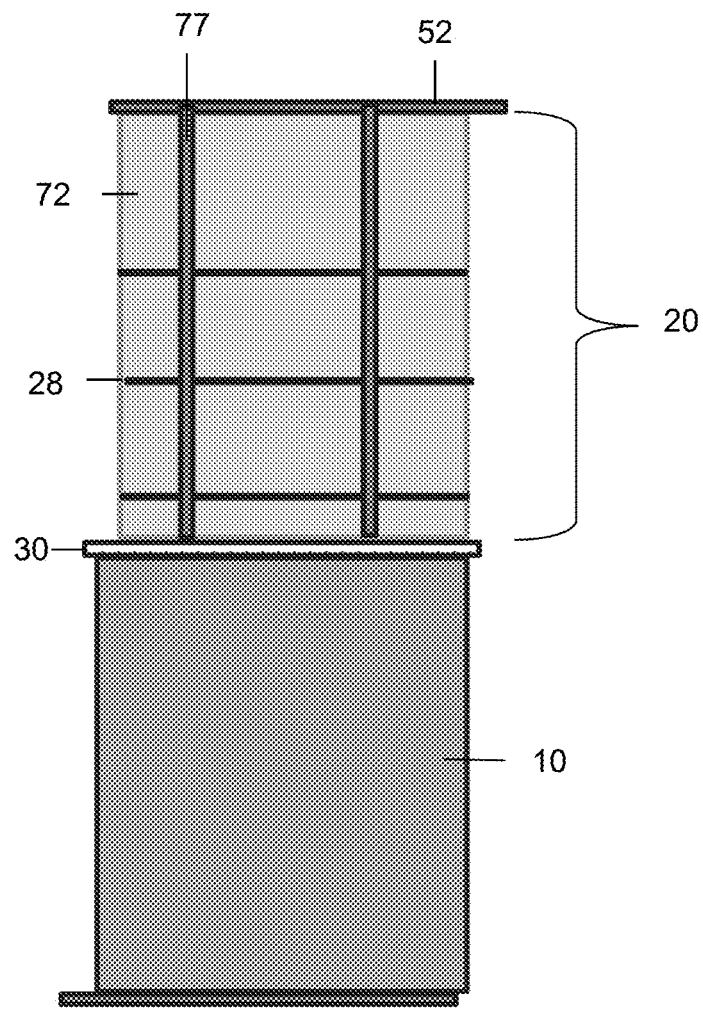
FIG. 7A: schematically illustrates another electrochemical cell. The cathode (20) includes electrode material (72), a plurality of current collector layers (28) and a plurality of current collector rods (77). The current collector layers are in electronic communication with the current collector rods, which in turn are in electronic communication with the primary current collector layer (52).
Figure 7C:
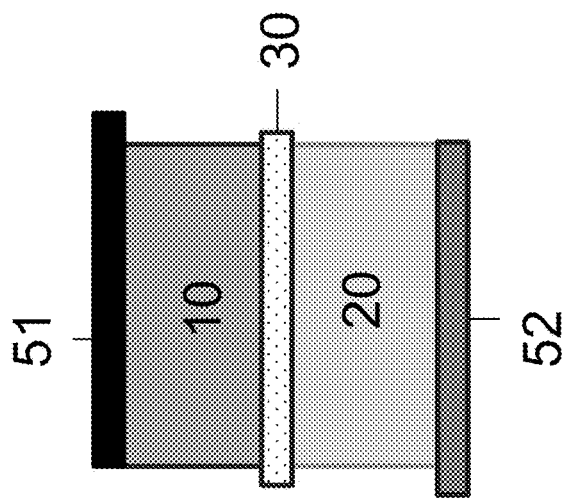
FIG. 7C schematic illustration of electrochemical cell.
Figure 7B:
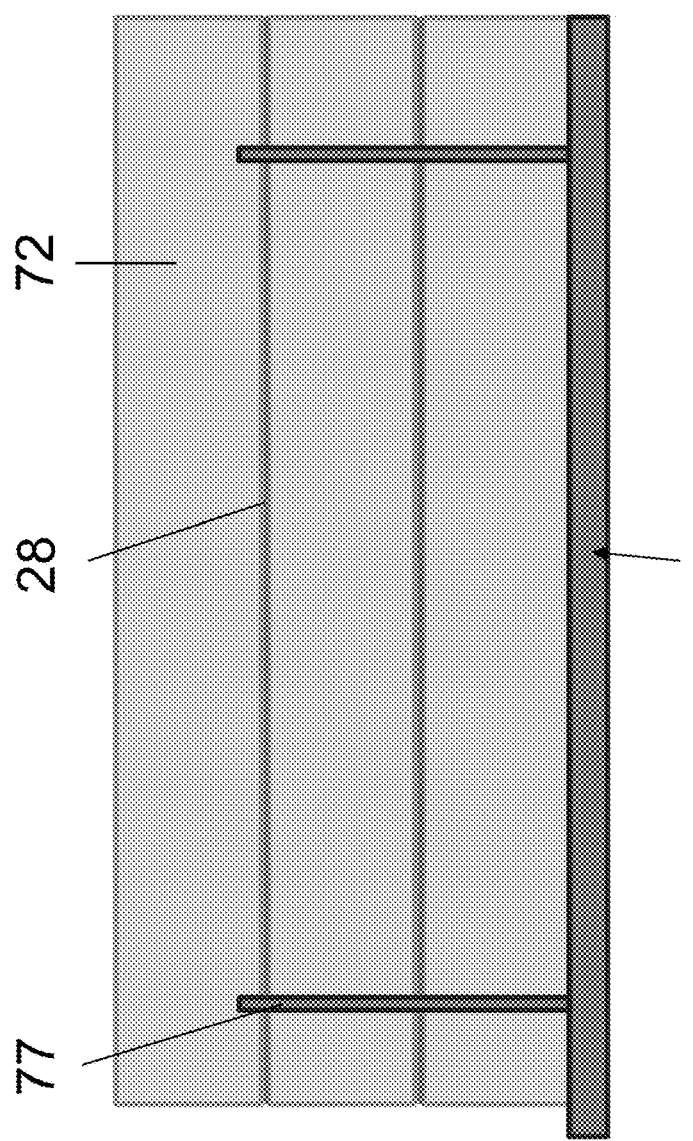
FIG. 7B: schematic illustration of a cathode of the electrochemical cells of FIG. 7C. The cathode (20) includes electrode material (72), a plurality of current collector layers (28) and a plurality of current collector rods (77). In this cathode the current collector rods do not span the electrode material. The current collector layers are in electronic communication with the current collector rods, which in turn are in electronic communication with the primary current collector layer (52).

FIGS. 7B-7C show side views of an example electrochemical cell system, particularly illustrating the 3D current collection system within a single electrode. Electrode active layers (72) are separated by horizontal auxiliary current collector layers (28). The electrode active layer (72) material may include silicon, sulfur, tin, lithium, carbon, lithium metal oxides, and lithium metal phosphates, and may further include binder and carbon-containing conductive materials. Vertical current collector layers (rods or pins, 77) are connected to the primary (horizontal) current collector layer (52) of the electrode, wherein the primary current collector layer is the layer (tab) that is connected to an external electronic circuit during system operation. FIGS. 9A-9B show side views of another example electrochemical cell system, which further comprises electrolyte-containing layers (26). FIGS. 9C-9D show side views of another example electrochemical cell system, particularly illustrating conductive adhesive (80) introduced at the junction of some of the current collector layers (rods, pins, 77) and electrolyte containing layers (26). The conductive adhesive may include, for example, carbon black with polyvinylidene, silver paste, or copper paste.

EXAMPLE 4

Battery Cells

In an embodiment, the invention provides a method for making battery cells with increased volumetric energy, for example, wherein the method is based on a new cell architecture allowing to reduce the porosity of the electrodes and the ratio of separator to electrodes. In the new architecture layers of each electrode, with a current collector in the center of the layer, are stacked on each other such that electrolyte exists between the layers. The stack of anode layers and the stack of cathode layers are parallel with the normal axis of the layers perpendicular to the separator between the stacks.

Making thick electrodes results in higher energy per weight and volume, but the diffusion of ions in thick electrodes gets very resistive. The electrodes used in parallel plate batteries have high porosity to allow thicker electrodes and thus reduce the separator to electrode ratio. About 40% of the current electrode films is empty, resulting in very high loss of energy per volume efficiency.

In the an embodiment of the invention, each layer can be a commercial electrode film or it can be made in-situ by using the pre-prepared molds.

In the an embodiment of the invention, each layer can be about 50-100 um thick and any length. The width is designed based on the required power and charging rate. It is estimated that each 100 um width is equivalent to 10 um separator resistance in conventional design. As an example the width can be 200 um. The number of layers on top of each other is arbitrary. As an example there can be 10 layers on top of each other.

In the an embodiment of the invention, the battery is chemistry agnostic and thus can be any rechargeable or primary battery. E.g., it can be a li-ion battery, zinc battery, lead acid, or metal air battery.

In the an embodiment of the invention, the cell can further be shaped into the prismatic or cylindrical shapes, such as 18650.

Figure 12A:
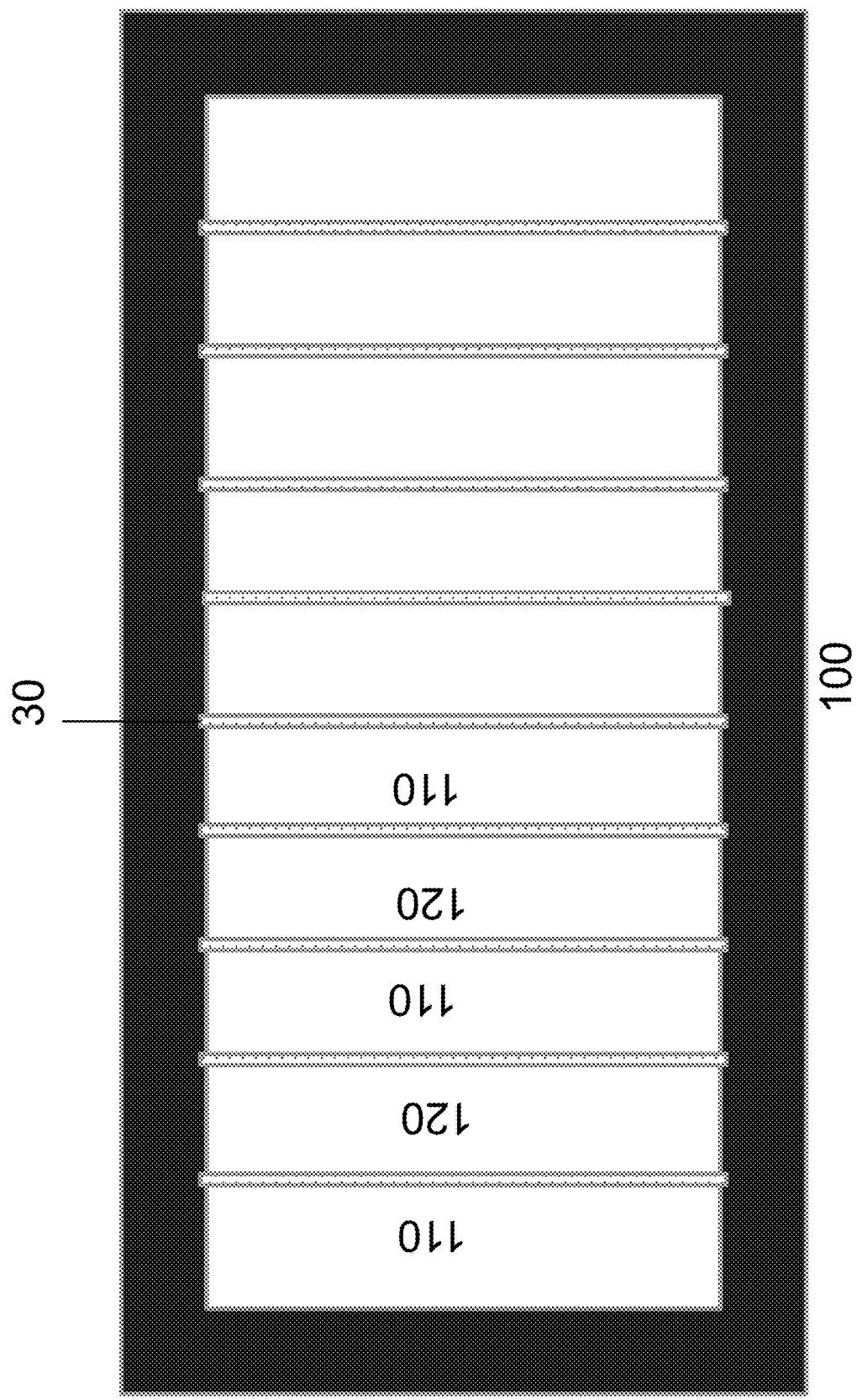
FIG. 12A: Battery case (100) with anode spaces (110) and cathode spaces (120). A separator (30), which can be a solid electrolyte, is disposed between anode and cathode spaces. Top view before placing the anodes and the cathodes.
Figure 12B:
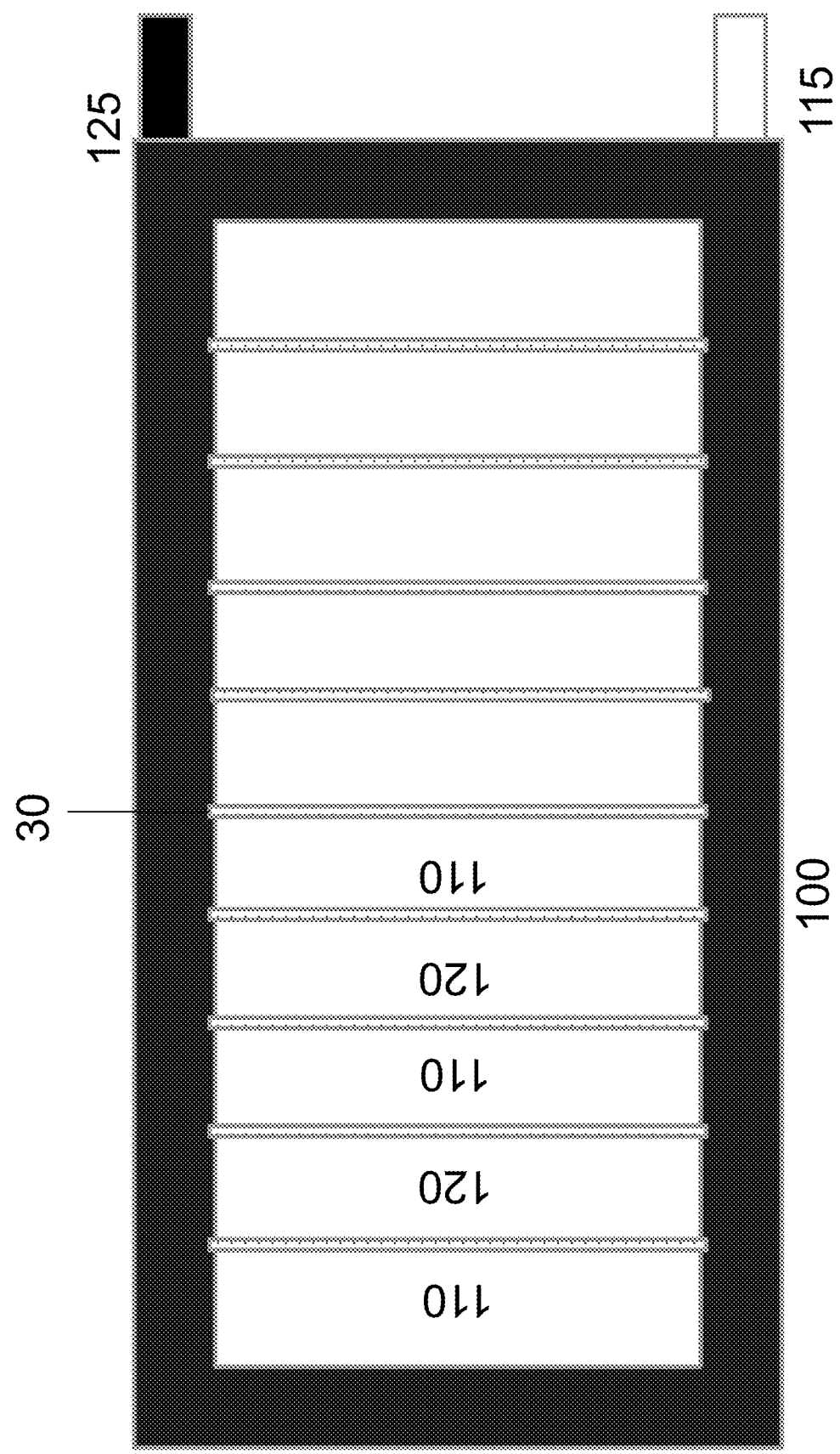
FIG. 12B: Battery case (100) with anode spaces (110) and cathode spaces (120). Cathode tab (125) and anode tab (115) also shown.
Figure 13:
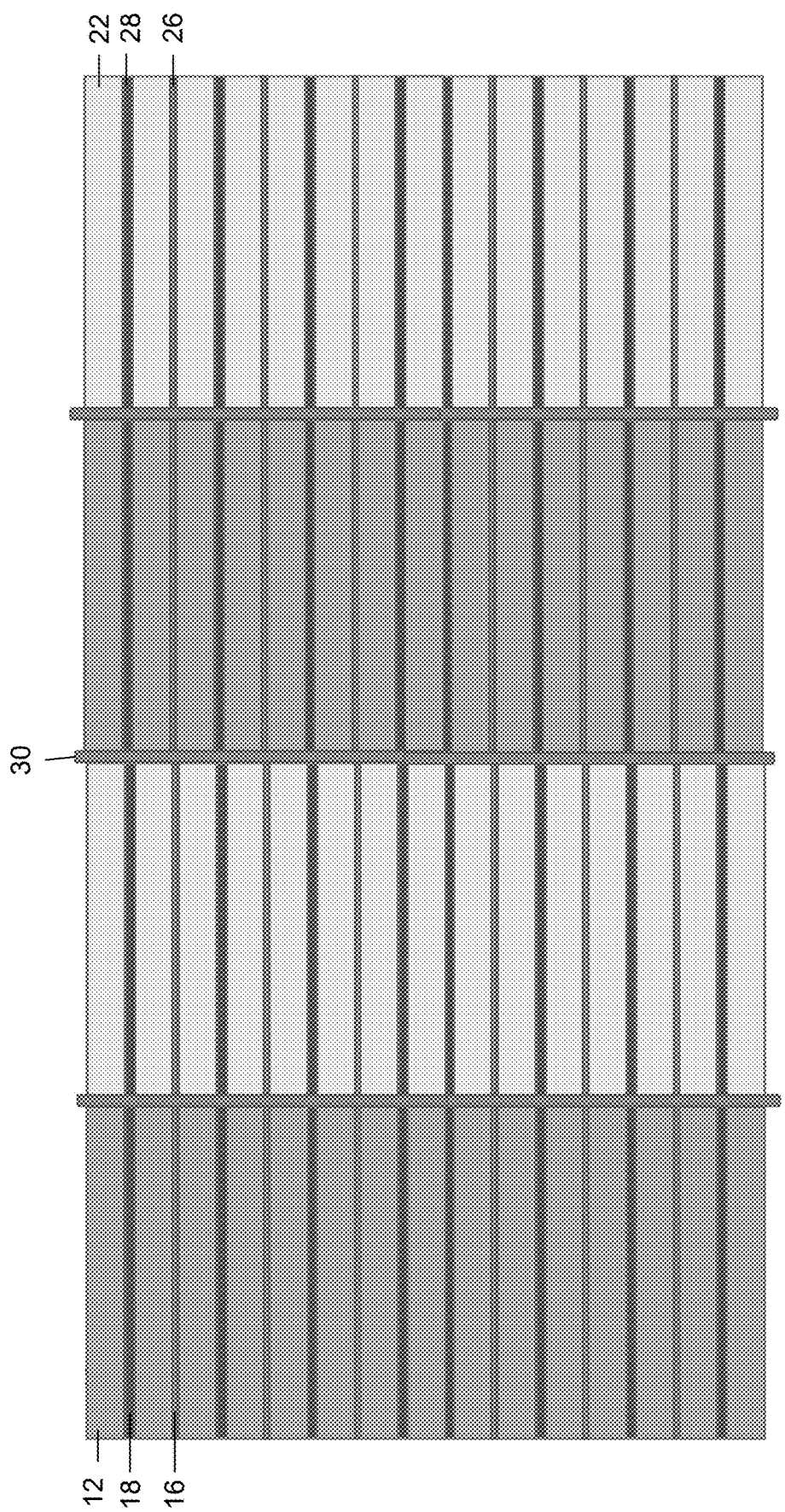
FIG. 13: Schematic illustration of cell assembly of multilayer anodes and multilayer cathodes, which a separator between each anode and each cathode. From left to right: anode stack, cathode stack, anode stack and cathode stack.
Figure 14:
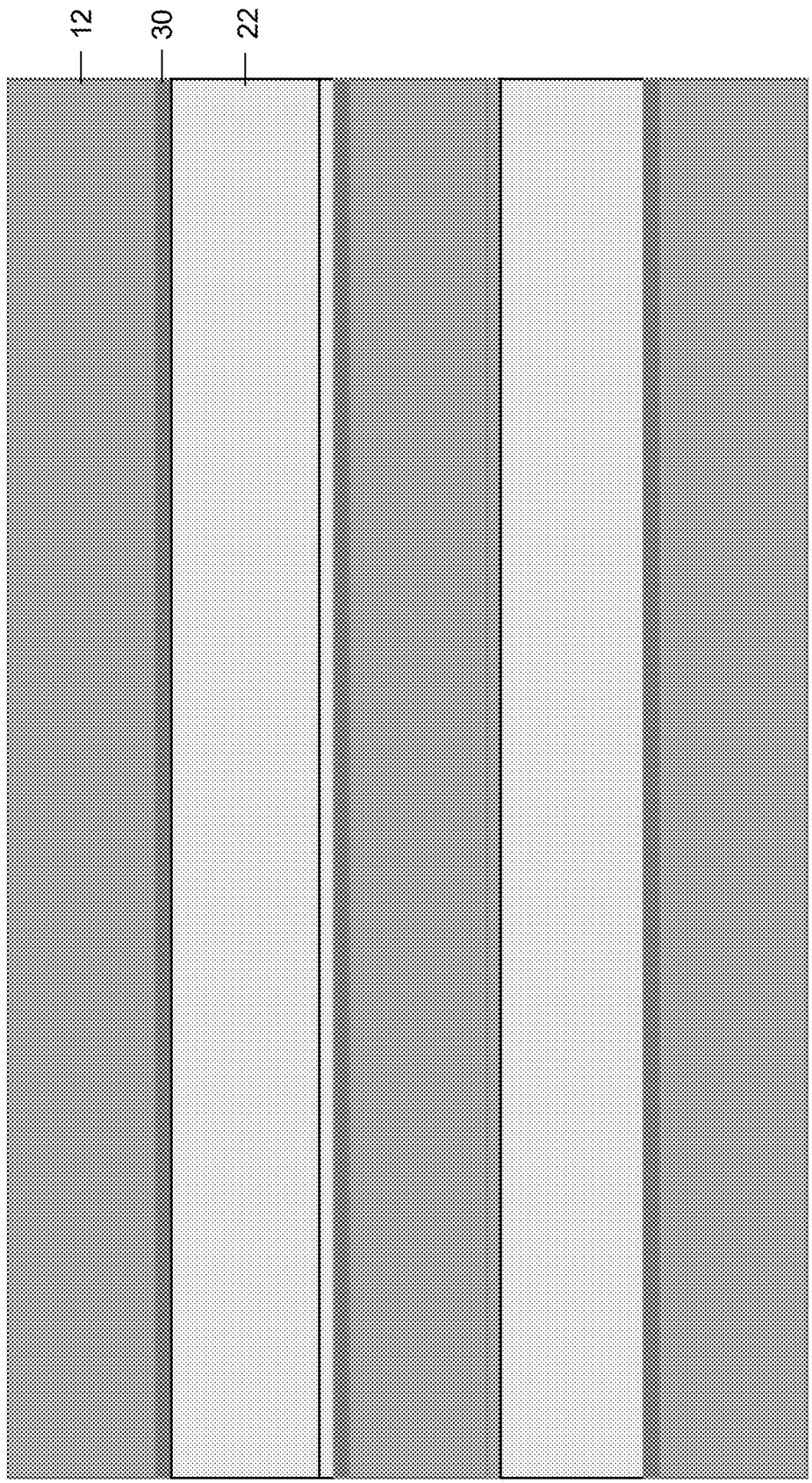
FIG. 14: Top view of cell assembly showing top of anode and cathode stacks with a separator between each anode and cathode.
Figure 15:
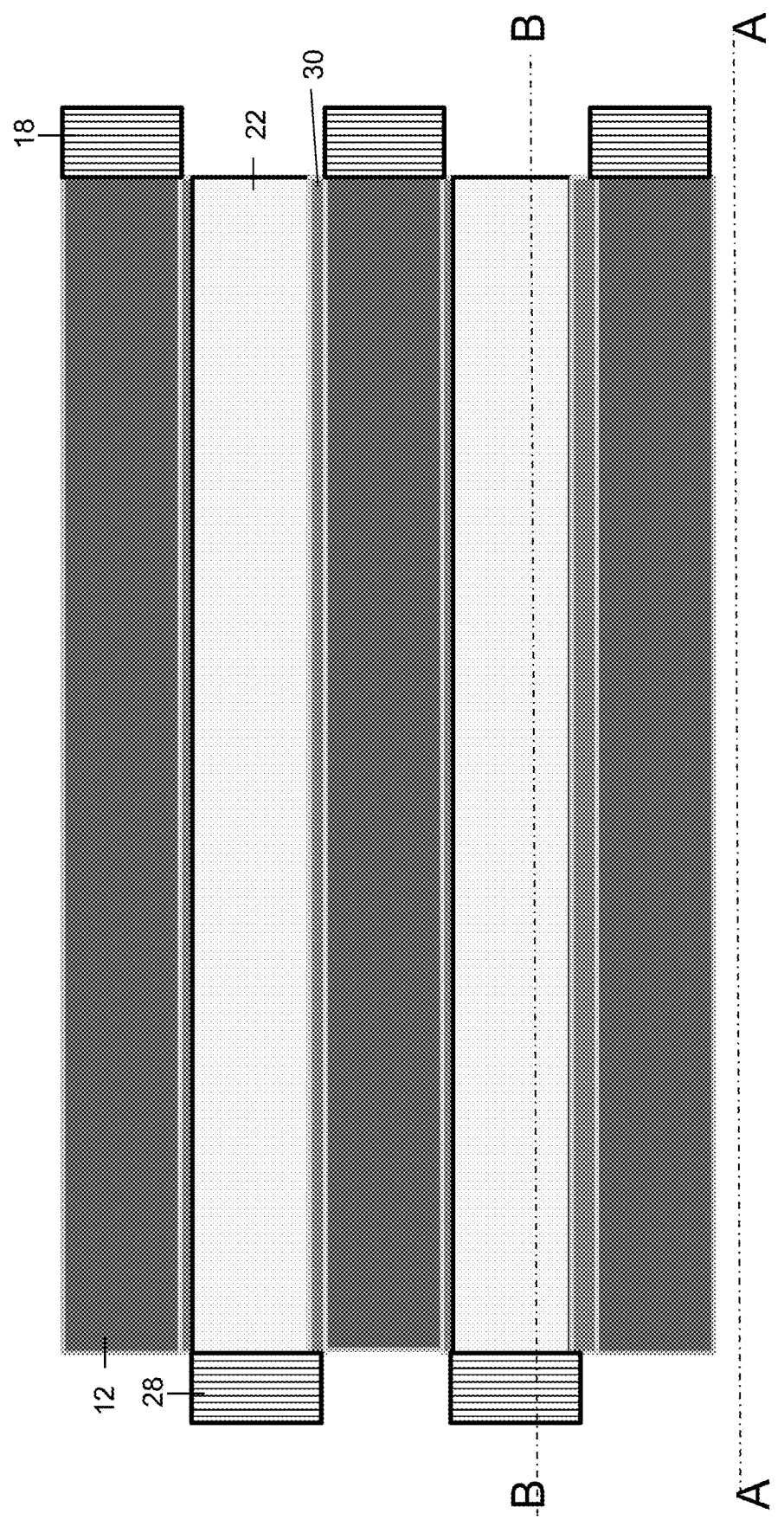
FIG. 15: Top view of cell assembly showing extension of anode current collector layers (18) and cathode current collector layers (28). Separators (30) also shown, as well as section lines B-B and A-A.
Figure 16A:
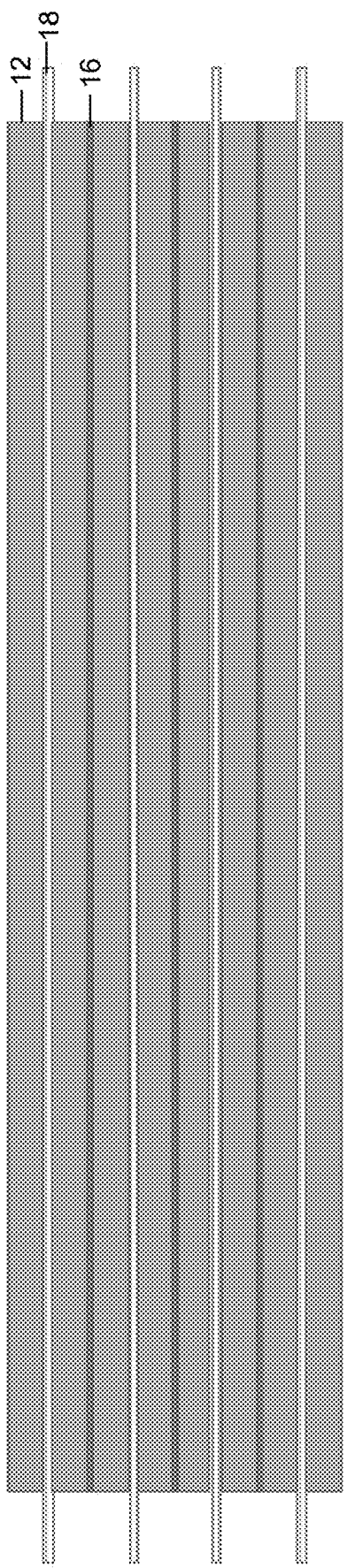
FIG. 16A: Side view (A-A cross-section) of anode stack, showing extension of current collector layers (18) past the other layers on both sides of the stack.
Figure 16B:
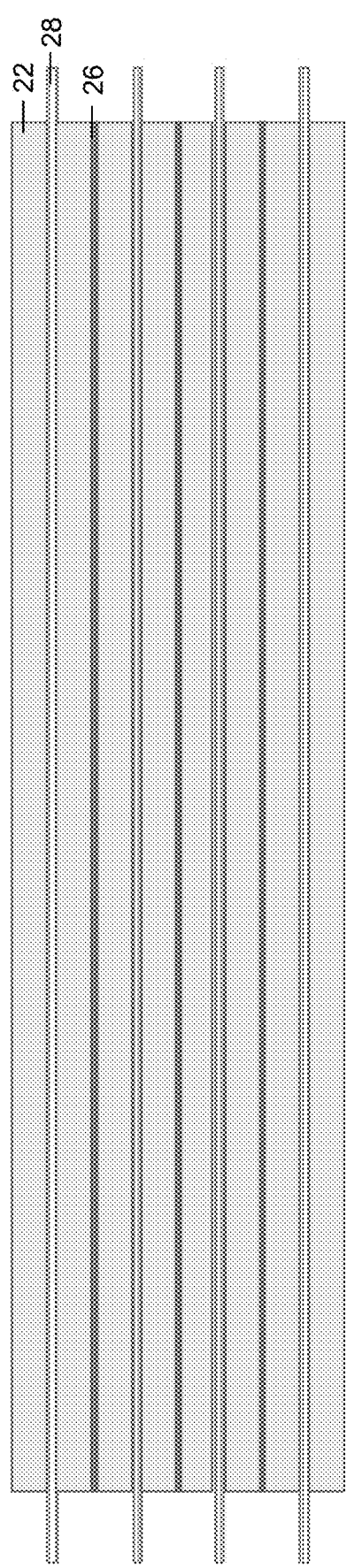
FIG. 16B: Side view (B-B cross-section) of cathode stack, showing extension of current collector layers (28) past the other layers on both sides of the stack.
Figure 17A:
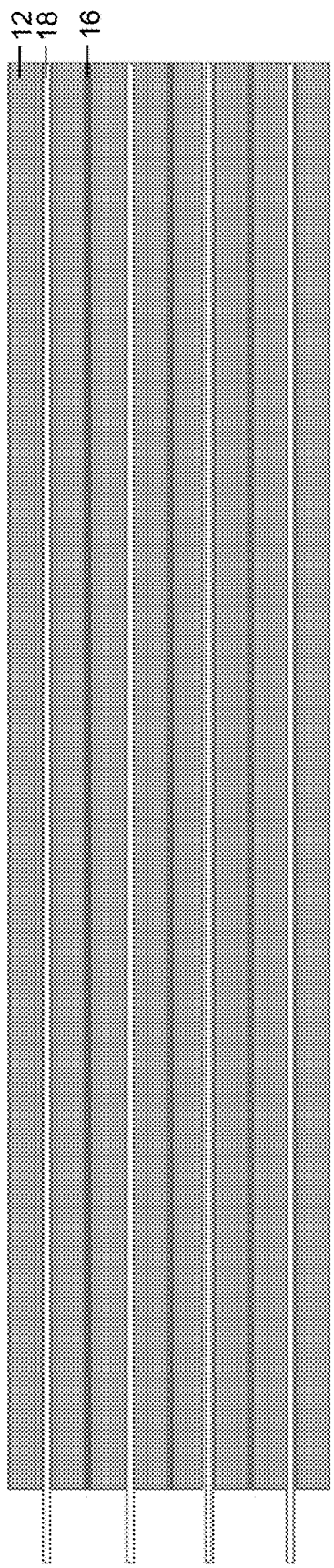
FIG. 17A: Side view (A-A cross-section) of anode stack, showing extension of current collector layers (18) past the other layers on only one side of the stack.
Figure 17B:
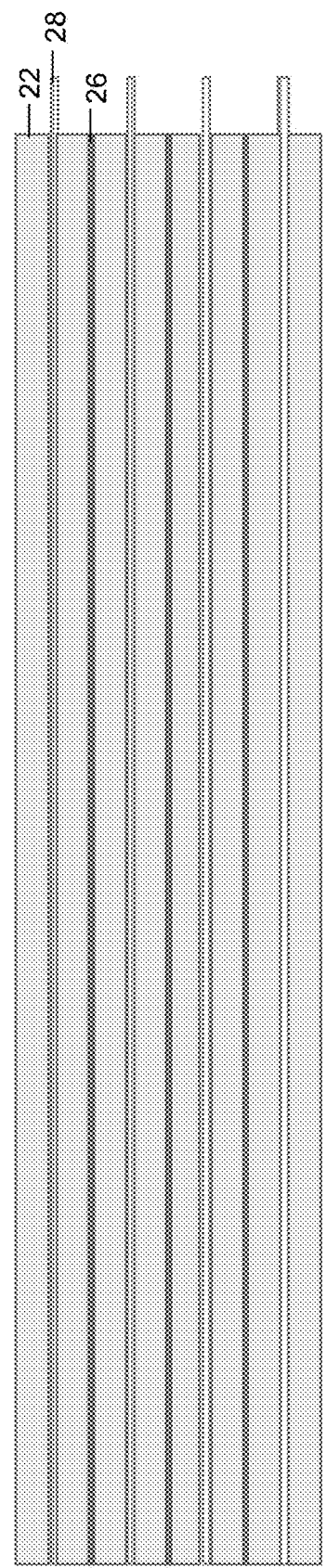
FIG. 17B: Side view (B-B cross-section) of cathode stack, showing extension of current collector layers (28) past the other layers on only one side of the stack.
Figure 18A:
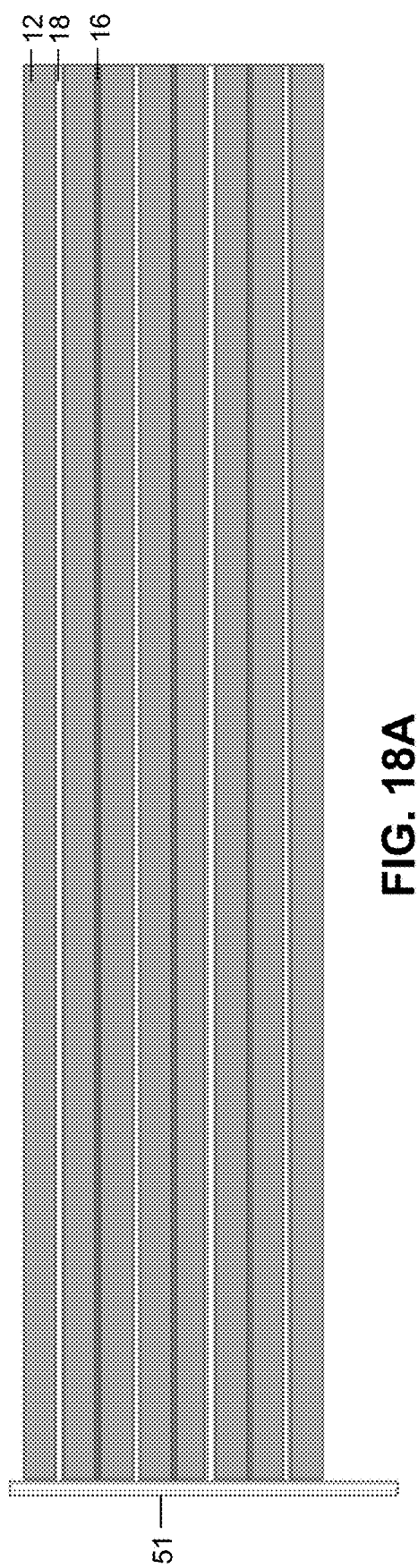
FIG. 18A: Side view (A-A cross-section) of anode stack, showing extension of current collector layers (18) past the other layers on only one side of the stack and connection to primary anode current collector (51).
Figure 18B:
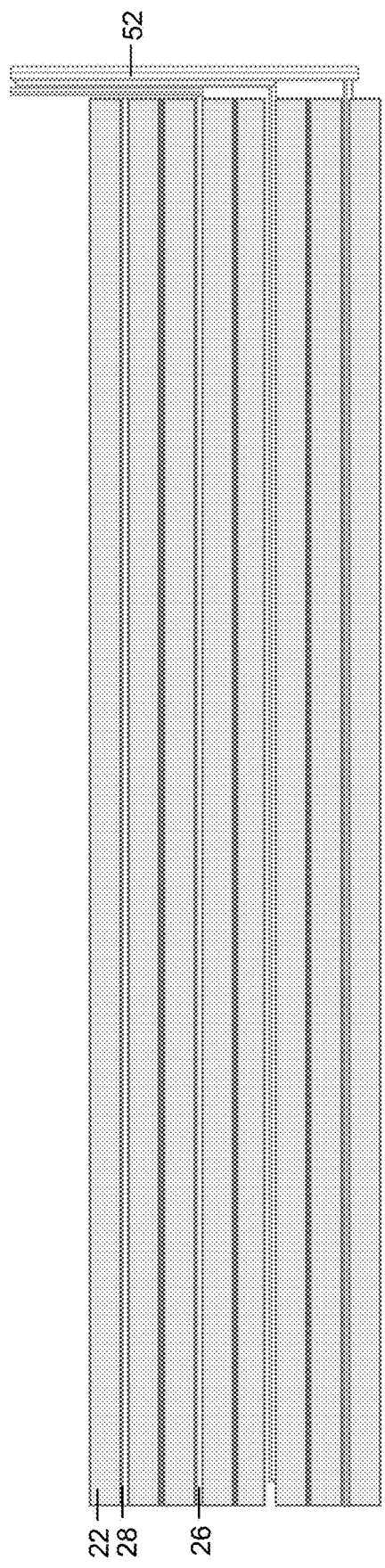
FIG. 18B: Side view (B-B cross-section) of cathode stack, showing extension of current collector layers (28) past the other layers on only one side of the stack and connection to primary cathode current collector (52).
Figure 19A:
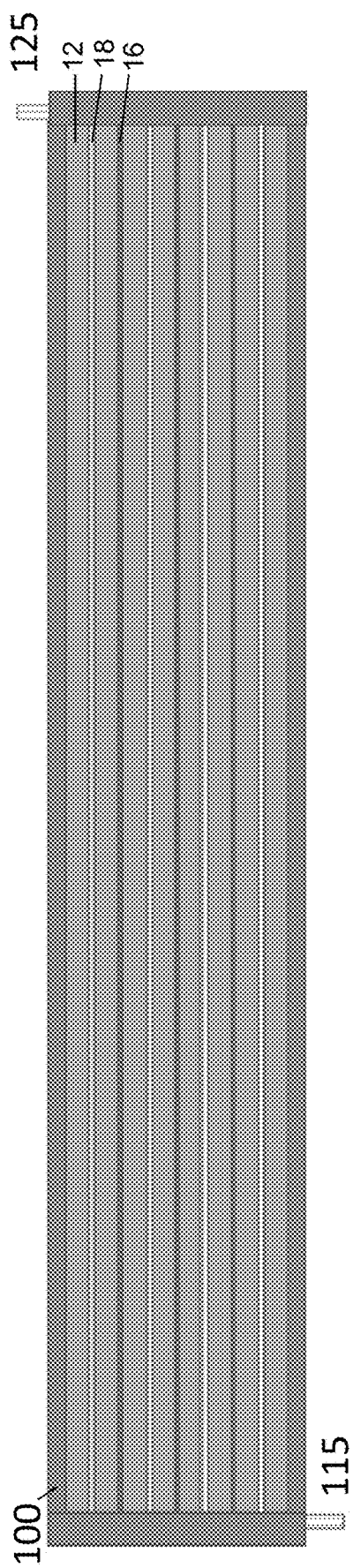
FIG. 19A: Side view (A-A cross-section) of anode stack, showing one configuration of anode tab (115) and cathode tab (125).
Figure 19B:
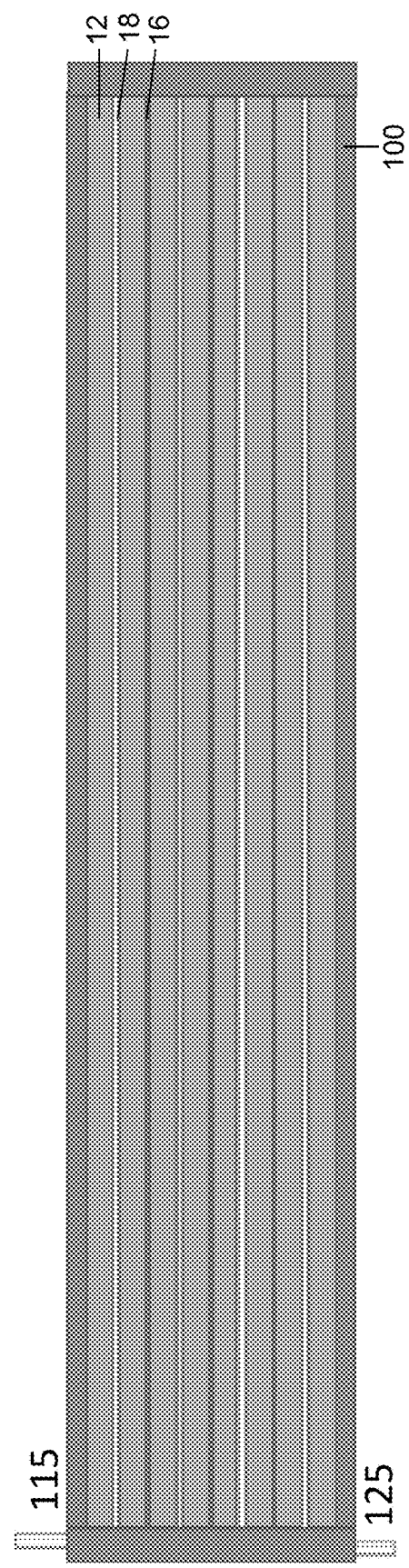
FIG. 19B: Side view (A-A cross-section) of anode stack, showing another configuration of anode tab (115) and cathode tab (125).
Figure 20:
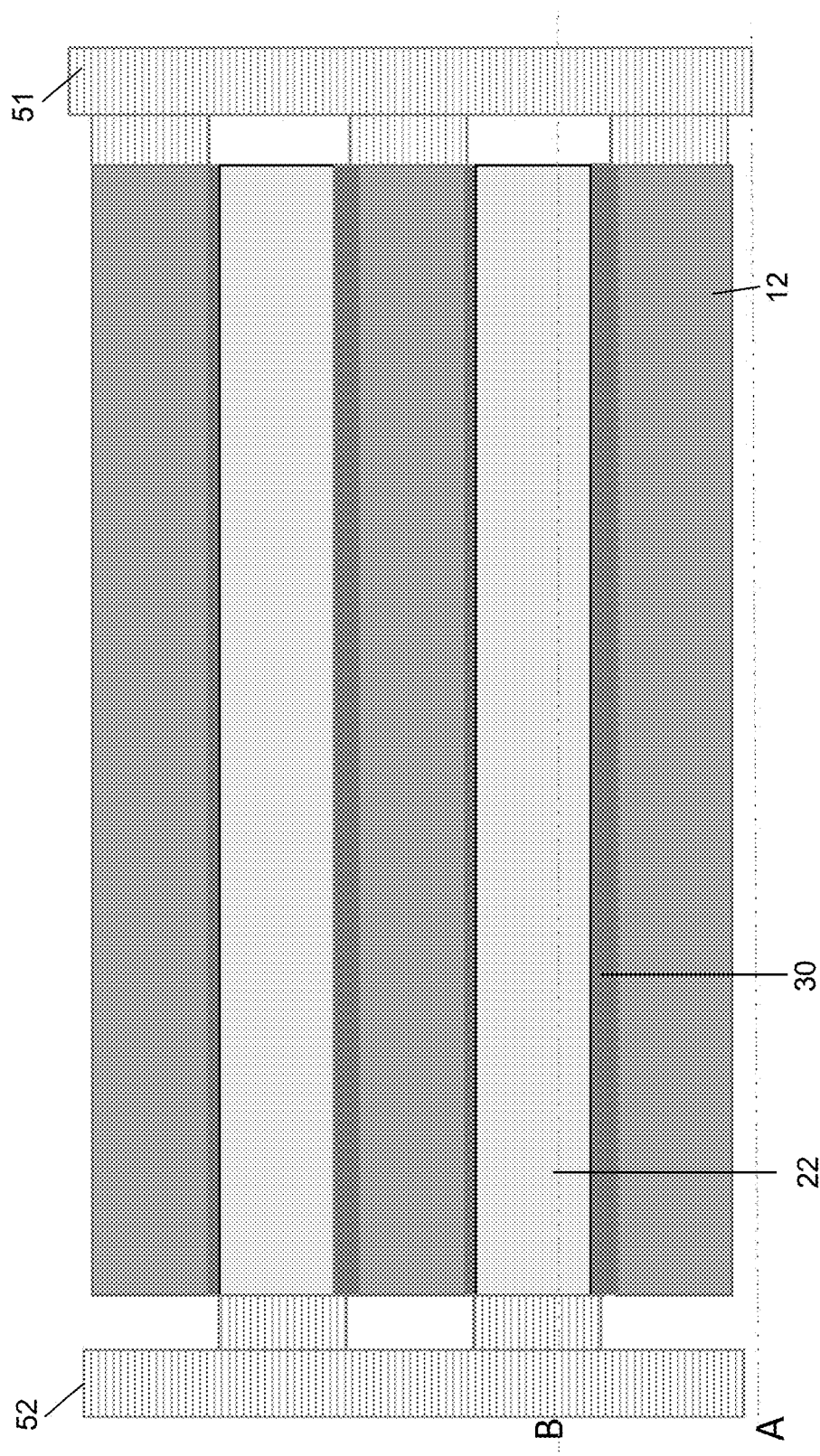
FIG. 20: Top view of cell assembly showing connection of anode current collector layers to primary anode current collector (51) and connection of cathode current collector layers to primary cathode current collector (52).

FIGS. 11-24 illustrate an example electrochemical cell system. FIGS. 11A-11C show front, side, and top views, respectively, of anode active layers (12) with internal auxiliary current collector layers (18). FIGS. 12A-12B, and 24 show top views of an example electrochemical cell system (battery) case (100). The case has alternating spaces (110, 120) for the anode electrodes and the cathode electrodes, with the spaces separated by separator layers (30). The case also has external tabs, or current collector layers, for the cathode (125) and anode (115) that allow connection of the system to an external electronic circuit. The multilayer electrode system, which is part of an example electrochemical cell system, is shown in FIG. 13. Stacks of anode active layers (12) and stacks of cathode active layers (22) are each vertically separated by a separator layer (30) and horizontally by electrolyte-containing layers (16, 26) and auxiliary current collector layers (18, 28). An example system is further illustrated with a top view in FIG. 14, wherein anode (12) and cathode (22) active layers are separated by separator layers (30). FIG. 15 further adds to the illustration in FIG. 14 by showing the auxiliary anode (18) and cathode (28) current collector layers extending beyond the anode and cathode active layers. FIGS. 16A-16B, 17A-17B, 18A-18B, and 19A-19B illustrate side views corresponding to the illustration in FIG. 14, wherein the current collector layers extend beyond the anode and cathode layers (FIGS. 16A, 17A, 18A, and 19A show an anode stack (A-A cross section), and FIGS. 16B, 17B, 18B, and 19B (B-B cross section) shows a cathode stack). FIGS. 18A-18B further show the main current collector layers (tabs, 51 and 52) as they are connected to each internal auxiliary current collector layer (18, 28). FIGS. 19A-19B further show the anode (A) and cathode (B) electrode assemblies within an electrochemical cell system case (100), with anode and cathode corresponding collector current tabs (115 125, respectively).

Figure 21:
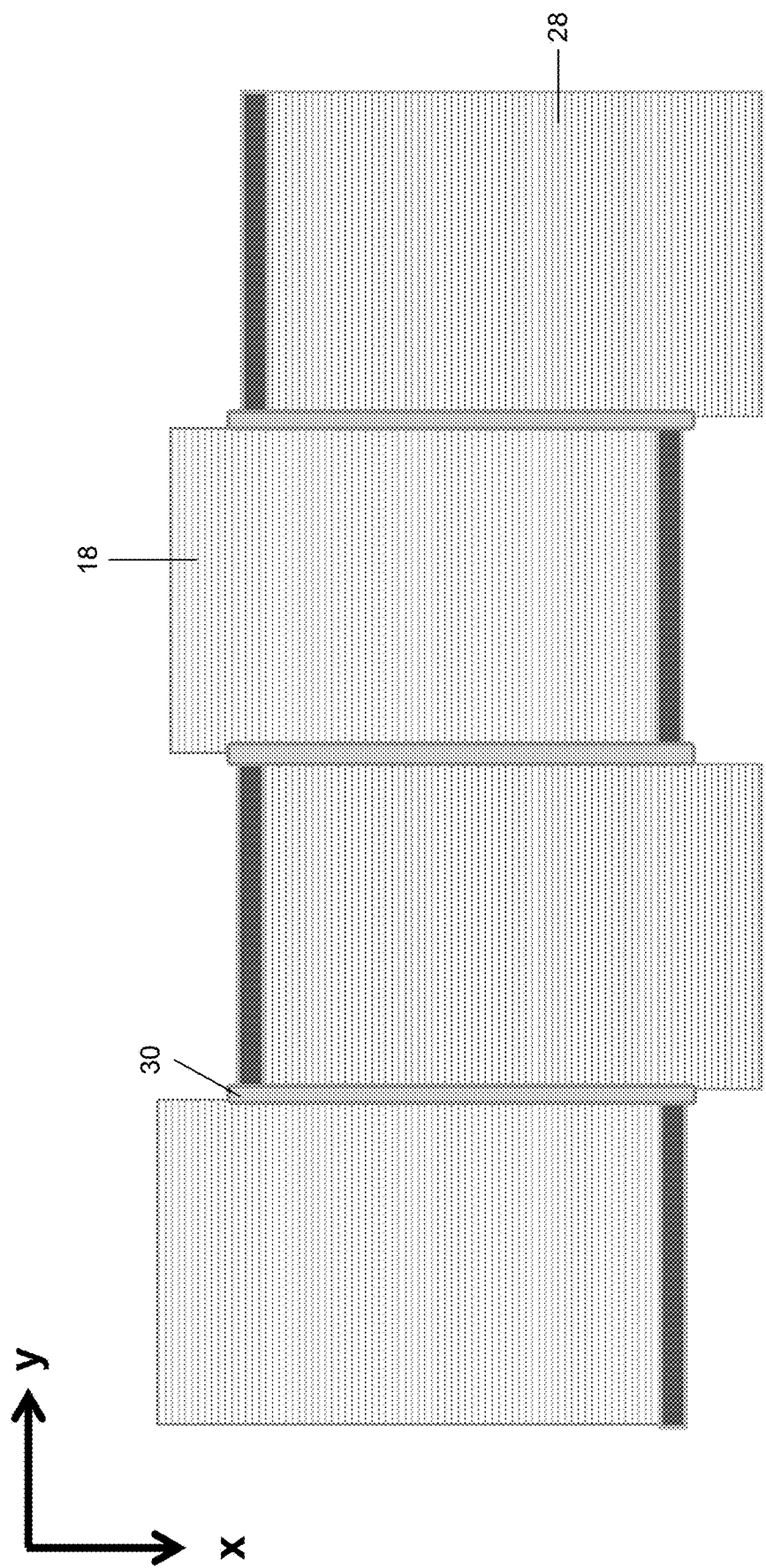
FIG. 21: Front view between case and cell of anode and cathode primary current collector layers.
Figure 22:
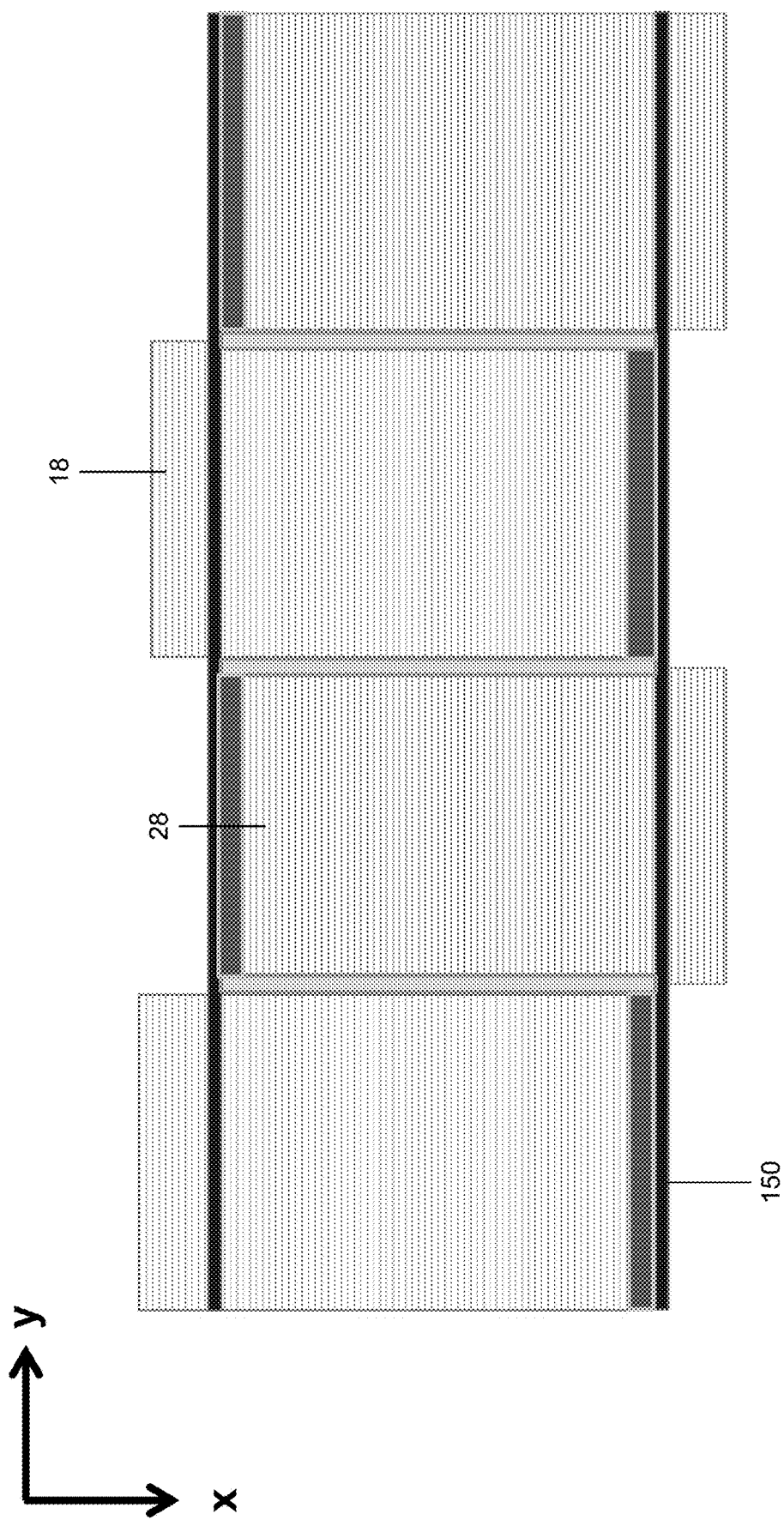
FIG. 22: Front view between case and cell of anode and cathode current collector layers, showing isolative layer (150) on top and bottom of cell.
Figure 23:
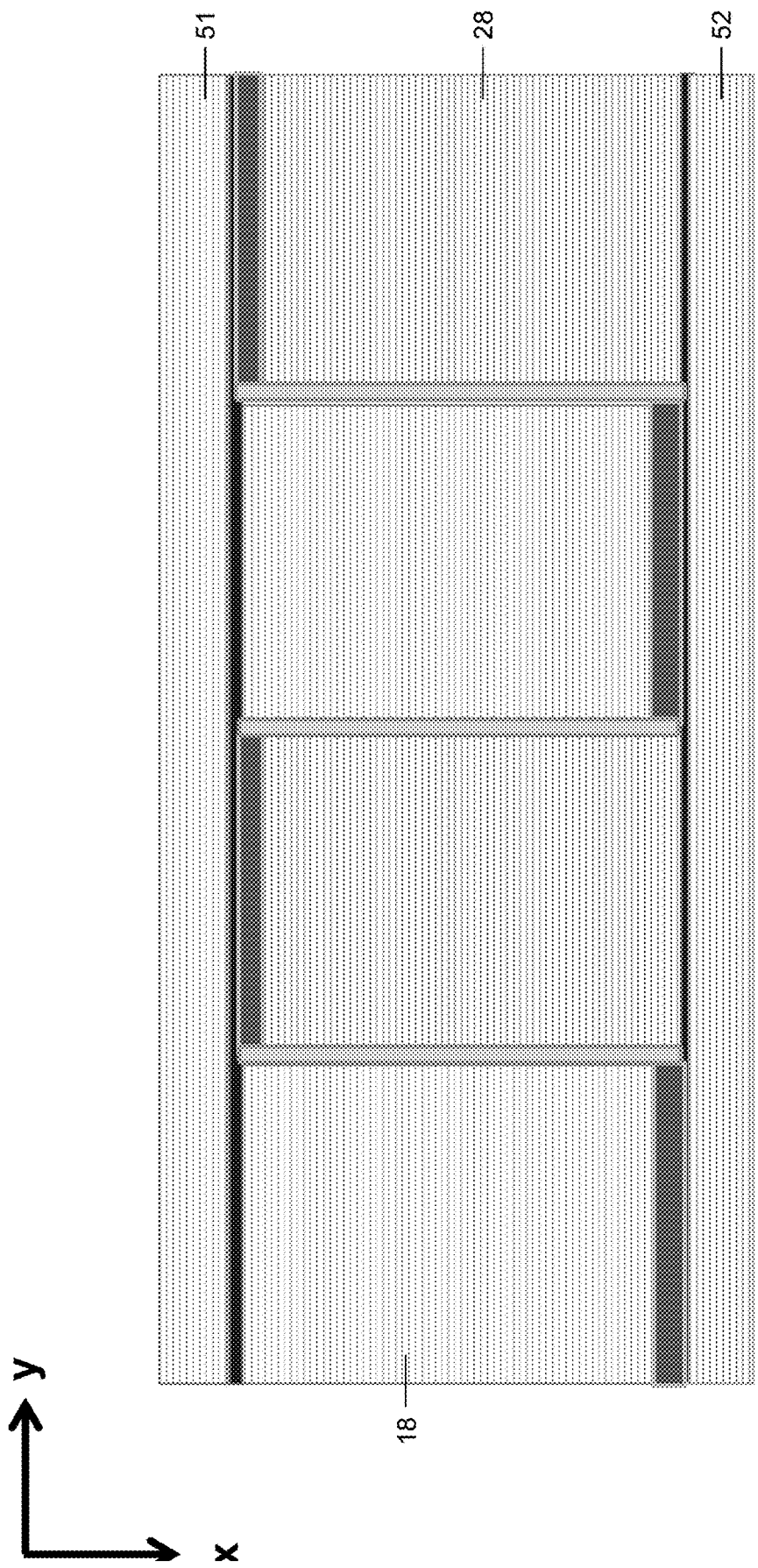
FIG. 23: Front view between case and cell of anode and cathode current collector layers, showing isolative layer (150) on top and bottom of cell, main anode current collector (51) and main cathode current collector (52).
Figure 24:
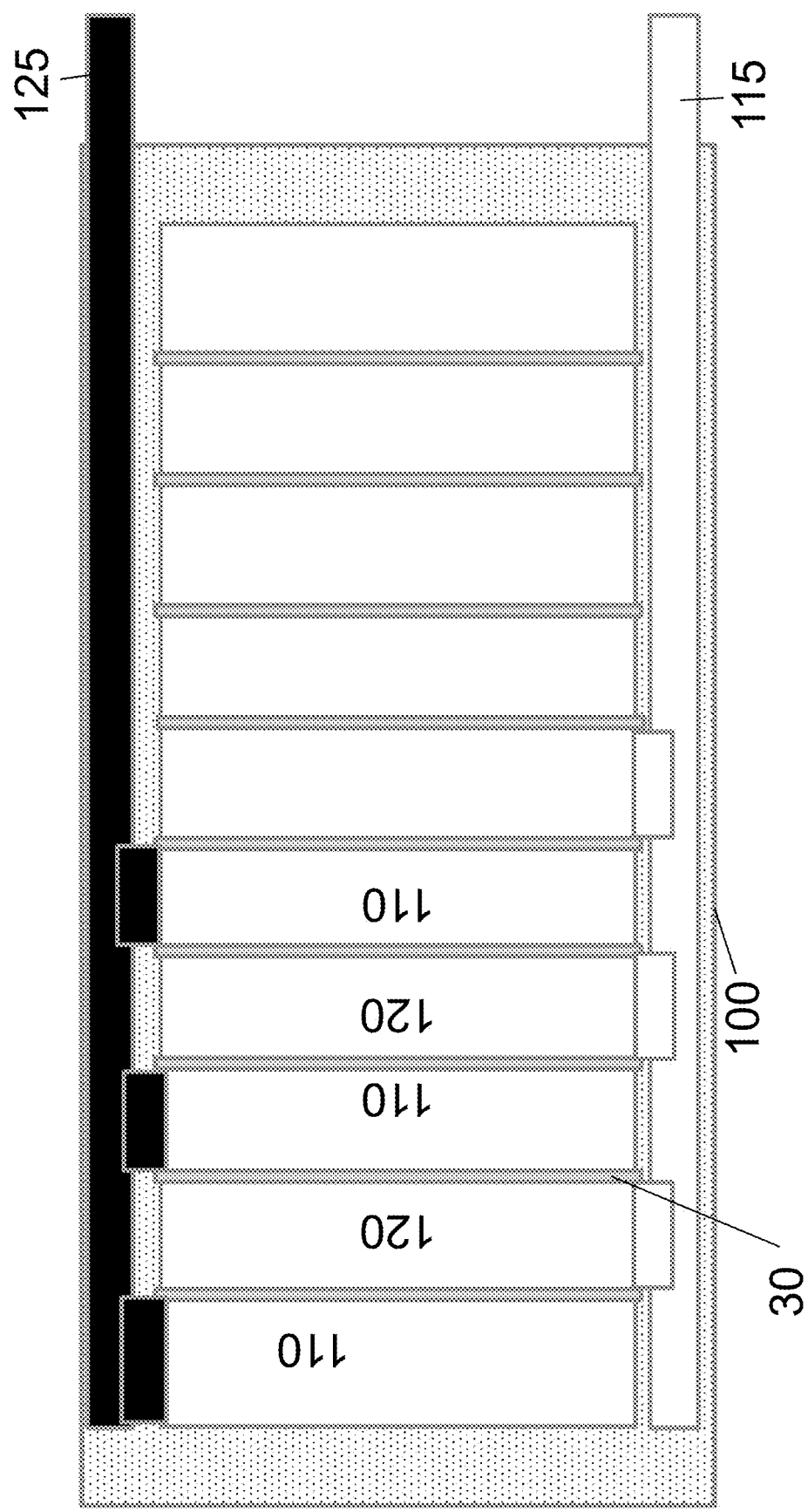
FIG. 24: Battery case (100) with anode spaces (110) and cathode spaces (120). Cathode tab (125) and anode tab (115) also shown. Top view before placing the anodes and the cathodes.

FIGS. 21-23 show front views of example electrochemical cell systems. The FIGS. 21-23 shows multi-layered electrode cells, with many (e.g., 25) individual active electrode layers stacked in the x-direction within each multi-layered electrode cell. The series of multi-layered anode and cathode electrodes may extend farther in the y-direction, as illustrated, to fit allow an electrochemical system with a predetermined number of electrode stacks/assemblies. FIG. 21 illustrates a top view, underneath the case (100), illustrated the network of auxiliary current collector layers corresponding to the anode (18, 51) and cathode (28, 52), which are then connected to the anode tabs (115) and cathode tabs (125), of the case (100), respectively. FIGS. 21-23 show front views of system between the case (100) and the internal cell layers. The system comprises isolation layers (150) on top and bottom of the electrochemical cell system, which isolate the main current collector layers (51, 52) from the rest of the layer of the system. FIG. 24 shows an electrochemical system case (100) with primary current collectors (115, 125). The anode spaces are electronically connected to the anode primary current collector and the cathode spaces are electronically connected to the cathode primary current collector.

In an embodiment, for example, the separator (30) between the anode and cathode is continuous, for example a single layer of celgard in a wavy form separating many layers of stacked anode and cathode regions. (e.g., a Sine wave where anode and cathode are separated by the sine wave, which is the separator here)

EXAMPLE 5

Novel Chemistry Agnostic Methods to Make Electrochemical Cells Such as Batteries As used herein "electric conductivity" is inclusive of both ion movement (ionic conductivity) and electron movement (electronic conductivity). Ionic conductive refers to movement or transport of ions and electronic conductivity refers to movement or transport of electrons. For clarity, ionically conductive materials may be characterized as electrically conductive, but not all electrically conductive are ionically conductive. For clarity, electronically conductive materials may be characterized as electrically conductive, but not all electrically conductive materials are electronically conductive.

In an embodiment, for example, the batteries are zinc based or lithium based or lead based. Certain embodiments are chemistry agnostic, and thus applicable to virtually any battery chemistry.

The size (any of the 3 spatial dimensions) of the cells may be one nanometer (1 nm) up to tens of centimeters (e.g., 20 cm). The diameter of the current collector rods can be from 10 nm to 1 cm. The height of the rods can be 10 nm up to 10 cm. The current collector rods can be porous, up to 50%. The current collector rods can be comprised of active materials, current collectors and binders materials and conductive carbon. The current collector rods can be made by different methods including slurry injection into molds, coating methods, electrophoresis methods or by semiconductor fabrication methods.

In an embodiment, the invention provides novel methods to make electrodes for electrochemical cells such as batteries such that the electrode consists of a film consisting of a current collector (Al, Cu, Ti, Stainless steel, Ni, any carbon types) and active materials.

In an embodiment, the electrochemical systems of the invention comprise an array of current collector rods, each consisting of at least one of the active materials and current collector material, such that each of the current collector rods is perpendicular to the said film, and such that the active material of the film and the active material of the current collector rods are in direct electronic communication. In an embodiment, for example, each of the current collector rods is itself a combination of smaller features such as smaller rods. In an embodiment, for example, each current collector rod has a diameter in the range of 10 nm and 1 cm. In an embodiment, for example, each of the current collector rods is further comprised of nano features (e.g., having physical dimension ranging from 1 to 1000 nm), such as nano rods.

An aspect of the invention is implementation to provide the current collector connections from the plate and current collector rod electrodes to the main current collector tabs (51, 115, 52, 125) outside.

Below are described exemplary features of systems of the invention and components thereof.

Rod electrodes: In an embodiment, the rod electrode array is generated via a method characterized by: using a mold with open through holes and a porous insulating material on one end, applying the viscous active material slurry, for example carbon or silicon, from the fully open side with some pressure, the rod array is cast. Later, after dissolving the silicon mold, an electronically conductive layer (thin film, mesh, porous or perforated) is deposited on one end as the current collector. In an embodiment, for example, the porous non-conductive layer is replaced with a porous conductive layer (copper for anode, aluminum for cathode), which then can be used as the current collector itself. An advantage of this approach is that it removes a time consuming step, but also as the active material will be inside the porous conductive layer attached to the rods, it will make the connection between the rods and current collector very stable, addressing the problem of delamination of rods from current collector that others have. The present systems can also use aluminum mold or PMMA mold or PDMS mold instead of silicon mold, which makes the fabrication less expensive because silicon molds are made by lithography but aluminum molds, for example, are made by simple CNC (computer numerical control) machining of thin (e.g., 0.5 mm thick) aluminum films. Another benefit here is that once we remove aluminum mold from the array by etching (for example, via a KOH solution) the residue of the etched aluminum on the active material rods can be an insulating layer, acting as the separator itself. In an example, this approach may be extended to be the primary separator, which may eliminate the separate step of making the separator layer.

Plate electrodes: In an embodiment, a few conductive rods (less than 10% of the holes) are provided through the holes of plates as the current collector for the plates. so at least 90% of the rods going through the holes are anode array, and 10% or less is the current collector for the plates. These current collector rods can be connected to a tab plate on at least one side of the battery cell, which then will act as the positive tab.

Conformal coating of separator on the cathode perforated layer stack. In this example, a mixture of inactive particles, such as glass beads, Al2O3, SiO2 are linked by a bonder such as PVDF in a solvent such as acetone, organic solvents or ethanol was used. The ratio of the particles to the PVDF can vary from 0.1 to 10. The size of the particles is less than 1 μm. The concentration can vary depending on the temperature and speed of the process from 1 wt % to 10% wt %.

The stack of cathode perforated layers was dip coated in the solution and kept there for 1 second. The exposed aluminum was masked by tape. Then, the stack was pulled out from the solution and was dried and heated at 80° C. to cure the monomer. To completely cover the surface, the process was repeated twice in this example.

Conformal coating of separator on the anode rods array: In this example, a mixture of in active particles, such as glass beads, $Al_2O_3$, $SiO_2$ are linked by a bonder such as PVDF in a solvent such as acetone, organic solvents or ethanol was used. The ratio of the particles to the PVDF can vary from 0.1 to 10. The size of the particles is less than 1 μm. The concentration can vary depending on the temperature and speed of the process from 1 wt % to 10% wt %.

The array of rods was dip coated in the solution and kept there for 1 second. Any exposed copper current collector was masked by tape. Then the stack was pulled out from the solution and was dried and heated at 80° C. to cure the monomer. To completely cover the surface, the process was repeated twice in this example.

Current collector for the rods array: In this example, the current collector for the rods can be a thin plate of current collector material, such as Ni, Cu, Al, Ti, Carbon, stainless steel. The thickness can be a few micrometers to hundreds of micrometers. The plate can be a thin film or a mesh or perforated.

FIGS. 25-31 provide schematic illustrations of electrochemical systems of the invention and components thereof.

Figure 25B:
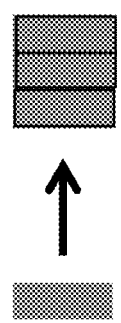
FIGS. 25A, 25B, 25C, and 25D.
Figure 25C:
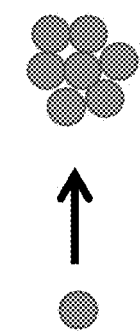
Figure 25A:
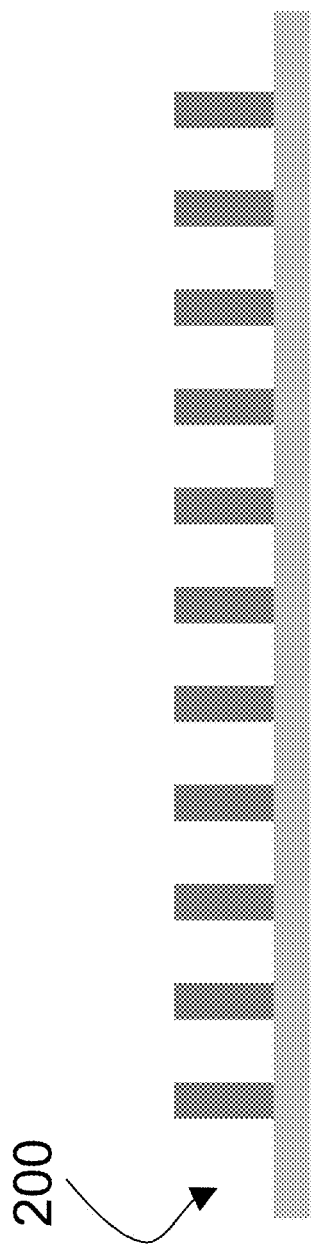
Figure 25D:
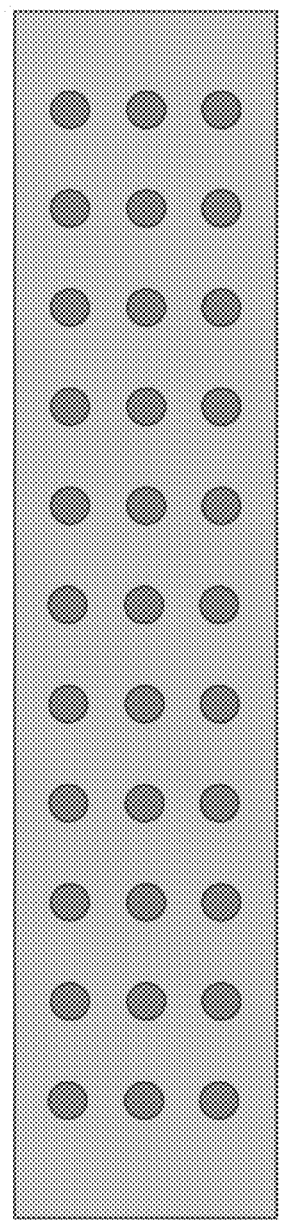

FIGS. 25A and 25D show the side view and top view, respectively, of an array of rod electrodes on top of a substrate electrode. The rod electrodes are oriented substantially perpendicular to the substrate. FIGS. 25B and 25C show side and top views, respectively, of an example individual rod electrode illustrating that each rod electrode may be comprised of a bundle of smaller rods having features with size dimensions on the order of nanometers of micrometers. The substrate may be the current collector (mesh, grid or thin film). The substrate may also be a planar electrode itself, the substrate electrode, integrated with the current collector and active material.

Figure 26B:
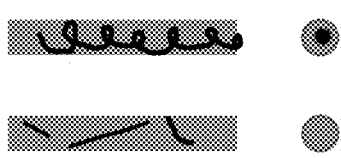
FIGS. 26A, 26B, and 26C.
Figure 26A:
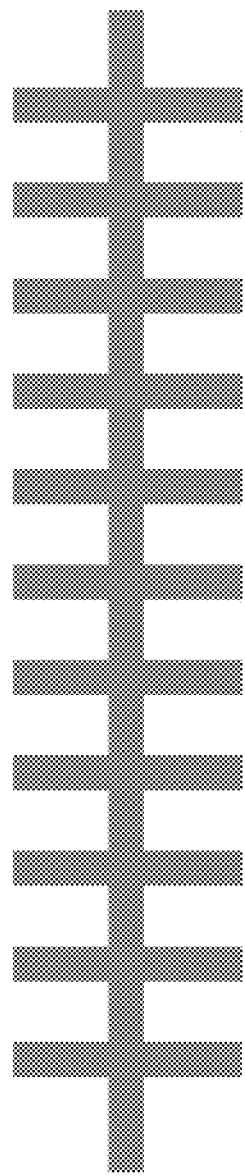
Figure 26C:
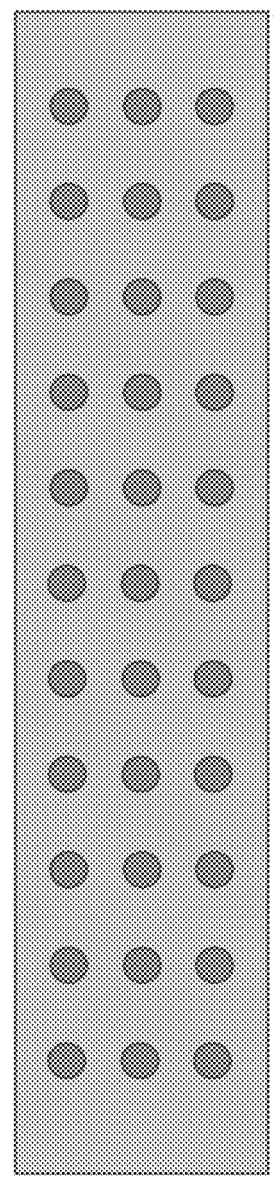
Figure 27B:
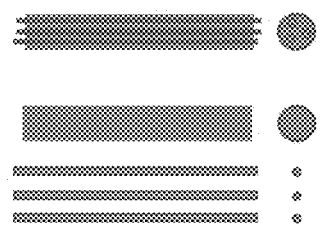
FIGS. 27A, 27B, and 27C.
Figure 27A:
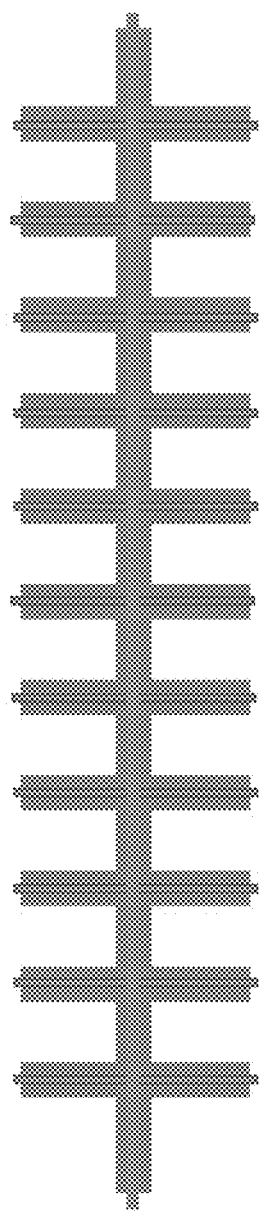
Figure 27C:
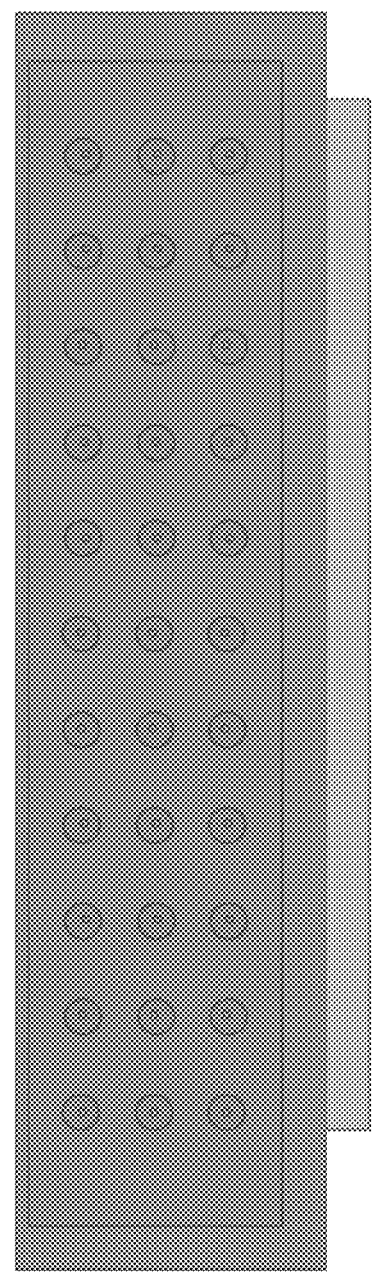
Figure 29B:
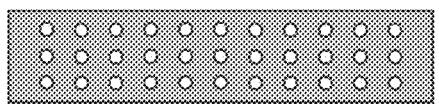
FIGS. 29A, 29B, and 29C: Schematic illustrating primary separator layers of embodiments of the invention.
Figure 29A:
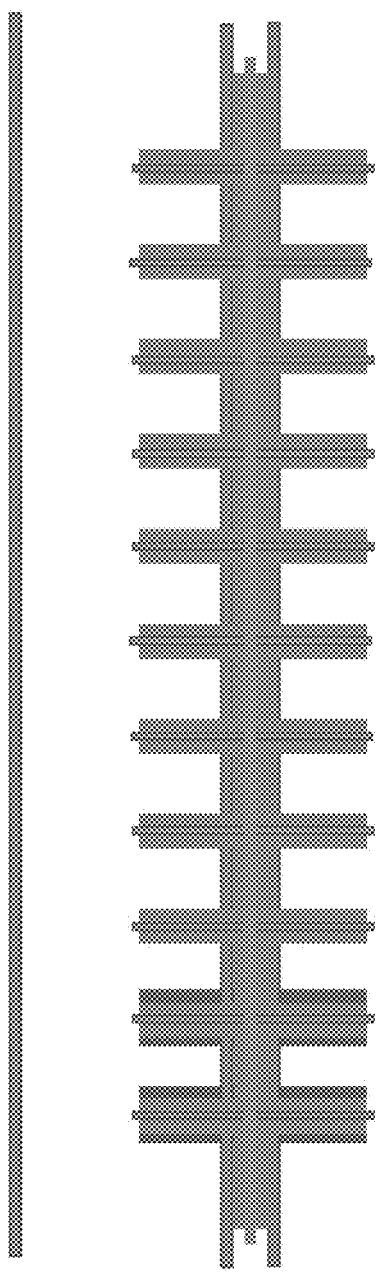
Figure 29C:
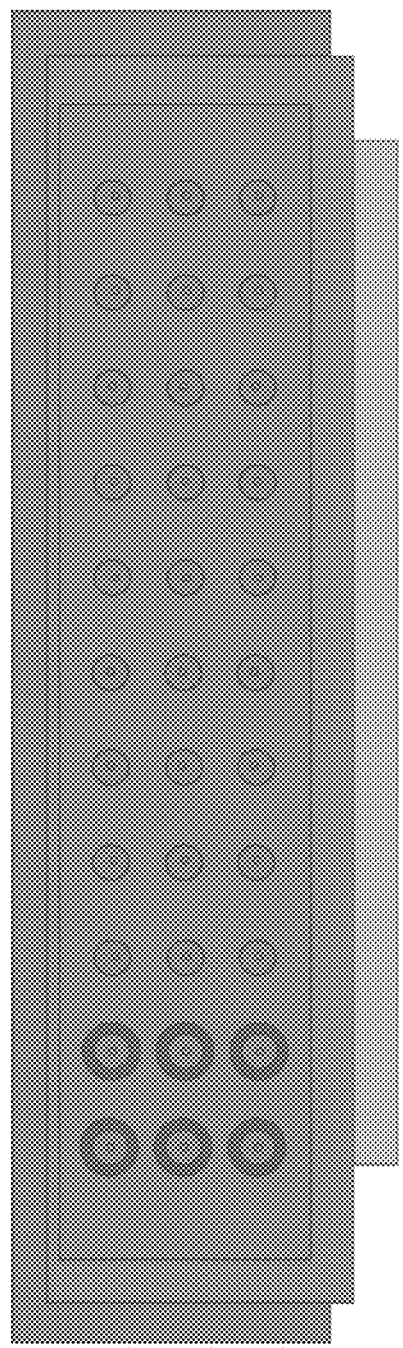
Figure 30A:
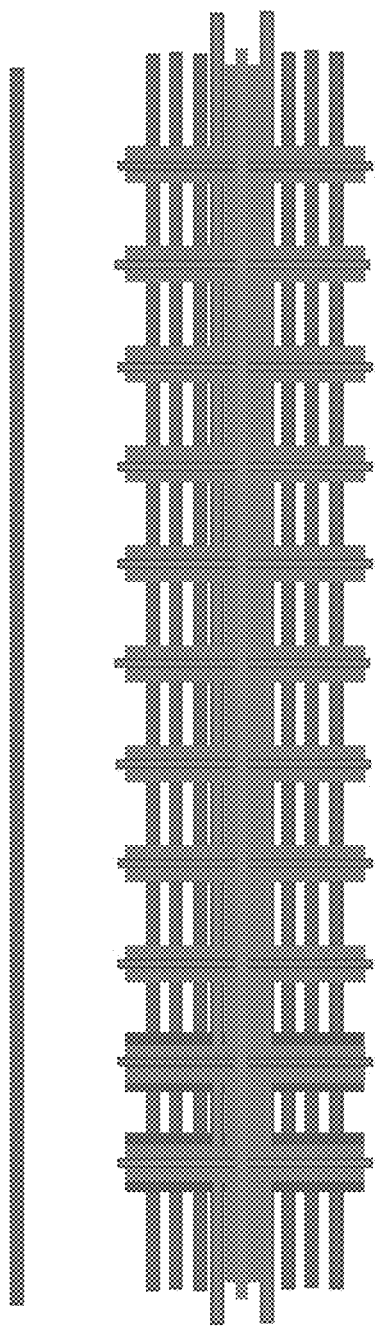
FIGS. 30A, 30B, and 30C: Schematic illustrating plate electrodes of embodiments of the invention.
Figure 30B:
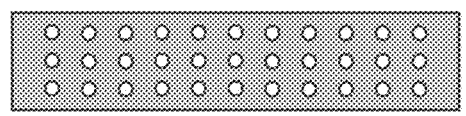
Figure 30C:
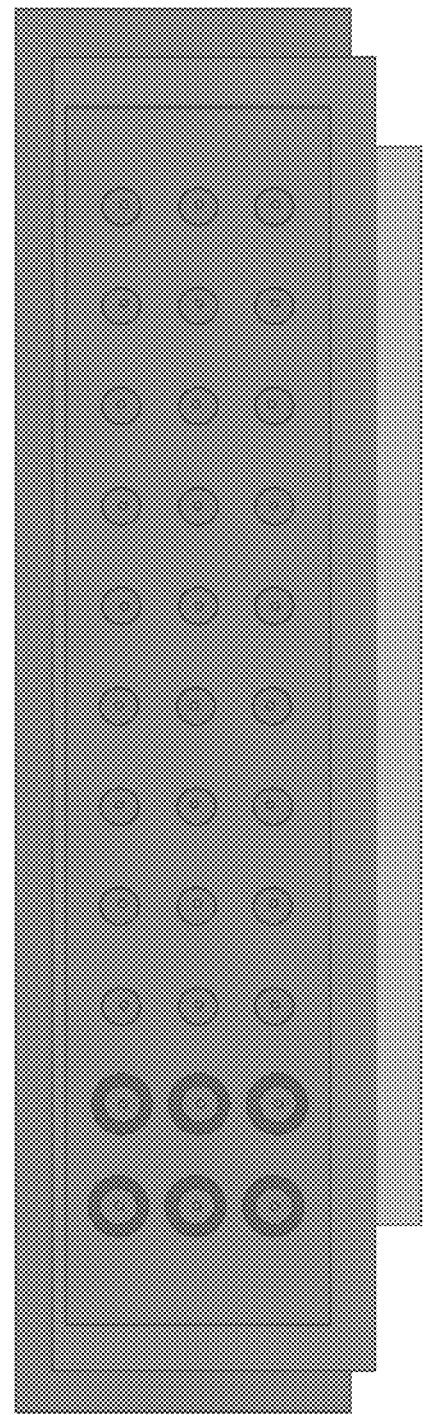
Figure 31B:
FIGS. 31A, 31B, and 31C: Schematic illustrating current collector for plate electrodes of embodiments of the invention.
Figure 31A:
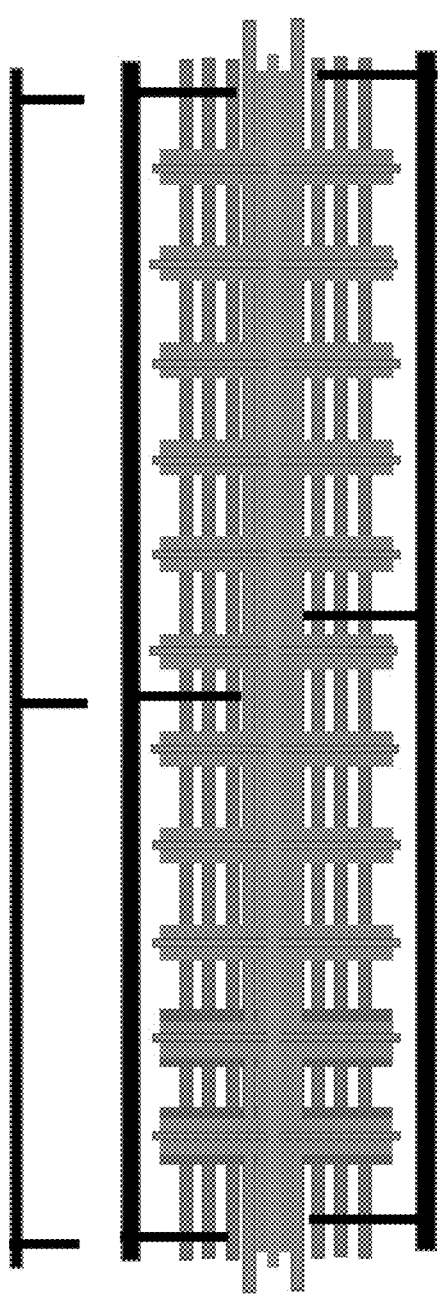
Figure 31C:
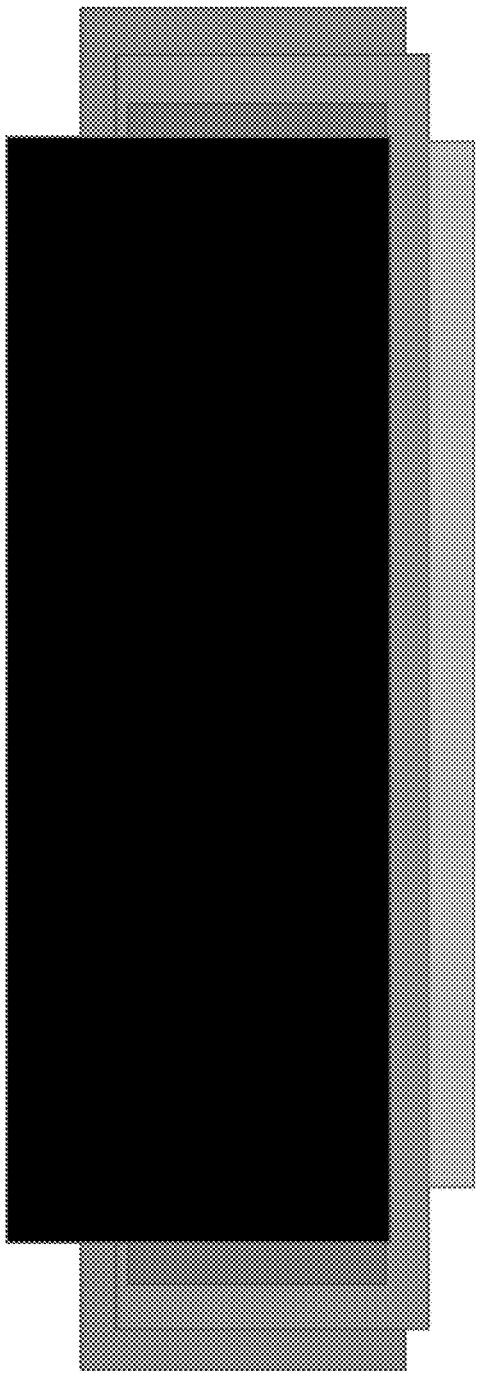

FIGS. 26-31 are a series illustrating the components and features of an electrochemical system with rod electrode arrays. As shown in FIG. 26, the rod electrodes may extend from either side of the substrate, substantially perpendicular to the substrate. FIG. 26 (right) shows that each of the each of the rods can have fibers in it to improve the mechanical performance, via reinforcement with stronger materials, and durability, for ease of fabrication, or for improving the electronic conductivity, in which case they may be made of metals such as Al, Cu, steel, Ti or carbon materials such as carbon fibers or carbon nanotubes. The fibers may be the auxiliary current collectors. The fibers can have diameters of about 1% to 20% of the diameter of the rod. The length can be 0.01× to 100× of the rod length. A fiber length greater than the rod length rod length means that the fibers are bent to fit inside the rod. The fibers can also be made of polymers to increase the ionic conductivity or improve shape change accommodation (i.e., flexible fibers). FIG. 27 shows side and top views illustrating auxiliary current collectors, or current collector material, and the rod electrodes. As illustrated in FIG. 27, the auxiliary current collectors may be internal to the rod electrodes and there may also be a current collector plate internal to the substrate electrode. The auxiliary current collectors and the current collector plate are connected to a primary current collector tab, which allows connection of the electrochemical system to an external electronic circuit. A fraction of the current collectors may be exposed, rather internal to a rod electrode, so allow electronic connection to a primary current collector tab. FIG. 28 shows top and side views of the rod electrode array with a secondary separator material or solid electrolyte. The secondary separator may be an ionically conductive conformal coating on the rod electrodes. (FIG. 28 shows the secondary separator coating on only several of the rod electrodes for illustration, but the secondary separator coating may be present on all of the rod electrodes in the array.) FIG. 29 shows top and bottom views of the electrochemical system after the introduction of primary separator layers in between the rod electrodes. The primary separator layer may be a perforated plate (as shown in FIG. 29 on the right) fit through the rod electrodes or a coating deposited via methods such as CVD, PVD, or dip coating, for example. The primary separator layer may be ionically conductive and may be made of a different material than the secondary separator layer. FIG. 30 shows an electrochemical system after the introduction of plate electrodes. The plate electrodes may be an electrode of an opposite polarity to that of the rod electrodes, for example, the rod electrodes may be the anode electrode and the perforated plate electrodes may be the cathode electrode. The perforated plate electrode top view is shown on the right, where the holes line up with the rod electrodes. The perforated plate electrode of this embodiment may be made of Zn or Li, for example. FIG. 31 shows an electrochemical system after the introduction of a plate electrode current collector. The plate electrode current collector may be connected to all or a fraction of the perforated plate electrodes, or to a fraction of the auxiliary current collectors, or depending on the polarity of the electrochemical system. The plate electrode current collector allows connection of the electrochemical system to an external electronic circuit.

EXAMPLE 6

Novel Electrochemical Cells, Such Li-Ion Batteries

In an embodiment, for example, the length and width of the plates can be several millimeters or centimeters and 0.01 to 10 mm in thickness. The holes in the cathode can be several nanometers or up to several millimeters. The anode rods can be several micrometers thick and up to several millimeters long. The rod base can be a current collector (e.g., copper) and can be a few micrometers to a few millimeters thick.

Figure 32B:
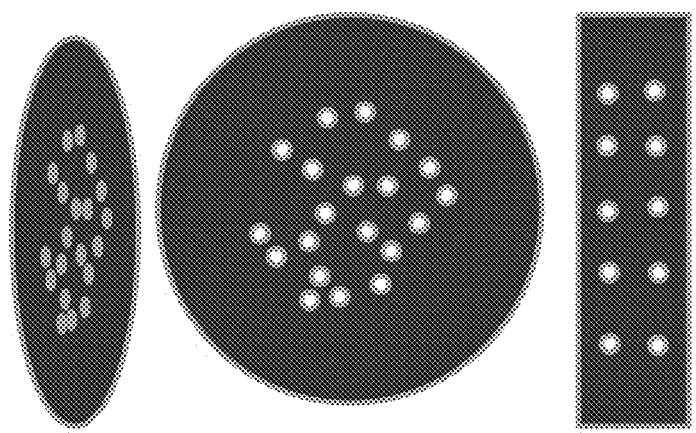
FIGS. 32A and 32B: Schematic illustrating perforated cathode plated.
Figure 32A:
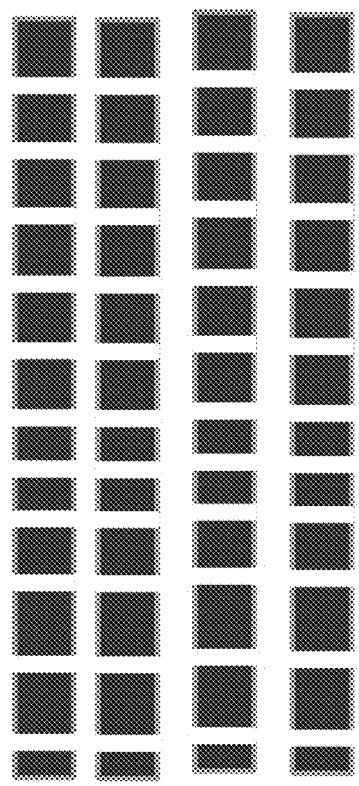
Figure 33B:
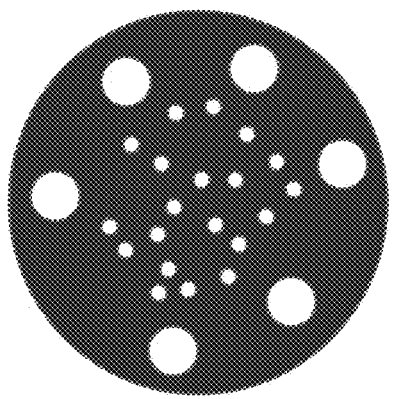
FIGS. 33A, 33B, 33C, and 33D: Schematic illustrating: Guide holes in cathode plates for alignment, and Guide rods in external and current collector for alignment.
Figure 33D:
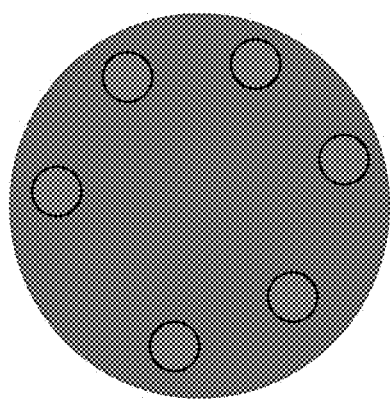
Figure 33A:
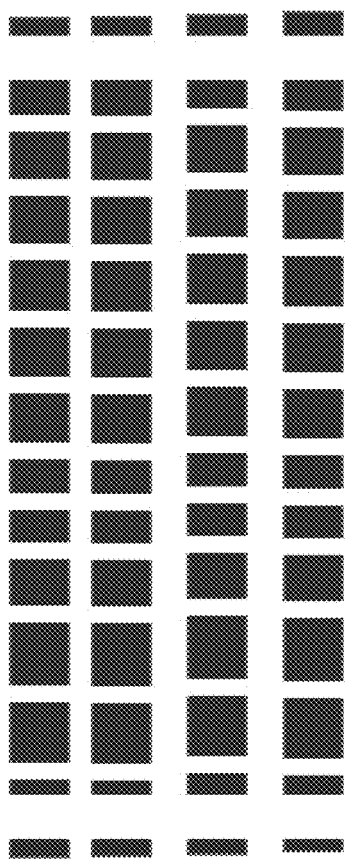
Figure 33C:
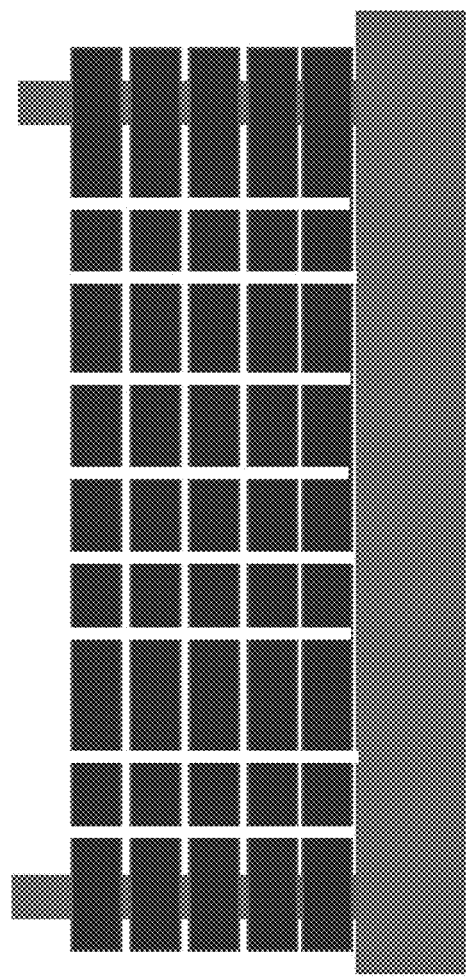
Figure 34:
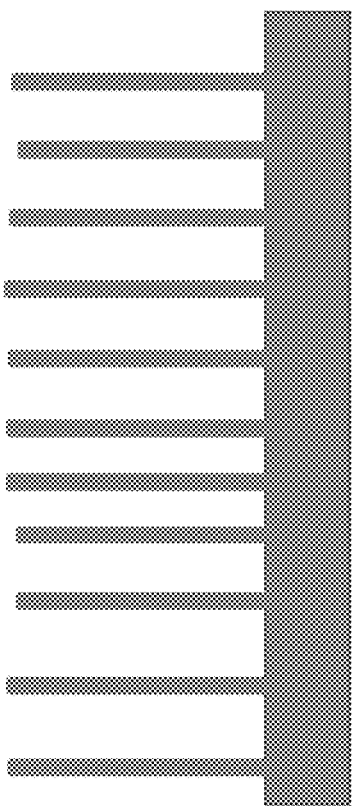
FIG. 34: Schematic illustrating anode rods and substrate. Anode rods can be silicon grown (CVD, PVD, etc.) or etched (wet or dry) on a substrate. Or can be silicon coating on another rod-based (such as on Nanocarbon pillars).
Figure 35B:
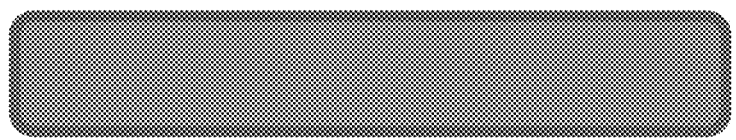
FIGS. 35A and 35B.
Figure 35A:
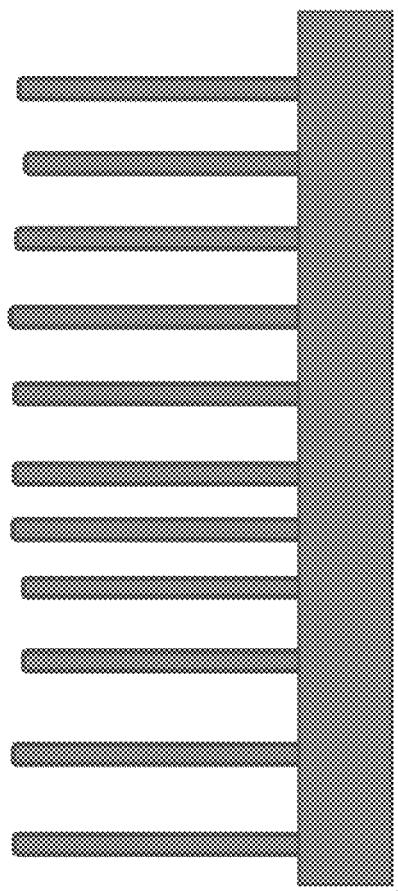
Figure 36:
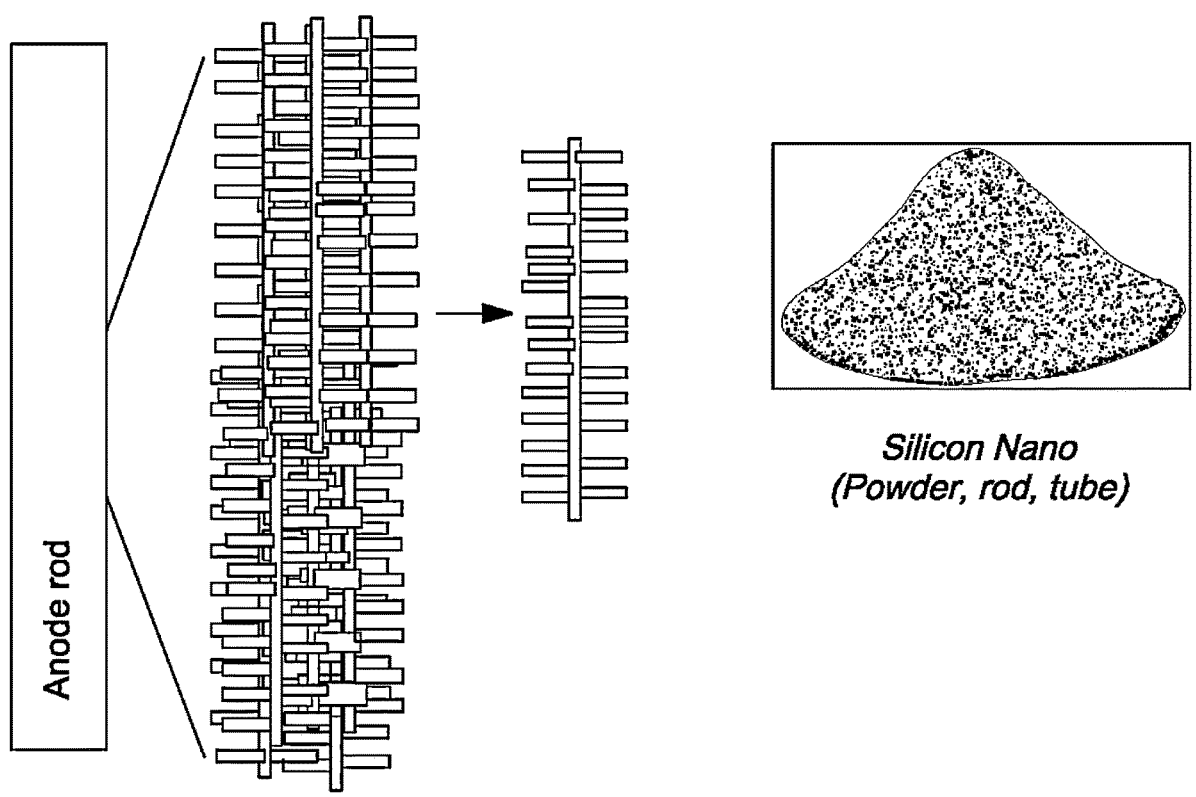
FIG. 36: Schematic showing Different methods of fabricating the rod electrodes. Silicon Nano (powder, rod, tube).

FIGS. 32-57 provide schematic illustrations of electrochemical systems of the invention and components thereof. FIG. 32 shows side and top views of an example perforated cathode plate that may be used in an example electrochemical system. The perforated cathode plate may vary in shape, for example, circular or rectangular. FIG. 33 illustrates side and top views of an example perforated cathode plate further comprising guide holes, which aid in alignment of the perforated cathode plate with the rest of the electrochemical system. For example, FIG. 33 also illustrates a current collector plate, comprising alignment guide rods that are intended to fit through the guide holes in the perforated cathode plate. FIG. 34 illustrates a rod electrode array, wherein the corresponding electrode may be the anode, for example, and the substrate electrode to which the rod electrodes are connected in a substantially perpendicular orientation. The example rod electrodes may be, for example, made of silicon and formed using various process, such as chemical vapor deposition (CVD), physical vapor deposition (PVD), wet etching, or dry etching, for example. The example rod electrodes may also comprise a silicon coating on a rods formed of a different material, such as carbon (e.g., nanocarbon pillars). FIG. 35 illustrates an array of rod electrodes, on top of a substrate electrode, after deposition of a separator layer. In the embodiment of the components of the electrochemical system in FIG. 35, the separator layer may be an electronically non-conductive material coating made of, for example, porous PVDF, polyethylene, polypropylene, or a solid electrolyte such as lithium phosphorous oxy-nitride (LIPON), lithium super ionic conductor (LISICON, $Li_{2+2x}Zn_{1-x}GeO_4$), or poly(ethylene oxide) (PEO), for example. The separator layer coating may be deposited on the rod electrodes via various coating processes such as, for example, dip coating from a solution of materials, spray coating of monomeric or polymeric solutions (with solvent such as n-methyl-2-pyrrolidone (NMP)), CVD, PVD, or electrophoretic deposition. FIG. 36 illustrates another perspective of the rod electrode array and substrate electrode system. FIG. 36 also shows a photograph of silicon nanomaterials, including powder, rods, and tubes, from which the rod electrode may be formed. Example methods of making silicon rod arrays are also discussed and illustrated in the following references: (i) "Silicon Decorated Cone Shaped Carbon Nanotube Clusters for Lithium Ion Battery Anodes." W. Wang, et al., Small, 10 (16), 2014, pg. 3389-3396; (b) http://cheaptubes.com; (c) http://www.oulu.fi/infotech/ (silicon coating on carbon nanotubes); (d) http://www.mtixtl.com/copperfoil.aspx (silicon growth on porous metal substrate); (e) "Freestanding Macroporous Silicon and Pyrolyzed Polyacrylonitrile As a Composite Anode for Lithium Ion Batteries." M. Thakur, et al. Chem. Mater., 24 (15), 2012, pg. 2998-3003; (f) http://www.nexeon.co.uk/ (silicon rod growth); and (g) http://www.amprius.com/ (silicon rod growth).

Figure 37A:
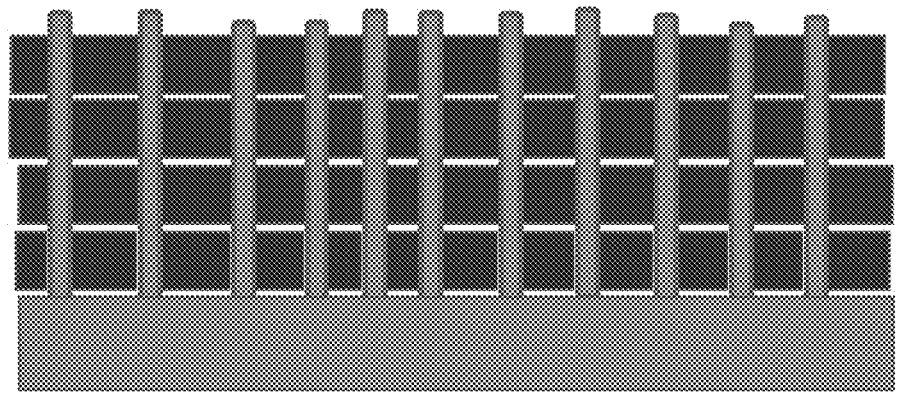
FIGS. 37A and 37B.
Figure 37B:
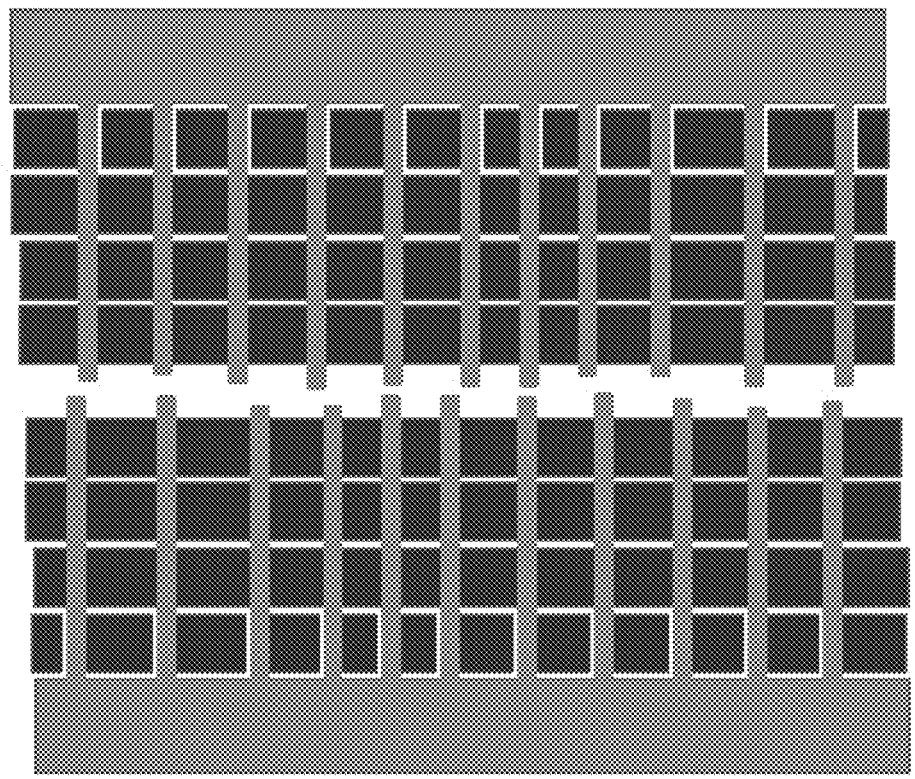
Figure 38:
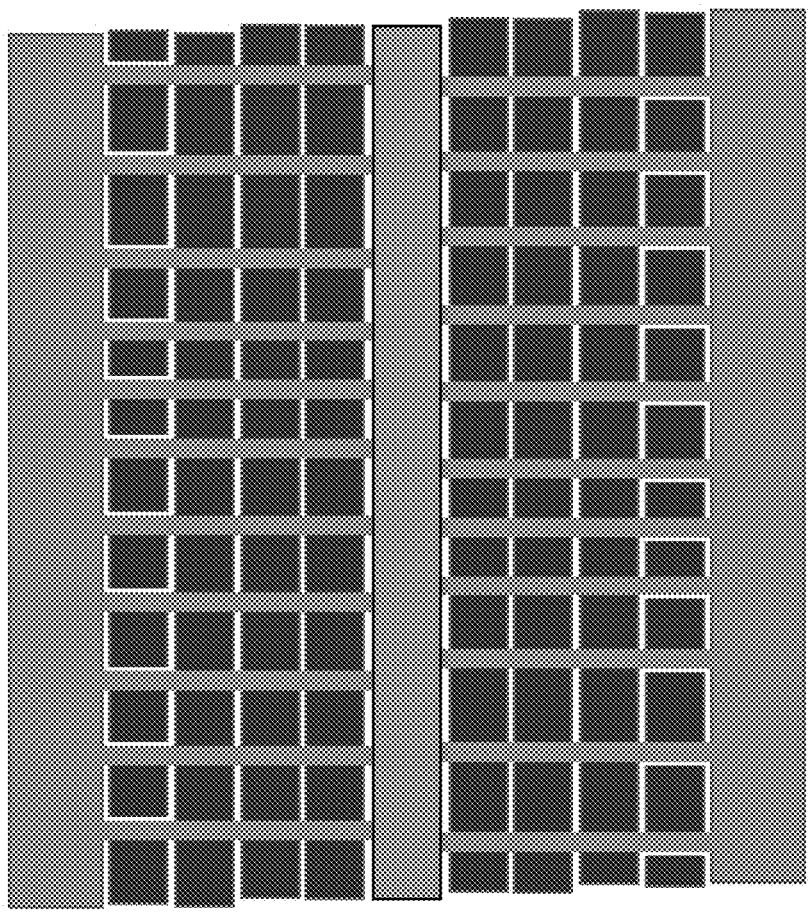
FIG. 38: Schematic illustrating the addition of auxiliary current collectors to collect current from the corresponding electrode, anode or cathode
Figure 39:
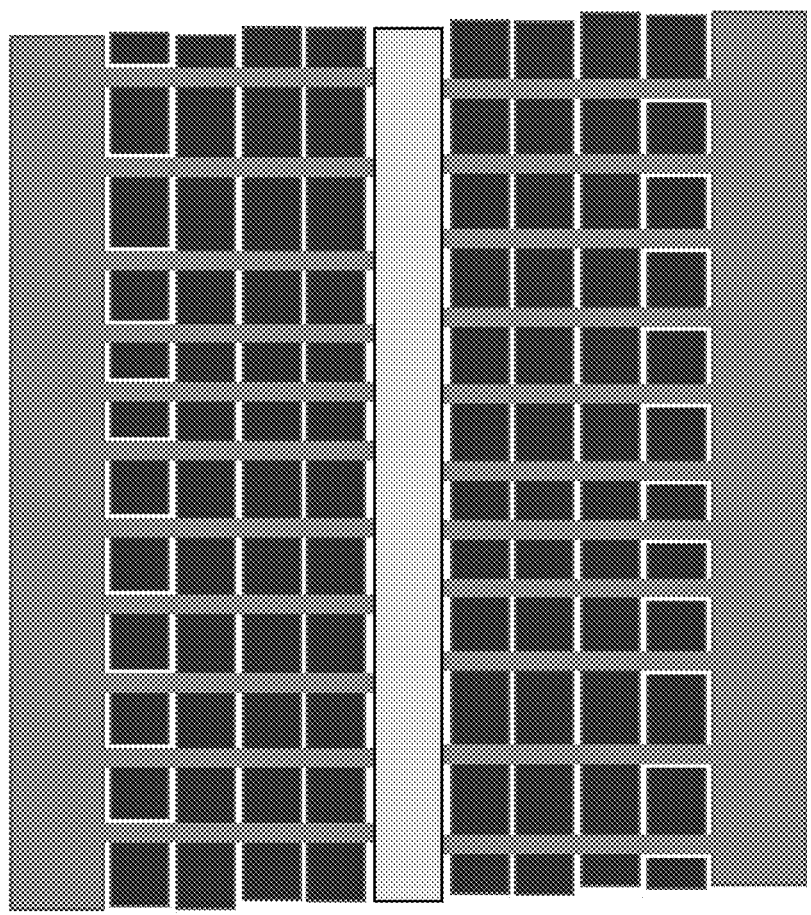
FIG. 39: Schematic illustrating an auxiliary lithium metal film as the auxiliary current collector.
Figure 40:
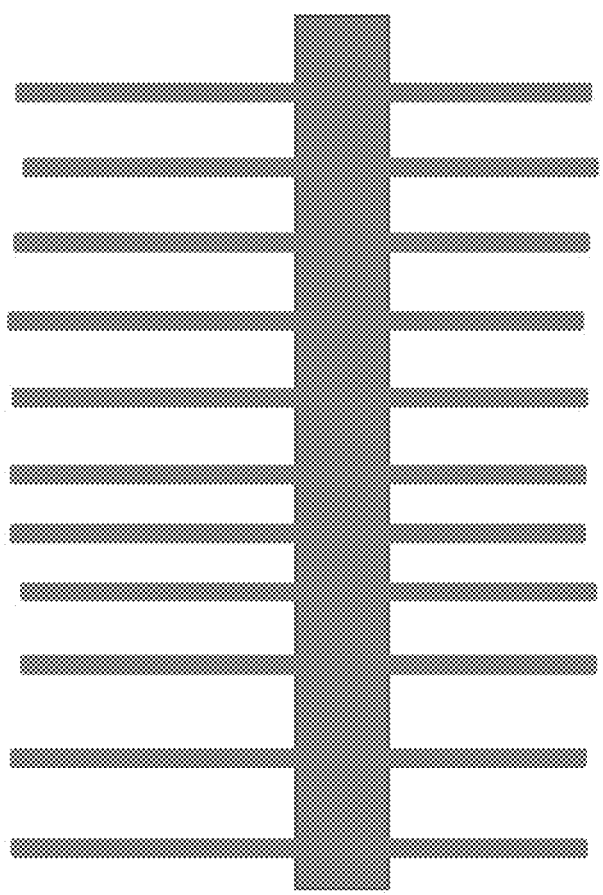
FIG. 40: Schematic illustrating: anode rod electrode arrays on opposites sides of a substrate. Anode rods can be silicon grown (CVD, PVD, etc.) or etched (wet or dry) on a substrate. Or can be silicon coating on another rod0based (such as on Nanocarbon pillars).
Figure 41:
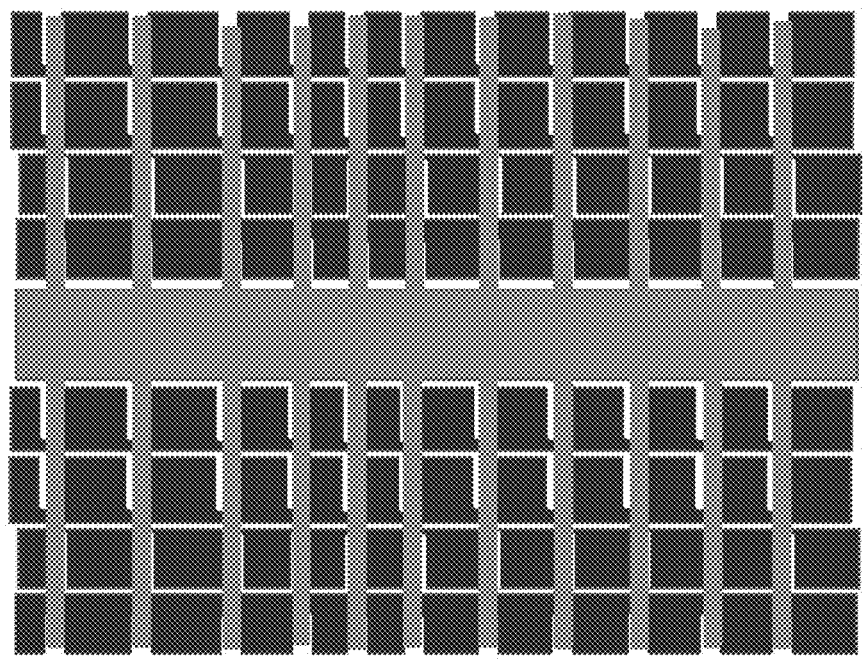
FIG. 41: Schematic illustrating electrochemical system having a three dimensional geometry.
Figure 42:
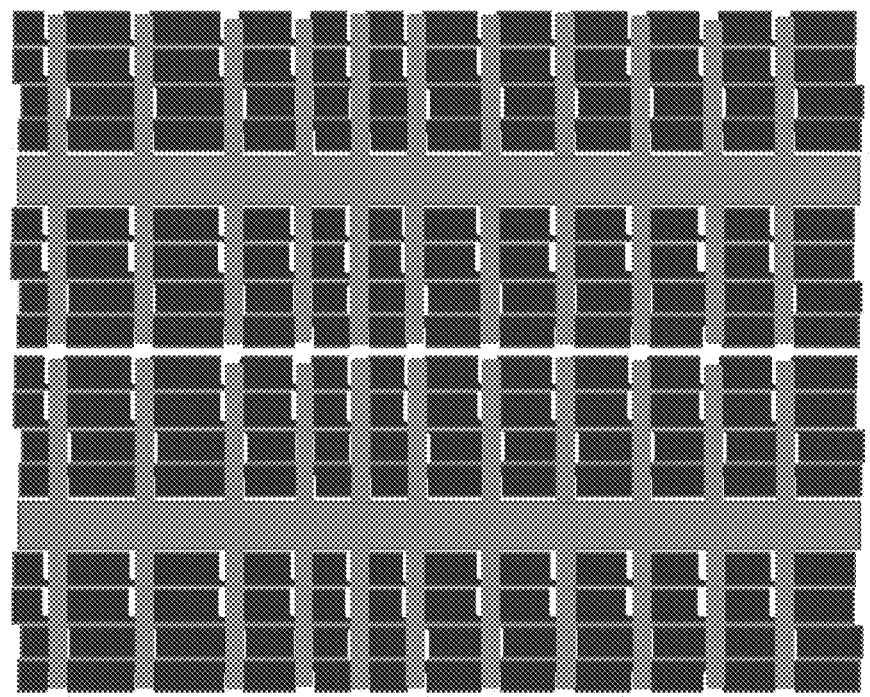
FIG. 42: Schematic illustrating electrochemical system a three dimensional geometry.

FIGS. 37-51 illustrate example aspects and components of an electrochemical system in the present invention. FIG. 37A shows a rod electrode array, for example an array of anode rods, with a secondary separator coating and a primary separator film present, fitted into the perforated cathode plate electrode. The perforated electrode is not in physical contact with the rod electrodes due to the presence of the separator layers in between. FIG. 37B shows that the assembly in FIG. 37A may be stacked such that two equivalent anode-separator-cathode assemblies are aligned with the anode rods facing the anode rods of the other assembly. The secondary and primary separator layers may be assumed to be present on the rod electrodes, even if not include in the illustration in FIGS. 37-51, for the purpose of cleanliness. FIG. 38 illustrates the addition of auxiliary current collectors to collect current from the corresponding electrode, anode or cathode, and which may be connected to a primary current collector tab. The auxiliary current collector is added in between the rod electrodes of the top and bottom electrode assembly, as shown. FIG. 39 illustrates that an auxiliary lithium metal film may be added in a similar fashion as the auxiliary current collector of FIG. 38. The auxiliary lithium metal film may be used as a reference electrode, and may be connected to a primary current collector tab. FIGS. 40-42 illustrate another embodiment of the electrochemical system similar to that illustrated in FIGS. 34-39, except wherein the rod electrodes are connected to the substrate electrode on opposite sides of the substrate electrode, and oriented substantially perpendicular to the substrate. FIG. 41 shows that the double-side rod electrode array may be fitted into cathode perforated plate electrodes on both sides where the rod electrodes extend from the substrate. FIG. 42 illustrates that the assembly in FIG. 41 may be stacked.

Figure 43B:
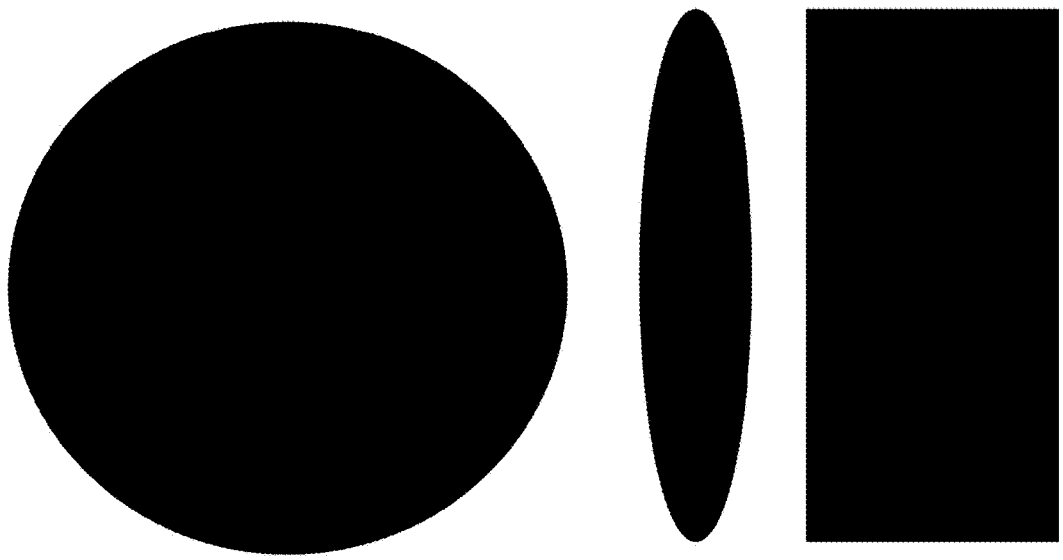
FIGS. 43A and 43B: Schematic illustrating: Positive cathode current collector (e.g. Al), negative anode current collector (e.g. Cu), insulators, perforated cathode plate electrodes (e.g. LCO, LFP, Sulfur), anode rod electrodes (rods, base) (e.g. silicon), electrolyte (solid or liquid between the anode and cathode) (side view).
Figure 43A:
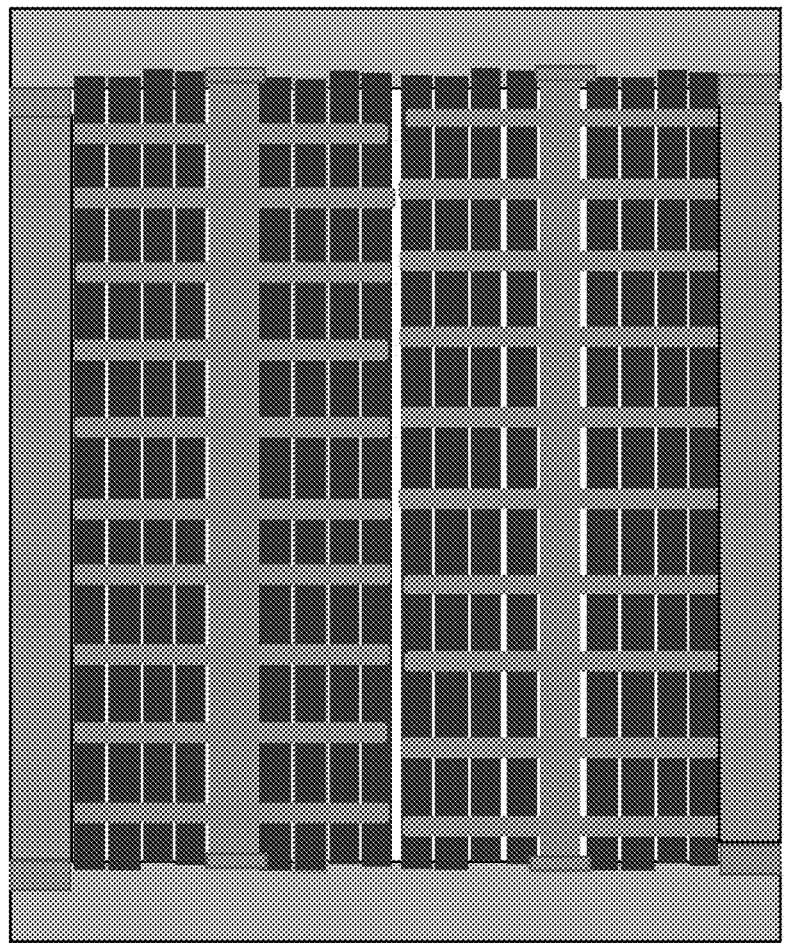
Figure 44B:
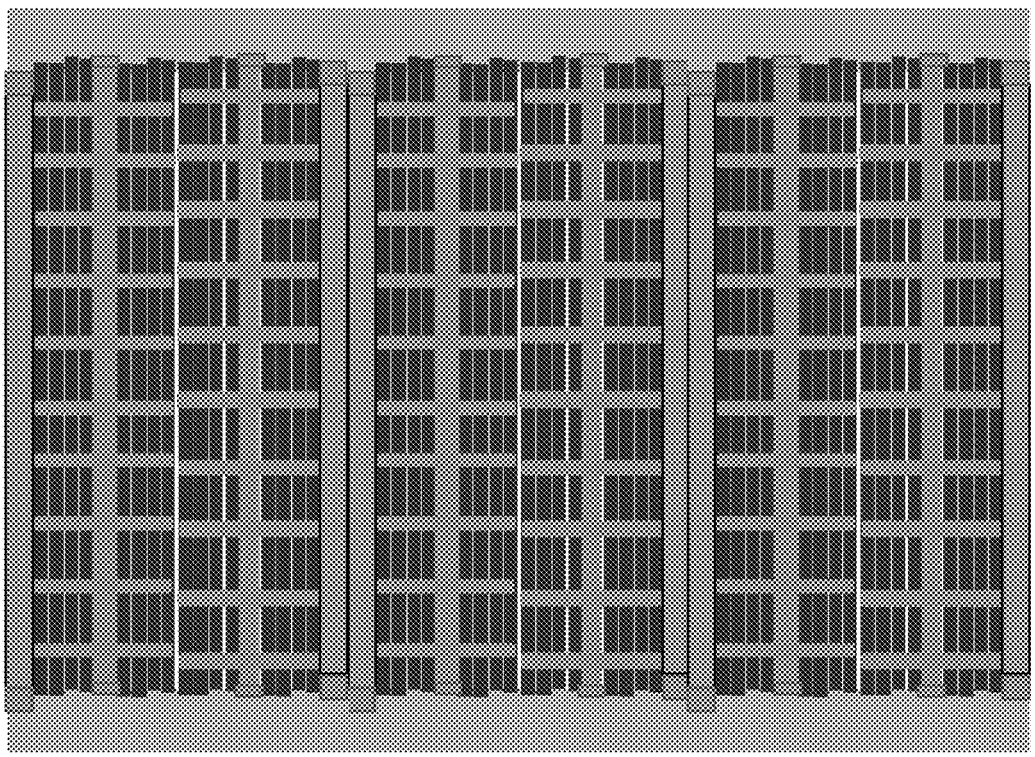
FIGS. 44A and 44B: Schematics illustrating electrochemical system having parallel geometries.
Figure 44A:
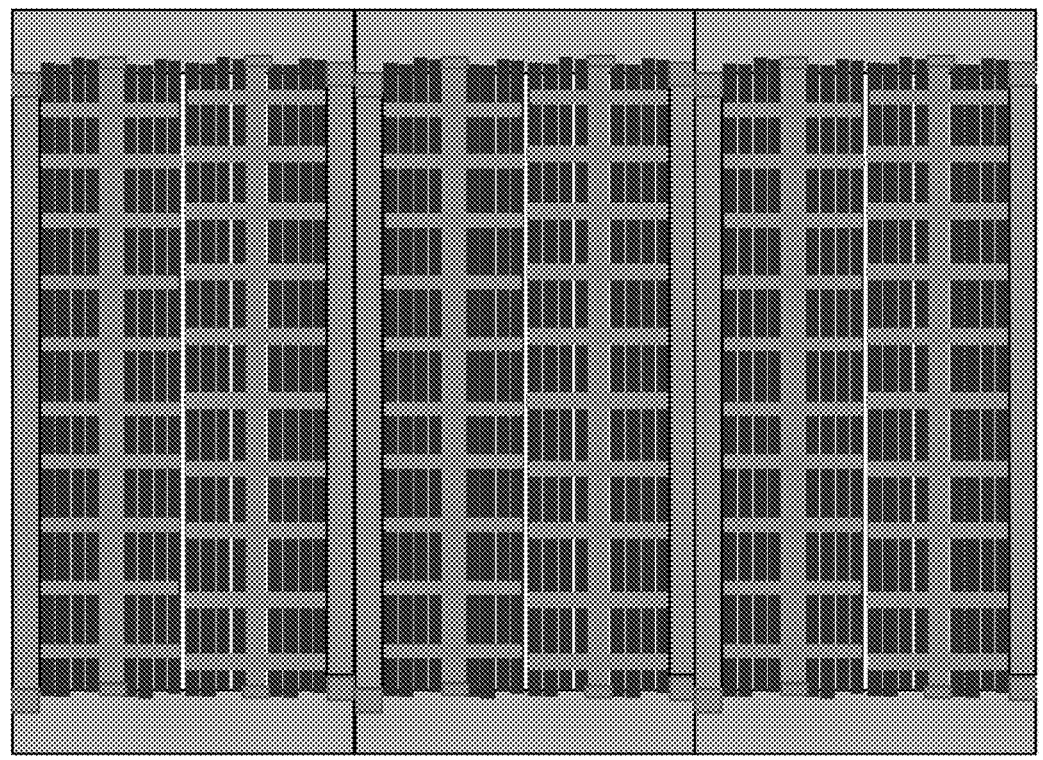
Figure 45B:
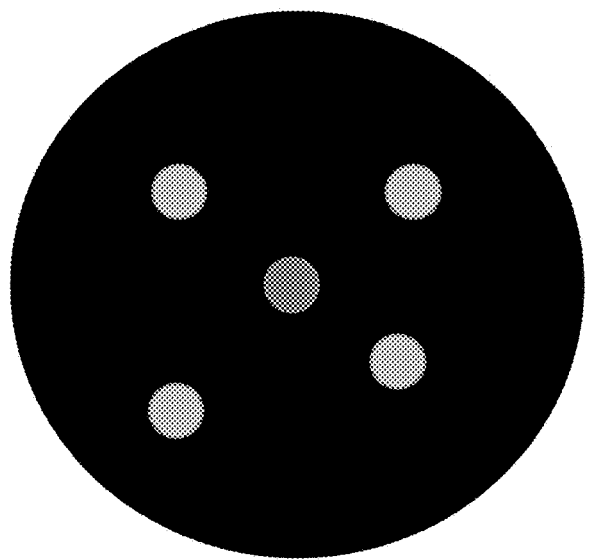
FIGS. 45A and 45B: Schematic illustrating: Shared positive cathode current collector and shared negative anode current collectors.
Figure 45A:
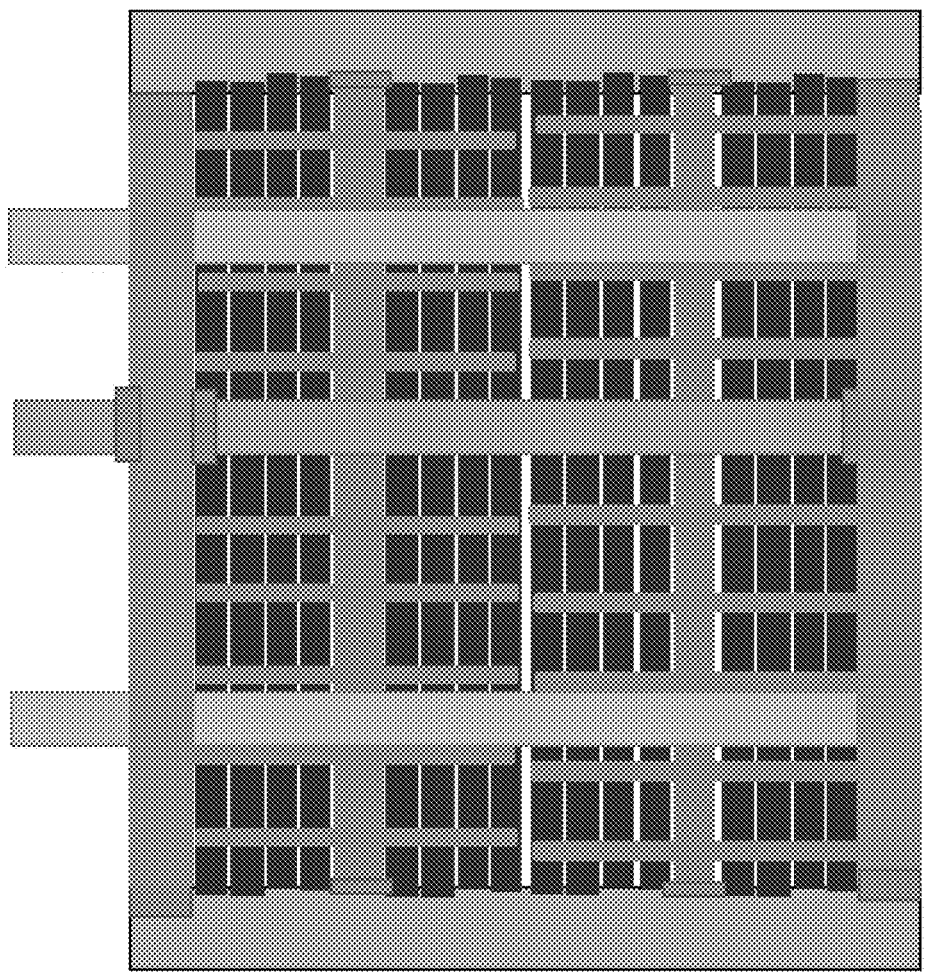
Figure 46B:
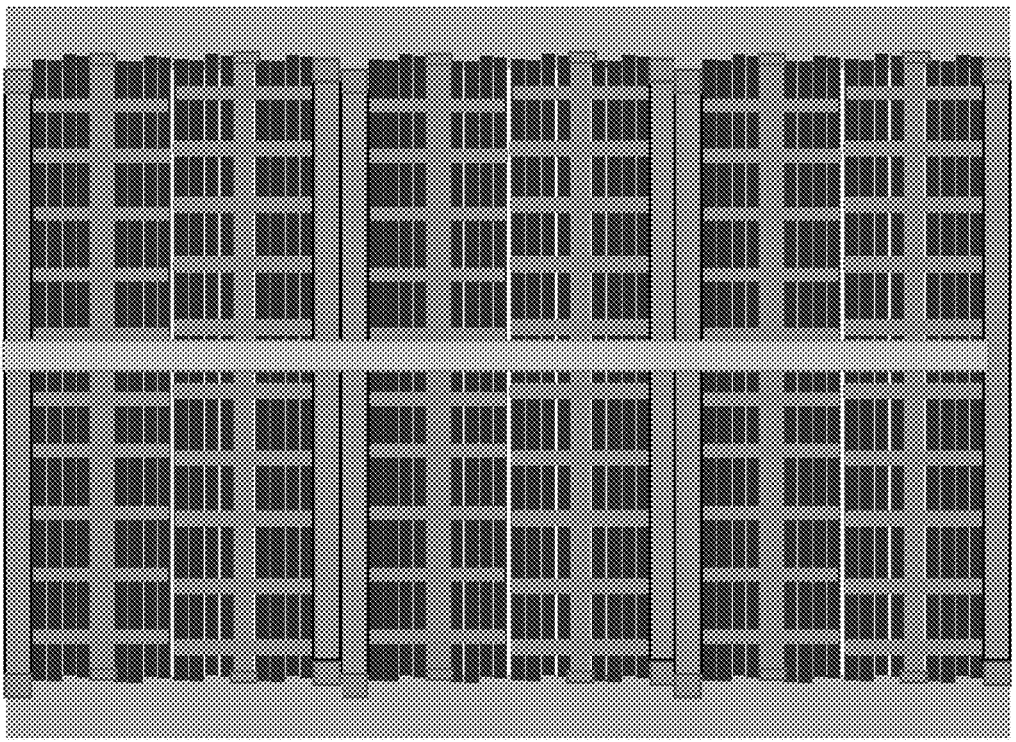
FIGS. 46A and 46B: Schematics illustrating electrochemical system having a parallel arrangement.
Figure 46A:
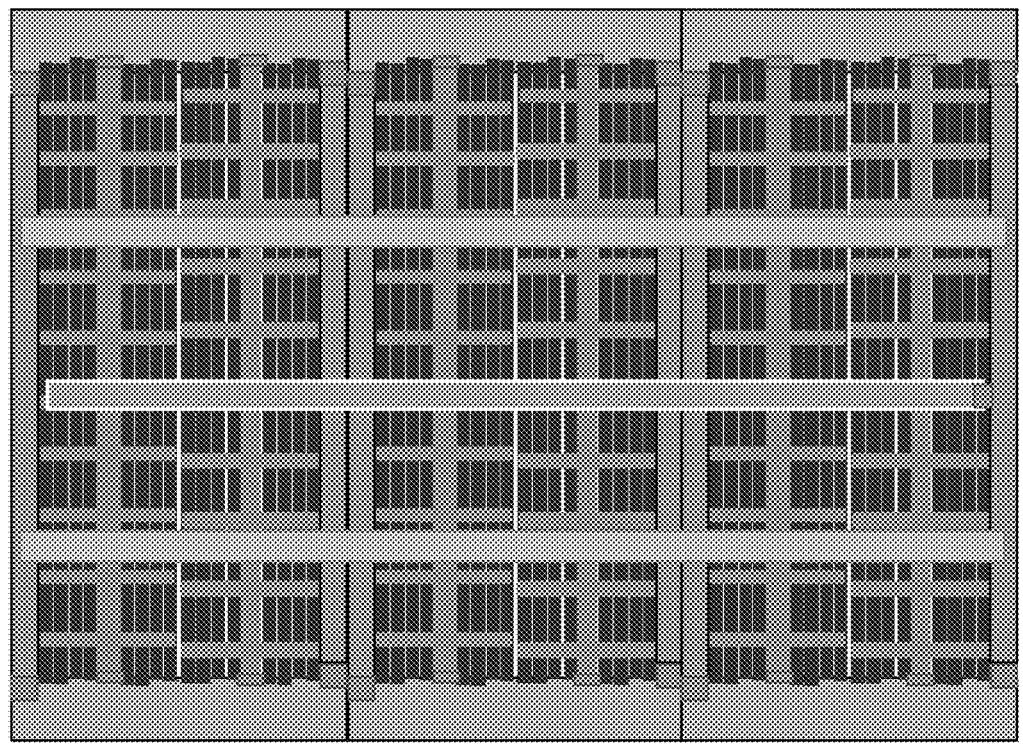
Figure 47:
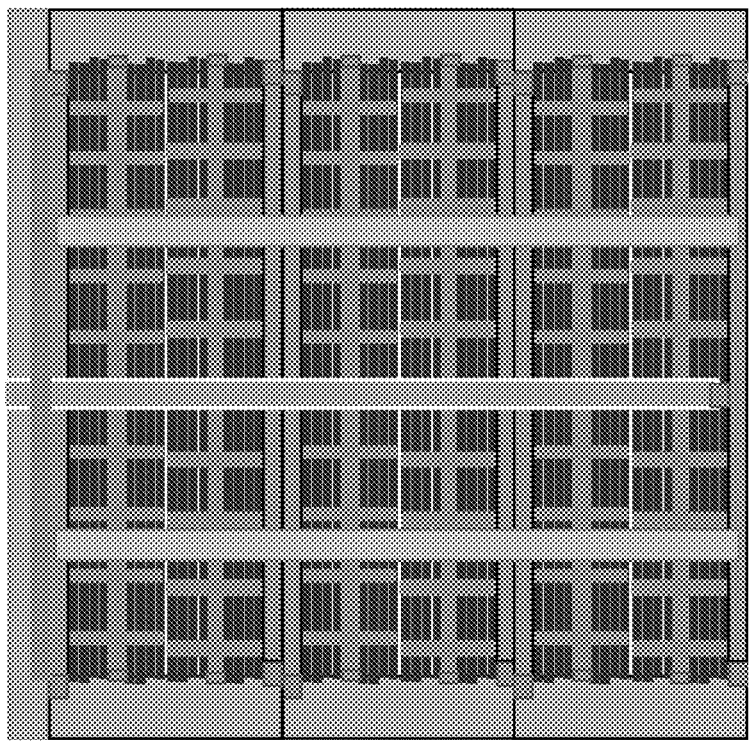
FIG. 47: Schematic illustrating individual external positive current collector-battery cases with parallel arrangement
Figure 48B:
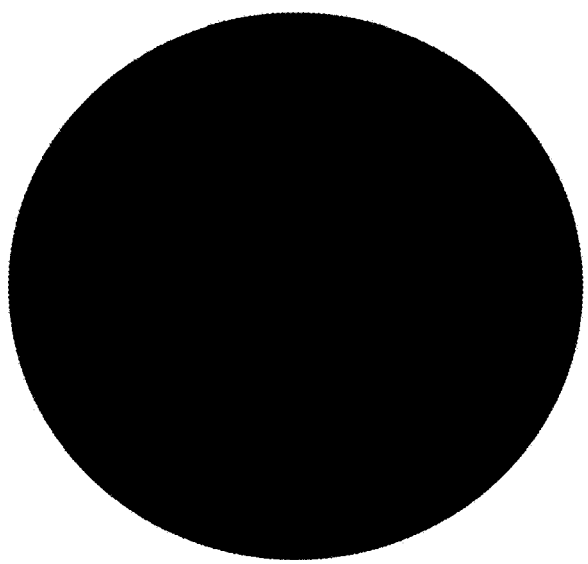
FIGS. 48A and 48B: Schematic illustrating electrochemical system.
Figure 48A:
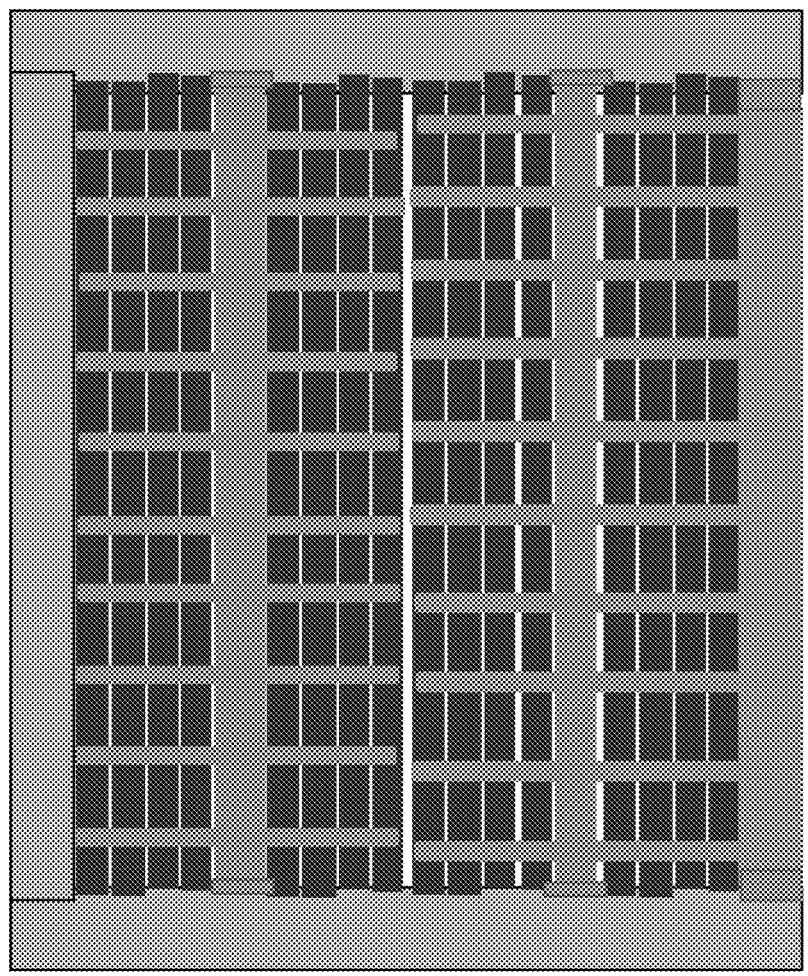
Figure 49B:
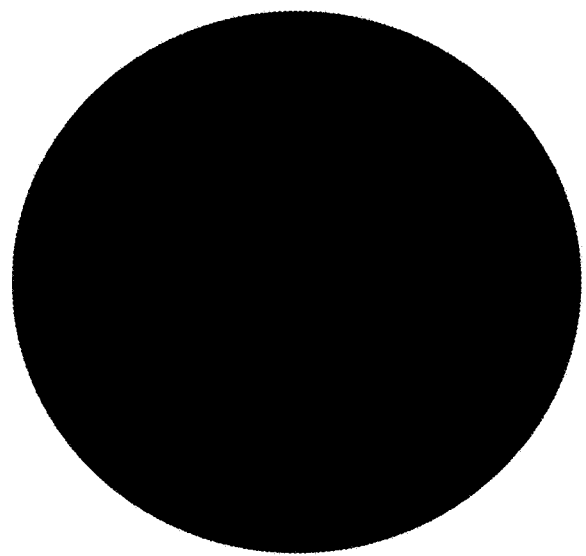
FIGS. 49A and 49B.
Figure 49A:
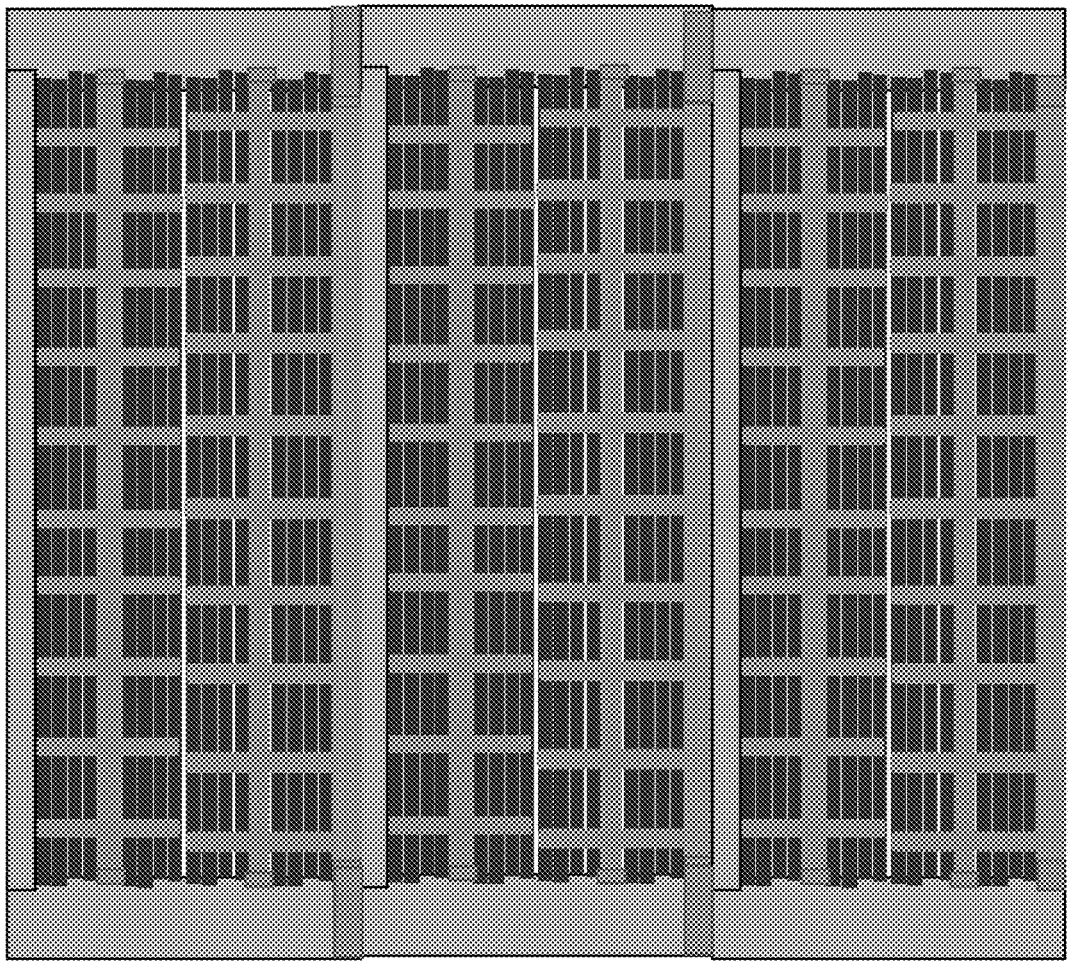
Figure 50B:
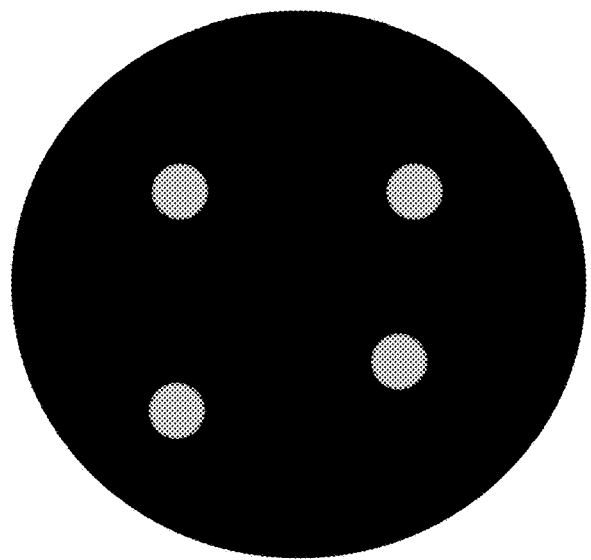
FIGS. 50A and 50B.
Figure 50A:
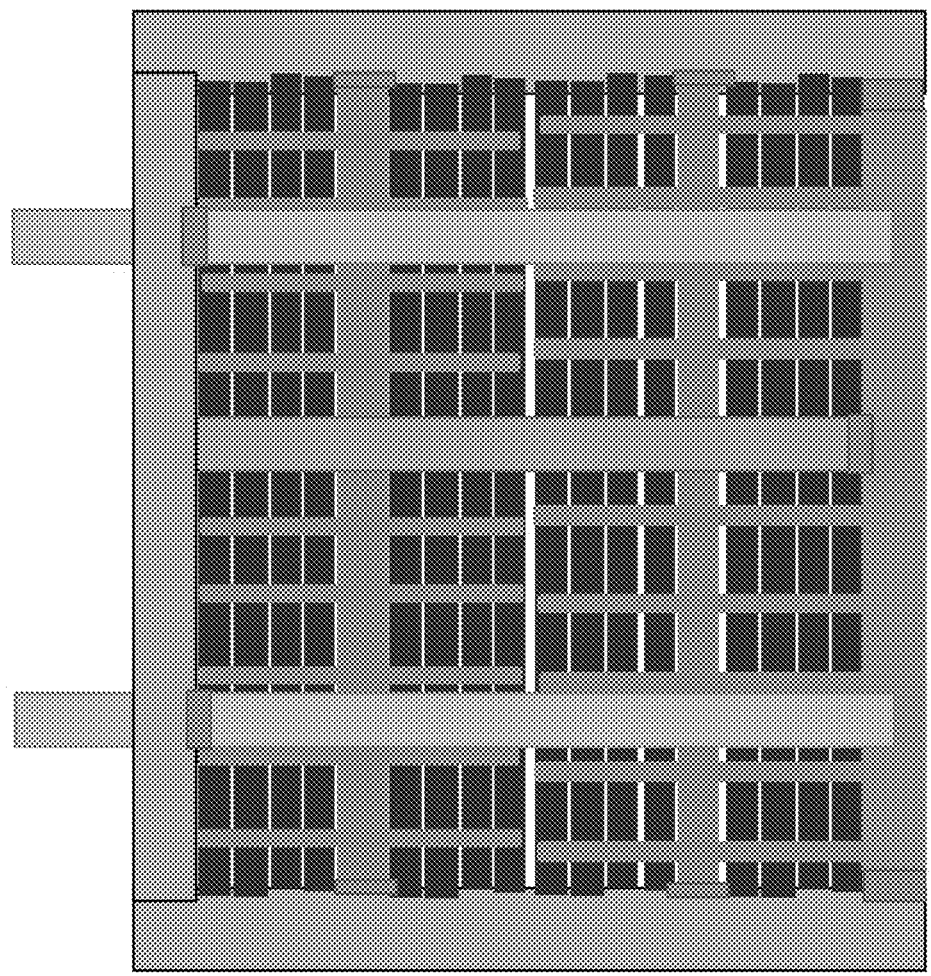
Figure 51:
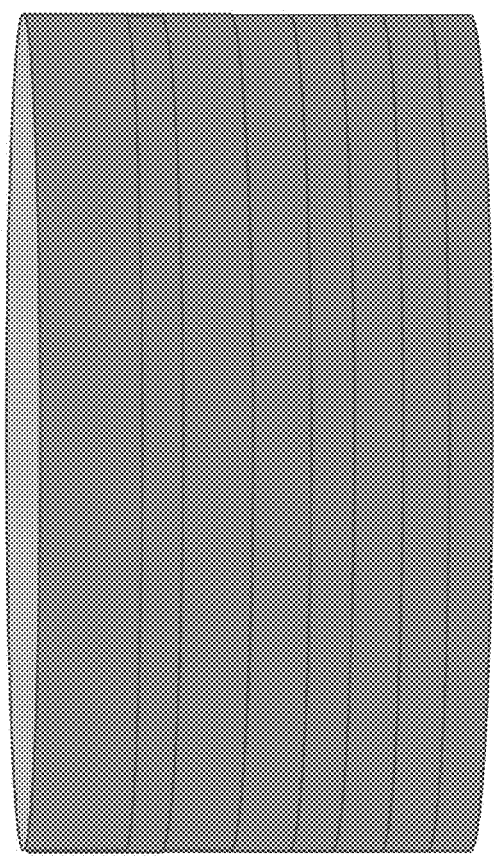
FIG. 51: Schematic illustrating electrochemical system with different arrangement of the cells to make battery packs.
Figure 51:
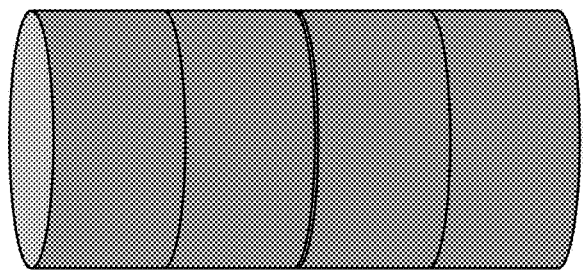
Figure 51:
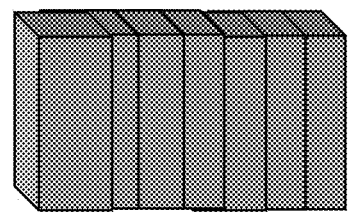

FIGS. 43-51 illustrate example assemblies of example complete electrochemical system using electrode assemblies such as those shown in FIG. 41. FIG. 43 illustrates the components an electrochemical cell system. The example electrochemical cell system is comprised of positive, cathode current collectors (e.g., Al) electronically connected to the cathode perforated plate electrode. In this example, the cathode current collectors are electrically insulated (ionically and electronically insulated) from the anode rod electrodes, the anode substrate electrodes, and the negative, anode current collectors via an electrically (ionically and electronically) insulating material, such as an insulating polymer. The system in FIG. 43 also comprises negative, anode current collectors (e.g., Cu) electronically connected to the anode rod electrodes and/or the anode substrate electrodes. In this embodiment of the electrochemical system, the cathode electrode may be a perforated plate electrode made of lithium cobalt oxide (LCO), lithium iron phosphate (LFP), or sulfur, for example, or a solid electrolyte. Primary and secondary ionically conductive separator layers are also present between the anode and cathode electrodes. In the example in FIG. 43A, an electrolyte may also be used, in solid or liquid form, between the anode and cathode electrodes. FIG. 43B shows some example shapes of the electrochemical cell cross-section views. FIG. 44 illustrates that the electrochemical cell in FIG. 43A may be stacked and arranged in a parallel fashion to form a multi-cell electrochemical system. The stack of cells, as illustrated in FIG. 44, form an encased electrochemical system, with the positive and negative current collectors on the sides, top, and bottom, being the system case walls. FIG. 45 illustrates that electrochemical system may include shared anode and cathode current collector rods, wherein the shared current collector rods are electronically connected to the respective electrode current collectors located internal to the electrochemical cell. The shared electrode current collector rods may extend outside of the internal volume of the electrochemical cell, and may be connected to the respective primary current collector tab. As shown, in FIG. 45, the shared cathode collector rod is electrically insulated from the anode current collector layers via an electrically insulating material, such as a polymer. FIG. 45B illustrates an example cross section view of the electrochemical cell in FIG. 45A, showing the arrangement of the shared electrode current collector rods. FIG. 46 illustrates that the cells illustrated in FIG. 45 may be stacked in a parallel arrangement forming an encased electrochemical system, such as a battery. FIG. 46A shows another embodiment of the stacked electrochemical cell system wherein shared current collector rods are electronically connected to the respective internal electrodes (e.g., anode rod electrodes or cathode perforated plate electrodes), with the only the cathode shared current collector rod being external and in electronic communication with the positive, cathode current collectors (sides as illustrated), in which case the anode current collectors at the top or bottom of the stack are connected to an anode primary current collector tab. FIG. 46B illustrates a stacked electrochemical system with a shared external positive, cathode current collector rod. FIG. 47 illustrates another example encased electrochemical cell system with an individual external positive, cathode current collector that is electrically insulated from other current collectors. FIG. 48 illustrates another embodiment of the electrochemical cell wherein the negative, anode current collector is only on one side (e.g., the bottom), not the top and bottom, of the cell, as oriented in the illustration, and is electrically insulated from the positive, cathode current collectors (e.g., sides). A positive, cathode current collector is position a side opposite (e.g., top) from the negative, anode current collector, and is in electronic communication to the other positive, cathode current collectors (e.g., sides), and electronically insulated from the anode electrodes. FIG. 48B shows a top view of the electrochemical cell in FIG. 47A, illustrating that there are no electrode shared current collector rods external to the encased electrochemical system. FIG. 49 illustrates a stack of electrochemical cells arranged in series, instead of in parallel. FIG. 49B again illustrates that there are no external shared electrode current collector rods; instead, the top and bottom of the encased electrochemical system may serve the same role as primary current collector tabs, allowing connection to an external electronic circuit. FIG. 50 shows another embodiment of an electrochemical cell, wherein the cell of FIG. 48 may incorporate shared current collector rods for the anode and cathode electrodes. FIG. 51 illustrates that the encased electrochemical systems (e.g., those illustrated in FIG. 44, 46, or 49) may have different shapes (e.g., rectangular, circular, ellipsoidal) and may be arranged in parallel or in series.

EXAMPLE 7

Novel Electrodes and Electrochemical Cells

This Example provides a description of electrochemical systems of the invention (and components thereof) and methods of making and using.

Method 1: An electrode of an electrochemical cell (such as a Li-ion battery) such that the electrode is composed of a suspension of active material powder (nano or micro size of features) materials (such as NMC, sulfur, silicon, zinc, zinc oxide, LiCoO2, LiFePO4, carbon, NCA or any combination thereof), conductive fillers (nano or micro) materials (such as carbon) and at least one layer of foam, mesh or perforated sheet of electronically conductive materials (copper, copper coated with metal oxides, stainless steel, titanium, aluminum, nickel, chromium, tungsten, metal nitrides, metal carbides, carbon, carbon fiber, graphite, graphene, carbon mesh, conductive polymers, or combinations of the above (including multi-layered structures) in a liquid or gel electrolyte (such as 1M LiPF6 in PC-EC 1:1). The layer(s) of electronically conductive materials create at least one path for conducting electrons between the said electrode and the outside of the cell as in charge or discharge of the cell; each layer is parallel to the plane of the active materials. The electrode may have a current collector film (porous or non-porous) at one end, which is connected to an outside tab of the positive or negative poles. The thickness of each current collector layer can be between 5 µm to 500 µm. The thickness of the total electrode can be 10 µm to 1 cm. The thickness of the conductive interlayers can be between 5 nm and 1 mm. The conductive middle layers can have an electronic path to the outside tab of the said electrode, such as through the main current collector film.

Method 2: An electrode of an electrochemical cell (such as a li-ion battery) such that the electrode is composed of a mix of active material powder (nano or micro size or features) materials (such as NMC, sulfur, Silicon, Zinc, Zinc Oxide, LiCoO2, LiFePO4, Carbon, NCA or any combination thereof), conductive fillers (nano or micro) materials (such as carbon) and at least one layer of foam, mesh or perforated sheet of electronically conductive materials (copper, copper coated with metal oxides, stainless steel, titanium, aluminum, nickel, chromium, tungsten, metal nitrides, metal carbides, carbon, carbon fiber, graphite, graphene, carbon mesh, conductive polymers, or combinations of the above (including multi-layered structures) in a solid electrolyte matrix (such as LISICON). The layer(s) of electronically conductive materials create at least one path for conducting electrons between the said electrode and the outside of the cell as in charge or discharge of the cell; each layer is parallel to the plane of the active materials. The electrode may have a current collector film (porous or non-porous) at one end, which is connected to an outside tab of the positive or negative poles. The thickness of each current collector layer can be between 5 µm-500 µm. The thickness of the total electrode can be 10 µm-1 cm. The thickness of the conductive interlayers can be between 5 nm-1 mm. The conductive middle layers can have an electronic path to the outside tab of the said electrode, preferably through the main current collector film.

Method 3: An electrochemical cell (such as Li-ion cell) in which at least one electrode is composed of a suspension of active material powder (nano or micro size or features) materials (such as NMC, sulfur, Silicon, Zinc, Zinc Oxide, LiCoO2, LiFePO4, Carbon, NCA or any combination thereof), conductive fillers (nano or micro) materials (such as carbon) and at least one layer of foam, mesh or perforated sheet of electronically conductive materials (copper, copper coated with metal oxides, stainless steel, titanium, aluminum, nickel, chromium, tungsten, metal nitrides, metal carbides, carbon, carbon fiber, graphite, graphene, carbon mesh, conductive polymers, or combinations of the above (including multi-layered structures) in a liquid or gel electrolyte (such as 1M LiPF6 in PC-EC 1:1). The layer(s) of electronically conductive materials create at least one path for conducting electrons between the said electrode and the outside of the cell as in charge or discharge of the cell; each layer is parallel to the plane of the active materials. The electrode may have a current collector film (porous or non-porous) at one end, which is connected to an outside tab of the positive or negative poles. The thickness of each current collector layer can be between 5 µm and 500 µm. The thickness of the total electrode can be 10 µm to 1 cm. The thickness of the conductive interlayers can be between 5 nm and 1 mm. The conductive middle layers can have an electronic path to the outside tab of the said electrode, preferably through the main current collector film.

Method 4: An electrochemical cell (such as Li-ion cell) in which at least one electrode is composed of a mix of active material powder (nano or micro size or features) materials (such as NMC, sulfur, Silicon, Zinc, Zinc Oxide, LiCoO2, LiFePO4, Carbon, NCA or any combination thereof), conductive fillers (nano or micro) materials (such as carbon) and at least one layer of foam, mesh or perforated sheet of electronically conductive materials (copper, copper coated with metal oxides, stainless steel, titanium, aluminum, nickel, chromium, tungsten, metal nitrides, metal carbides, carbon, carbon fiber, graphite, graphene, carbon mesh, conductive polymers, or combinations of the above (including multi-layered structures) in a solid electrolyte matrix (such as LISICON). The layer(s) of electronically conductive materials create at least one path for conducting electrons between the said electrode and the outside of the cell as in charge or discharge of the cell; each layer is parallel to the plane of the active materials. The electrode may have a current collector film (porous or non-porous) at one end, which is connected to an outside tab of the positive or negative poles. The thickness of each current collector layer can be between 5 um-500 um. The thickness of the total electrode can be 10 um-1 cm. The thickness of the conductive interlayers can be between 5 nm-1 mm. The conductive middle layers can have an electronic path to the outside tab of the said electrode, preferably through the main current collector film.

Method 5: An electrode of an electrochemical cell (such a Li-ion) such that the electrode consists of at least two different electrochemically active material materials on a substrate. The substrate can be a current collector. In some embodiments one electrochemically active material is lithium metal. In some embodiments another electrochemically active material is silicon. In some embodiments the silicon has nano features (such as nanowires). In some embodiments the two active materials are distributed with an arbitrary pattern. In some embodiments the lithium is in the form of cylinders; in some embodiments the rods are perpendicular to the surface of the current collector. In some embodiments each lithium rod is surrounded by a group of silicon nanowires. In some embodiments the lithium can be used for prelithiation of any electrodes of the cell. In some embodiments the different active materials have separate external tabs. In some embodiments an applied voltage or current between the external lithium tab and the tab of any of the electrodes of the cell are used do release lithium ions from the lithium metal material in the electrolyte or any of the electrodes.

Method 6: An electrode for an electrochemical cell (such as Li-ion battery) in which the electrode consists of a group of nanostructured active material (such as silicon nanowire) on a substrate such that the active material is submerged with a mixture of electrolyte (such as non-aqueous Li-ion electrolyte or a suspension of solid electrolyte particles in a non-aqueous electrolyte) and conductive fillers (such as carbon black).

Method 7: An electrode for an electrochemical cell (such as li-ion battery) in which the electrode consists of a group of nanostructured active material (such as silicon nanowire) on a substrate such that the active material is submerged in an electrolyte (such as non-aqueous li-ion electrolyte or a suspension of solid electrolyte particles in a non-aqueous electrolyte) and at least one layer of conductive material (such as a perforated metal film, metal mesh, metal foam, materials such as Al, Cu, Ni, Fe, Ti, Silver, Gold). The conductive layers are parallel to the substrate. The conductive layers provide additional electronic conductivity for the said electrode and in some embodiments can be electronically connected to the external tab of the said electrode.

Method 8: An electrochemical cell (such as Li-ion) in which the anode is made of a combination of a nano-featured active material (such as nanowire silicon) with a conformal solid electrolyte around them (such as LIPON, LISICON or gel or polymer such as PEO electrolytes) and lithium metal (such as lithium wires surrounded by and parallel to silicon nanowires) perpendicular to an anode current collector substrate; the cathode is made of a suspension of active materials (such as NMC or LiFePO4 powder) and conductive carbon particles in a non-aqueous electrolyte. In some embodiments the anode nano-featured active material is coated on a substrate with nano-features. In some embodiments the cathode has at least one perforated or porous film or mesh or foam current collector. In some embodiments the lithium wires have an external tab that can be used with any of the anode (for example silicon nano wires) or cathode tabs to provide lithium ions into the cell for prelithiation or for preventing capacity loss.

Method 9: An electrochemical cell (such as Li-ion) in which the anode is made of a combination of a Nano-featured active material (such as nanowire silicon) and lithium metal (such as lithium wires surrounded by and parallel to the nanowires) perpendicular to an anode current collector substrate and in a suspension of conductive carbon particles in a first non-aqueous electrolyte); the cathode is made of a suspension of active materials (such as NMC or LiFePO4 powder) and conductive carbon in a second non-aqueous electrolyte. In some embodiments the anode nano-featured active material is coated on a substrate with nano-features.

Figure 52:
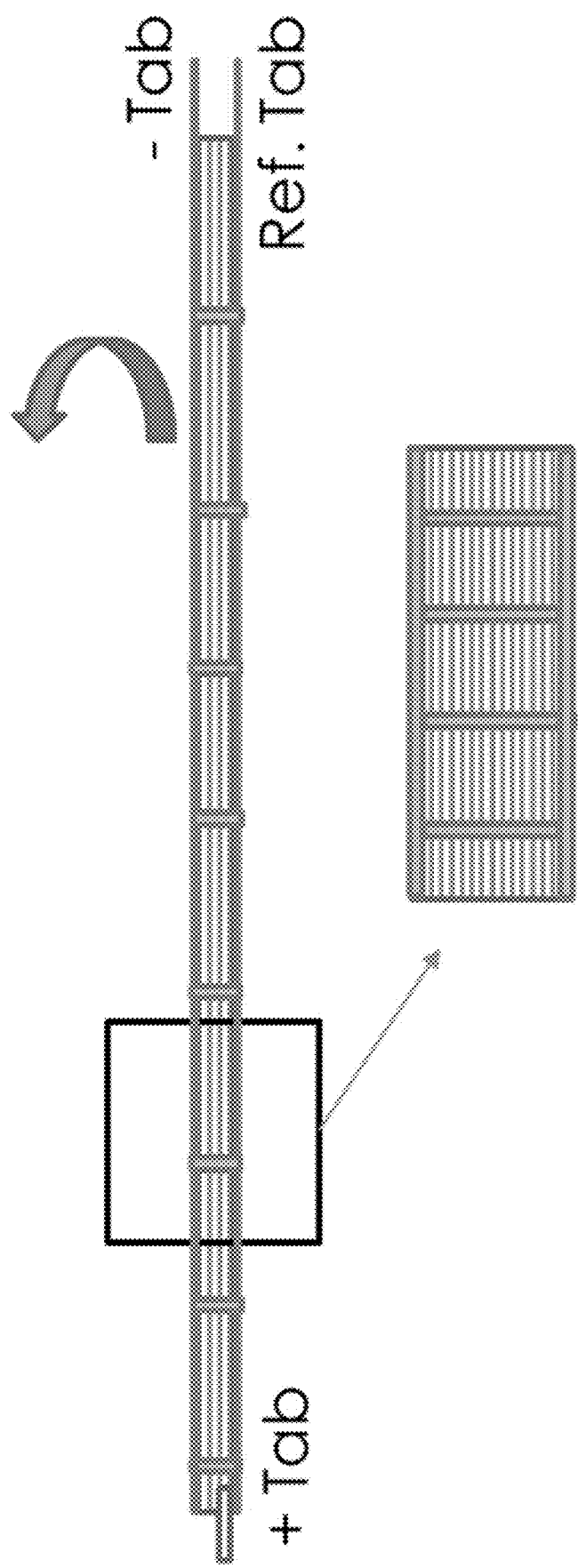
FIG. 52: Schematic illustrating: Dimensions: 20 cm×5 cm×1 mm total, 10 plates; Semi-solid NMC; Gel-polymer electrolyte; Si—Li anode wires. Silicon nano wires coated on carbon nano or micro wires on a correct collector. perforated aluminum films as cathode current collectors: lithium wires. A larger cell can be made by stacking layers of silicon nanowires (with solid electrolyte shell) on substrate layers (can have nanowires on both sides) on top of each other, Continuous lithium wires can be places by punching the silicon layers. Finally layers of perforated aluminum films are placed between the anode layers and fill the empty spaces with the suspension of the cathode active material and conductive carbon in the non-aqueous electrolyte.

FIG. 52 illustrates an example electrochemical cell system of some embodiments. For example, the electrochemical cell dimensions may be 20 cm×5 cm×1 mm total, and comprising 10 electrode plates. For example, the cathode electrodes may be made of semi-solid NMC, the electrolyte may be a gel-polymer, and the anode electrodes may be made of Si—Li wires. The electrochemical system illustrated in FIG. 52 includes silicon nano wires coated on carbon nano or micro wires on a correct collector, perforated aluminum films as cathode current collectors, and lithium wires. A larger electrochemical cell may be made by stacking layers of silicon nanowires (with a solid electrolyte shell) on substrate layers (can have nanowires on both sides) on top of each other. Continuous lithium wires can be made by holes made in the silicon layers. Layers of perforated aluminum films may be placed between the anode layers and to fill the empty spaces with the suspension of the cathode active material and conductive carbon in the non-aqueous electrolyte.

The said electrochemical cell of some embodiments can be provided in a spiral wound format or a Bobbin format.

EXAMPLE 8

Experimental-Thick Electrode

FIGS. 53A-D show the components of an example coin-cell-type electrochemical system with a multi layered electrode using a 500 μm thick electrode array and an auxiliary current collector/aligner system.

Figures 53A, 53B, 53C, 53D:
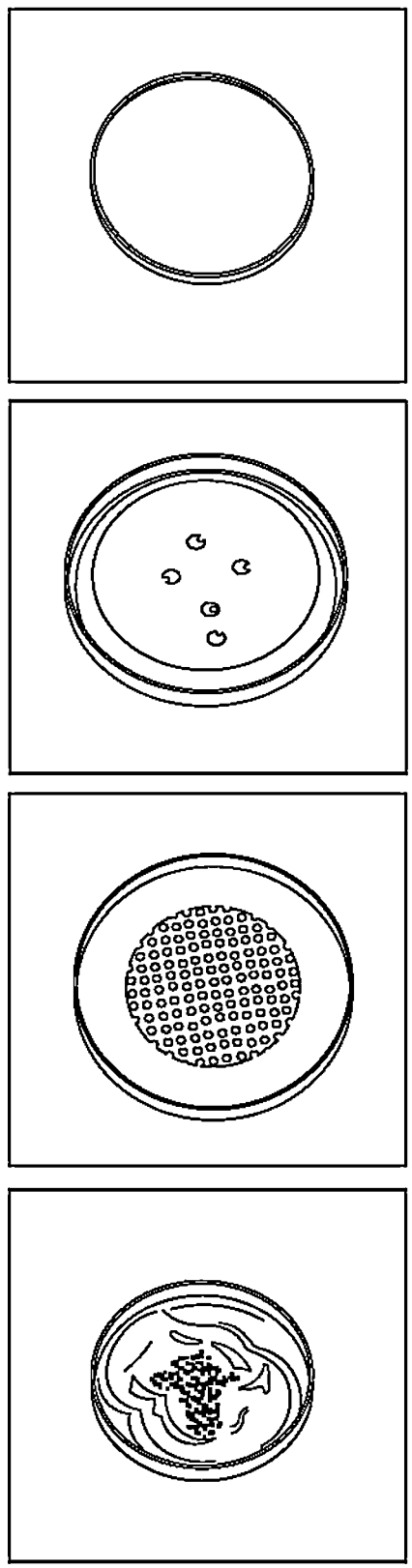
FIGS. 53A, 53B, 53C, and 53D: components of an example coincell-type electrochemical system with a multi layered electrode using a 500 μm thick electrode array and an auxiliary current collector/aligner system.

FIG. 53A shows the aluminum 3-dimensional auxiliary current collector placed inside a 2032-type coin cell cup, which also serves as aligner for the perforated plates. The current collector/aligner consists of a thin circular disc with five protruding cylindrical posts having diameter of 500 μm and height of 550 μm. In an example method, the posts are machined to high precision in order to make electrical contact with the edges of the holes while providing sufficient alignment. The diameter and position of the posts must match the diameter and position of the holes.

FIG. 53B shows one of the layers of the multilayer electrode, consisting of perforated active material, which is coated on an auxiliary current collector plate. The double layer made by the active material coated on the auxiliary current collector plate has hole diameter 500 μm and center to center hole spacing 1000 μm. It further shows the alignment of the holes in each of the layers of the multilayered electrode with the posts of the auxiliary current collector-aligner, providing the electronic connectivity between each of the active material layers and the main current collector plate, through the passage of electrons from the active material layer, the adjacent auxiliary current collector layer and the auxiliary current collector pins (rods). In an example, the active material coating consists of 90% LiCoO2, 5% conductive carbon and additives, and 5% PVDF binder. The thickness of the coating is about 0.050 mm, for example, and the thickness of the auxiliary current collector is about 0.010 mm, for example, in this experiment. FIG. 53C shows a thin porous spacer that will hold the liquid electrolyte to provide sufficient ionic connectivity between the layers. This layer may be a woven or nonwoven layer, but is has to have a high porosity. Other perforated layers of active material, auxiliary current collector plate and spacer, are added to produce a multi layered electrode in this half-cell example. FIG. 53D shows the addition of a Celgard separator layer, which will complete the half-cell construction by placing the addition of the Li electrode on the other side of it.

Figure 54:
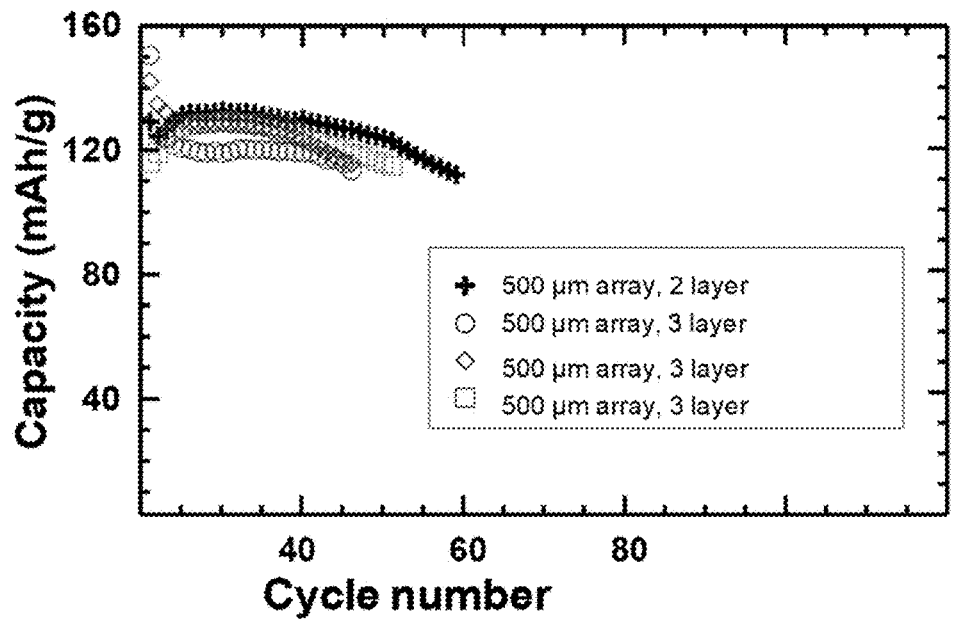
FIG. 54: Experimental results for Coincell 2032 testing of half-cells with commercial electrolyte and layered cathode. Specific Maximum spacing between the conduits was about 1 mm. Thick electrode demonstrated more than 90% of the capacity of the reference commercial one layer LiCoO2 half-cell at C/6 rate.

FIG. 54 provides a plot of capacity (mAh/g) vs. cycle number illustrating the results of Coincell 2032 testing of half-cells made as described in the above discussion of FIGS. 53A-D. The electrolyte may be a commercial Li-ion electrolyte. Specific Maximum spacing between the conduits was about 1 mm. The experiment was performed in room temperature. The experimental data, shown in FIG. 54, demonstrated that the electrode delivered more than 90% of the theoretical capacity at C/6 rate, which is a significant improvement compared to same thickness and density made without the auxiliary current collector, or without the electrolyte channels (i.e., reference commercial one layer LiCoO2 half-cell).

Figure 55:
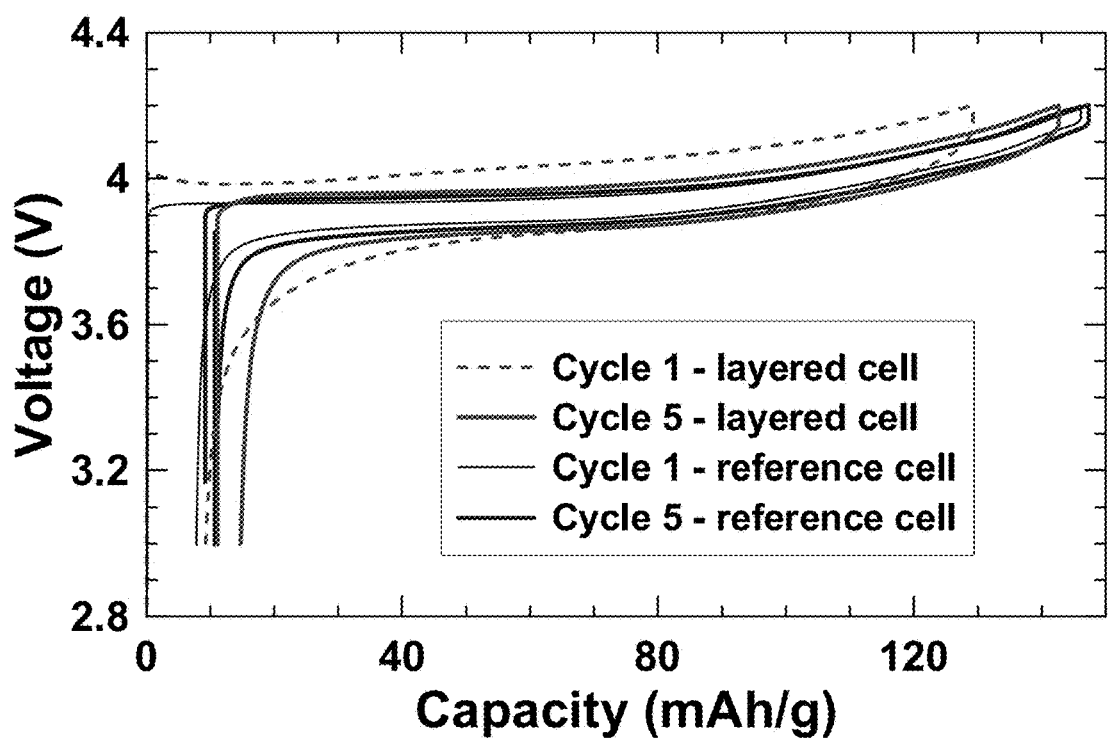
FIG. 55: Experimental results for CR2032 half-cell testing at C6 rate. Two layered cathode cell with 500 μm holes and 1000 μm center to center spacing compared to a reference $LiCoO_2$ cell using the same electrode foil. The reference cell was made with commercial electrode film.

FIG. 55 shows a plot of voltage (v) vs. capacity (mAh/g) of CR2032 half-cell testing at C/6 rate, specifically showing the $1^{st}$ and $5^{th}$ cycles of a coincell of the present example ("layered cell") and the 1st and 5th cycles of a reference commercial cell: two layered cathode cell with 500 μm holes and 1000 μm center to center spacing compared to a reference $LiCoO_2$ cell using the same electrode foil. The reference cell was made with a commercial electrode film. The voltage vs. capacity performance of the example cell of the present invention, as described in FIG. 53, performed similarly to the reference cell that is three times thinner (example, layered cell thickness is 3× of the reference cell).

Statements Regarding Incorporation by Reference and Variations

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Whenever a range is given in the specification, for example, a temperature range, a time range, or a composition or concentration range, all intermediate ranges and subranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An electrochemical cell comprising:
    a layered electrode comprising:
        at least two substantially parallel active material layers, each comprising an active material;
        wherein the at least two substantially parallel active material layers are separated by at least one highly ionic conductive layer, the highly ionic conductive layer having an ionic conductivity greater than an ionic conductivity of the active material layers;
        wherein at least one of the active material layers comprises a first plurality of ion-conducting channels oriented substantially vertical to the surfaces of the active material layers;
        wherein the highly ionic conductive layer comprises carbon;
    wherein the electrochemical cell comprises at least two electrodes, at least one electrode being the layered electrode; and
    wherein the at least two electrodes are substantially parallel.

2. The electrochemical cell of claim 1, wherein the first plurality of ion-conducting channels extend entirely though the at least two substantially parallel active material layers.

3. The electrochemical cell of claim 1, further comprising a second plurality of ion-conducting channels oriented substantially parallel to the surfaces of the active material layers.

4. The electrochemical cell of claim 1, wherein the first plurality of ion-conducting channels, optionally in combination with a second plurality of ion-conducting channels oriented substantially parallel to the surfaces of the active material layers, forms a 3-dimensional ionic channel network within the layered electrode.

5. The electrochemical cell of claim 1, wherein the highly ionic conductive layer comprises a porous layer comprising electrolyte.

6. The electrochemical cell of claim 5, wherein the electrolyte comprises a liquid electrolyte.

7. The electrochemical cell of claim 1, wherein the highly ionic conductive layer comprises a microporous layer or a perforated layer.

8. The electrochemical cell of claim 1, wherein the highly ionic conductive layer has a porosity of more than 30%.

9. The electrochemical cell of claim 1, wherein the carbon comprises graphite, graphene, or nanotubes.

10. The electrochemical cell of claim 1, wherein the highly ionic conductive layer further comprises metal or an alloy.

11. The electrochemical cell of claim 10, wherein the metal or alloy comprises aluminum, copper, titanium, stainless steel, or nickel.

12. The electrochemical cell of claim 1, wherein the highly ionic conductive layer further comprises a polymer.

13. The electrochemical cell of claim 12, wherein the polymer comprises polyethylene, polypropylene, polyethylene terephthalate, polyvinylidene difluoride, polytetrafluoroethylene, or polyethylene oxide.

14. The electrochemical cell of claim 1, wherein the ion-conducting channels of the first plurality have at least one lateral dimension smaller than 500 µm.

15. The electrochemical cell of claim 1, wherein the ion-conducting channels of the first plurality are filled with a highly ionic conductive material.

16. The electrochemical cell of claim 15, wherein the highly ionic conductive material comprises aluminum, copper, titanium, stainless steel, or carbon.

17. The electrochemical cell of claim 16, wherein the carbon comprises graphite, graphene, or nanotubes.

18. The electrochemical cell of claim 1, wherein the layered electrode is present in the electrochemical cell.

19. The electrochemical cell of claim 1, wherein the layered electrode is:
    a cathode of a Mg-ion based battery, a Na-ion based battery, a zinc based battery, an alkaline battery, a lead acid based battery, or an air based battery; or
    an anode of a Mg-ion based battery, a Na-ion based battery, a zinc based battery, an alkaline battery, a lead acid based battery, or an air based battery.

20. The electrochemical cell of claim 1, further comprising a current collector layer.

21. The electrochemical cell of claim 1, further comprising a separator disposed between any two of the at least two electrodes.

22. The electrochemical cell of claim 1, wherein the first plurality of ion-conducting channels are randomly spaced over the active material layer.

23. The electrochemical cell of claim 1, wherein the first plurality of ion-conducting channels are periodically spaced over the active material layer.

* * * * *